United States Patent
Bergström et al.

(10) Patent No.: US 12,086,362 B2
(45) Date of Patent: *Sep. 10, 2024

(54) OPTICAL COMPONENT

(71) Applicant: FlatFrog Laboratories AB, Lund (SE)

(72) Inventors: Håkan Bergström, Torna-Hallestad (SE); Thomas Craven-Bartle, Sodra Sandby (SE); Lars Rippe, Lund (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,944

(22) Filed: Apr. 10, 2023

(65) Prior Publication Data

US 2023/0359309 A1      Nov. 9, 2023

Related U.S. Application Data

(63) Continuation of application No. 17/591,505, filed on Feb. 2, 2022, now Pat. No. 11,650,699, which is a
(Continued)

(30) Foreign Application Priority Data

Sep. 1, 2017   (SE) .................................. 1730234-0

(51) Int. Cl.
*G06F 3/042*          (2006.01)
*G06F 3/041*          (2006.01)

(52) U.S. Cl.
CPC .......... *G06F 3/0421* (2013.01); *G06F 3/0416* (2013.01)

(58) Field of Classification Search
CPC ................ G06F 3/0421; G06F 3/0416; G06F 2203/04109; G06F 3/0428
See application file for complete search history.

(56) References Cited

U.S. PATENT DOCUMENTS

| 3,375,053 A | 3/1968 | Ward |
| 3,440,426 A | 4/1969 | Bush |

(Continued)

FOREIGN PATENT DOCUMENTS

| AU | 2008 280 952 A1 | 3/2009 |
| AU | 2014201966 A1 | 4/2014 |

(Continued)

OTHER PUBLICATIONS

Ahn, Y., et al., "A slim and wide multi-touch tabletop interface and its applications," BigComp2014, IEEE, 2014, in 6 pages.
(Continued)

*Primary Examiner* — Ibrahim A Khan
(74) *Attorney, Agent, or Firm* — Knobbe, Martens, Olson & Bear, LLP

(57) ABSTRACT

A touch sensing apparatus is provided comprising: a light transmissive panel that defines a touch surface, a plurality of light emitters and detectors arranged along a perimeter of the light transmissive panel, a plurality of optical components arranged along the perimeter of the light transmissive panel, wherein the light emitters are arranged to emit a respective beam of emitted light and the optical components are configured to direct the emitted light to a path across the light transmissive panel. Optionally, optical components comprise a light guide arranged to receive light from the light emitters through a first surface and couple out light travelling in the light guide to the touch surface through a second surface. The second surface may be diffusively transmissive. The light guide may further comprise a reflective surface configured to internally reflect light travelling in the light guide from the first surface to the diffusive surface. The reflective surface may be diffusely reflective, partially diffusely reflective, or specularly reflective.

14 Claims, 21 Drawing Sheets

Related U.S. Application Data continuation of application No. 16/642,847, filed as application No. PCT/SE2018/050871 on Aug. 30, 2018, now Pat. No. 11,256,371.

(56) References Cited

U.S. PATENT DOCUMENTS

| | | |
|---|---|---|
| 3,478,220 A | 11/1969 | Milroy |
| 3,553,680 A | 1/1971 | Cooreman |
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,459,476 A | 7/1984 | Weissmueller et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,751,379 A | 6/1988 | Sasaki et al. |
| 4,752,655 A | 6/1988 | Tajiri et al. |
| 4,766,424 A | 8/1988 | Adler et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,550 A | 9/1989 | Hiroaki et al. |
| 4,868,912 A | 9/1989 | Doering |
| 4,891,829 A | 1/1990 | Deckman et al. |
| 4,916,308 A | 4/1990 | Meadows |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,155,813 A | 10/1992 | Donoghue et al. |
| 5,159,322 A | 10/1992 | Loebner |
| 5,162,783 A | 11/1992 | Moreno |
| 5,166,668 A | 11/1992 | Aoyagi |
| 5,175,030 A | 12/1992 | Lu et al. |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,414,413 A | 5/1995 | Tamaru et al. |
| 5,434,373 A | 7/1995 | Komaki |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,515,083 A | 5/1996 | Casebolt et al. |
| 5,525,764 A | 6/1996 | Junkins et al. |
| 5,526,422 A | 6/1996 | Keen |
| 5,539,514 A | 7/1996 | Shishido et al. |
| 5,543,591 A | 8/1996 | Gillespie et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,605,406 A | 2/1997 | Bowen |
| 5,608,550 A | 3/1997 | Epstein et al. |
| 5,672,852 A | 9/1997 | Fukuzaki et al. |
| 5,677,082 A | 10/1997 | Greinke et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,729,250 A | 3/1998 | Bishop et al. |
| 5,736,686 A | 4/1998 | Perret, Jr. et al. |
| 5,740,224 A | 4/1998 | Müller et al. |
| 5,746,423 A | 5/1998 | Arov |
| 5,764,223 A | 6/1998 | Chang et al. |
| 5,767,517 A | 6/1998 | Hawkins |
| 5,775,792 A | 7/1998 | Wiese |
| 5,808,606 A | 9/1998 | Kodama et al. |
| 5,945,980 A | 8/1999 | Moissev et al. |
| 5,945,981 A | 8/1999 | Paull et al. |
| 5,959,617 A | 9/1999 | Bird et al. |
| 6,031,524 A | 2/2000 | Kunert |
| 6,061,177 A | 5/2000 | Fujimoto |
| 6,067,079 A | 5/2000 | Shieh |
| 6,100,538 A | 8/2000 | Ogawa |
| 6,122,394 A | 9/2000 | Neukermans et al. |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,315,156 B1 | 11/2001 | Mahoney et al. |
| 6,333,735 B1 | 12/2001 | Anvekar |
| 6,340,967 B1 | 1/2002 | Maxted |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,504,530 B1 | 1/2003 | Wilson et al. |
| 6,524,749 B1 | 2/2003 | Kaneda et al. |
| 6,529,327 B1 | 3/2003 | Graindorge |
| 6,535,213 B1 | 3/2003 | Ogino et al. |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,677,934 B1 | 1/2004 | Blanchard |
| 6,690,363 B2 | 2/2004 | Newton |
| 6,692,807 B2 | 2/2004 | Bries et al. |
| 6,707,027 B2 | 3/2004 | Liess et al. |
| 6,710,767 B1 | 3/2004 | Hasegawa et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,803,900 B1 | 10/2004 | Berkoff et al. |
| 6,806,871 B1 | 10/2004 | Yasue |
| 6,828,959 B2 | 12/2004 | Takekawa et al. |
| 6,911,646 B1 | 6/2005 | Weitekamp |
| 6,927,384 B2 | 8/2005 | Reime et al. |
| 6,940,286 B2 | 9/2005 | Wang et al. |
| 6,965,836 B2 | 11/2005 | Richardson |
| 6,972,401 B2 | 12/2005 | Akitt et al. |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,117,157 B1 | 10/2006 | Taylor et al. |
| 7,133,031 B2 | 11/2006 | Wang et al. |
| 7,151,530 B2 | 12/2006 | Roeber et al. |

(56) References Cited

U.S. PATENT DOCUMENTS

| | | |
|---|---|---|
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| D602,498 S | 10/2009 | Arnell |
| 7,613,375 B2 | 11/2009 | Shimizu |
| 7,629,968 B2 | 12/2009 | Miller et al. |
| 7,646,379 B1 | 1/2010 | Drennan et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,712,041 B2 | 5/2010 | Toyama et al. |
| 7,729,056 B2 | 6/2010 | Hwang et al. |
| 7,812,826 B2 | 10/2010 | Ording et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,956,847 B2 | 6/2011 | Christie |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,139,046 B2 | 3/2012 | Kweon et al. |
| 8,149,211 B2 | 4/2012 | Hayakawa et al. |
| 8,149,221 B2 | 4/2012 | Newton |
| 8,154,418 B2 | 4/2012 | Peterson et al. |
| 8,184,108 B2 | 5/2012 | Smits |
| 8,194,036 B1 | 6/2012 | Braun et al. |
| 8,217,854 B2 | 7/2012 | Bhogal et al. |
| 8,218,154 B2 | 7/2012 | Østergaard et al. |
| 8,274,495 B2 | 9/2012 | Lee |
| D669,497 S | 10/2012 | Lee et al. |
| 8,314,773 B2 | 11/2012 | Low et al. |
| 8,319,729 B2 | 11/2012 | Choi et al. |
| 8,325,158 B2 | 12/2012 | Yatsuda et al. |
| 8,339,379 B2 | 12/2012 | Goertz et al. |
| 8,345,023 B1 | 1/2013 | Drennan et al. |
| 8,350,827 B2 | 1/2013 | Chung et al. |
| D675,644 S | 2/2013 | Frost et al. |
| 8,384,010 B2 | 2/2013 | Hong et al. |
| 8,384,693 B2 | 2/2013 | Newton |
| 8,407,606 B1 | 3/2013 | Davidson et al. |
| 8,436,833 B2 | 5/2013 | King et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,553,014 B2 | 10/2013 | Holmgren et al. |
| 8,567,257 B2 | 10/2013 | Van Steenberge et al. |
| 8,571,171 B2 | 10/2013 | Tischenko et al. |
| 8,581,884 B2 | 11/2013 | Fåhraeus et al. |
| 8,587,562 B2 | 11/2013 | Goertz et al. |
| 8,599,140 B2 | 12/2013 | Crockett et al. |
| 8,610,672 B2 | 12/2013 | Kun et al. |
| 8,624,858 B2 | 1/2014 | Fyke et al. |
| 8,674,963 B2 | 3/2014 | Cornish et al. |
| 8,676,007 B2 | 3/2014 | Holmgren et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,749,527 B2 | 6/2014 | Douxchamps et al. |
| 8,780,066 B2 | 7/2014 | Christiansson et al. |
| 8,830,181 B1 | 9/2014 | Clark et al. |
| 8,837,882 B2 | 9/2014 | Holmgren et al. |
| 8,860,696 B2 | 10/2014 | Wassvik et al. |
| 8,866,870 B1 | 10/2014 | Smith |
| 8,872,098 B2 | 10/2014 | Bergström et al. |
| 8,872,801 B2 | 10/2014 | Bergström et al. |
| D716,820 S | 11/2014 | Wood |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,896,575 B2 | 11/2014 | Goertz et al. |
| 8,902,196 B2 | 12/2014 | Goertz et al. |
| 8,913,035 B2 | 12/2014 | Lai et al. |
| 8,928,590 B1 | 1/2015 | El Dokor |
| 8,928,609 B2 | 1/2015 | Italia et al. |
| 8,963,886 B2 | 2/2015 | Wassvik |
| 8,982,084 B2 | 3/2015 | Christiansson et al. |
| 9,001,086 B1 * | 4/2015 | Saini .............. G06F 3/0428 |
| | | 345/175 |
| 9,024,896 B2 | 5/2015 | Chen |
| 9,024,916 B2 | 5/2015 | Christiansson |
| 9,035,909 B2 | 5/2015 | Christiansson |
| 9,052,771 B2 | 6/2015 | Goertz et al. |
| 9,063,614 B2 | 6/2015 | Petterson et al. |
| 9,063,617 B2 | 6/2015 | Eliasson et al. |
| 9,086,763 B2 | 7/2015 | Johansson et al. |
| 9,092,091 B2 | 7/2015 | Piot et al. |
| 9,128,250 B2 | 9/2015 | Charters et al. |
| 9,134,854 B2 | 9/2015 | Wassvik et al. |
| 9,137,891 B2 | 9/2015 | Gibbs et al. |
| 9,158,401 B2 | 10/2015 | Christiansson |
| 9,158,415 B2 | 10/2015 | Song et al. |
| 9,158,416 B2 | 10/2015 | Eriksson et al. |
| 9,164,625 B2 | 10/2015 | Holmgren et al. |
| 9,195,344 B2 | 11/2015 | Goertz et al. |
| 9,201,520 B2 | 12/2015 | Benko et al. |
| 9,207,800 B1 | 12/2015 | Eriksson et al. |
| 9,213,443 B2 | 12/2015 | Goertz et al. |
| 9,213,445 B2 | 12/2015 | King et al. |
| 9,223,441 B1 | 12/2015 | Bohn |
| 9,274,645 B2 | 3/2016 | Christiansson et al. |
| 9,280,237 B2 | 3/2016 | Kukulj |
| 9,291,845 B2 | 3/2016 | Shin et al. |
| 9,292,132 B2 | 3/2016 | An et al. |
| 9,317,146 B1 | 4/2016 | Hufnagel |
| 9,317,168 B2 | 4/2016 | Christiansson et al. |
| 9,318,156 B2 | 4/2016 | Kanapathippillai et al. |
| 9,323,396 B2 | 4/2016 | Han et al. |
| 9,335,867 B2 | 5/2016 | Holmgren et al. |
| 9,366,565 B2 | 6/2016 | Uvnäs |
| 9,366,802 B2 | 6/2016 | Lee et al. |
| 9,377,884 B2 | 6/2016 | Christiansson et al. |
| 9,389,730 B2 | 7/2016 | Goertz et al. |
| 9,389,732 B2 | 7/2016 | Craven-Bartle |
| 9,411,430 B2 | 8/2016 | Holmgren et al. |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| D768,674 S | 10/2016 | Hanover |
| 9,471,170 B2 | 10/2016 | Goertz et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,563,298 B2 | 2/2017 | Sakashita et al. |
| D782,516 S | 3/2017 | Hohne et al. |
| 9,588,619 B2 | 3/2017 | Christiansson et al. |
| 9,594,467 B2 | 3/2017 | Christiansson et al. |
| D783,042 S | 4/2017 | Kim et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,645,679 B2 | 5/2017 | Eriksson et al. |
| 9,652,082 B1 * | 5/2017 | Lin .................. G06F 1/1626 |
| 9,671,900 B2 | 6/2017 | Piot et al. |

(56) References Cited

U.S. PATENT DOCUMENTS

| | | | |
|---|---|---|---|
| 9,678,601 | B2 | 6/2017 | Pettersson et al. |
| 9,678,602 | B2 | 6/2017 | Wallander |
| 9,684,414 | B2 | 6/2017 | Christiansson et al. |
| 9,710,101 | B2 | 7/2017 | Christiansson et al. |
| 9,720,499 | B2 | 8/2017 | Han et al. |
| 9,741,184 | B2 | 8/2017 | Iyer et al. |
| D798,893 | S | 10/2017 | Anzures et al. |
| 9,785,287 | B2 | 10/2017 | Bergstrom et al. |
| 9,811,163 | B2 | 11/2017 | Eriksson et al. |
| 9,811,209 | B2 | 11/2017 | Christiansson et al. |
| D807,388 | S | 1/2018 | Butcher et al. |
| D808,416 | S | 1/2018 | Anzures et al. |
| 9,857,916 | B2 | 1/2018 | Bergstrom et al. |
| 9,857,917 | B2 | 1/2018 | Wassvik et al. |
| 9,864,470 | B2 | 1/2018 | Christiansson |
| 9,874,978 | B2 | 1/2018 | Wall |
| 9,921,661 | B2 | 3/2018 | Eriksson et al. |
| 9,927,921 | B2 | 3/2018 | Lee |
| 9,983,626 | B2 | 5/2018 | Cao et al. |
| 9,983,717 | B2 | 5/2018 | Pacheco et al. |
| 9,996,196 | B2 | 6/2018 | Christiansson et al. |
| 10,001,881 | B2 | 6/2018 | Wallander et al. |
| 10,004,985 | B2 | 6/2018 | Holmgren et al. |
| D824,412 | S | 7/2018 | Anzures et al. |
| 10,013,107 | B2 | 7/2018 | Christiansson et al. |
| 10,019,113 | B2 | 7/2018 | Christiansson et al. |
| 10,024,741 | B2 | 7/2018 | Povazay et al. |
| 10,031,623 | B2 | 7/2018 | Christiansson et al. |
| 10,048,773 | B2 | 8/2018 | Fahraeus et al. |
| 10,088,919 | B2 | 10/2018 | Tamura |
| 10,088,957 | B2 | 10/2018 | Johansson et al. |
| 10,126,882 | B2 | 11/2018 | Wassvik |
| 10,126,897 | B2 | 11/2018 | Kwon et al. |
| 10,139,854 | B2 | 11/2018 | Krishnakumar et al. |
| 10,146,376 | B2 | 12/2018 | Wassvik et al. |
| 10,151,866 | B2 | 12/2018 | Craven-Bartle et al. |
| 10,152,176 | B2 | 12/2018 | Wallander |
| 10,161,886 | B2 | 12/2018 | Ohlsson et al. |
| D837,829 | S | 1/2019 | Balles et al. |
| D838,280 | S | 1/2019 | Coburn et al. |
| 10,168,835 | B2 | 1/2019 | Wallander et al. |
| D842,312 | S | 3/2019 | Na et al. |
| 10,261,639 | B2 | 4/2019 | Lee et al. |
| 10,268,288 | B1 | 4/2019 | Wang et al. |
| 10,268,319 | B2 | 4/2019 | Wassvik et al. |
| 10,282,035 | B2 | 5/2019 | Kocovksi et al. |
| 10,317,200 | B1 | 6/2019 | Han et al. |
| 10,318,041 | B2 | 6/2019 | Björklund et al. |
| 10,318,074 | B2 | 6/2019 | Klinghult et al. |
| 10,324,565 | B2 | 6/2019 | Rosengren et al. |
| 10,324,566 | B2 | 6/2019 | Christiansson |
| D852,842 | S | 7/2019 | Hung et al. |
| 10,365,768 | B2 | 7/2019 | Craven-Bartle et al. |
| 10,372,265 | B2 | 8/2019 | Christiansson et al. |
| 10,397,638 | B2* | 8/2019 | Kanematsu ............ G06F 3/0412 |
| 10,401,546 | B2 | 9/2019 | Craven-Bartle et al. |
| 10,417,219 | B1* | 9/2019 | Yang .................... H04L 9/0643 |
| 10,437,358 | B2 | 10/2019 | Geaghan et al. |
| 10,437,389 | B2 | 10/2019 | Skagmo et al. |
| 10,459,589 | B2 | 10/2019 | Xu et al. |
| 10,459,590 | B2 | 10/2019 | Lin et al. |
| 10,474,249 | B2 | 11/2019 | Fahraeus et al. |
| 10,481,737 | B2 | 11/2019 | Christiansson et al. |
| 10,496,227 | B2 | 12/2019 | Wassvik et al. |
| 10,579,227 | B1 | 3/2020 | Bura et al. |
| 10,606,414 | B2 | 3/2020 | Christiansson et al. |
| 10,606,416 | B2 | 3/2020 | Skagmo et al. |
| 10,642,386 | B2 | 5/2020 | Makelainen et al. |
| 10,649,585 | B1 | 5/2020 | van Beek et al. |
| 10,691,638 | B1* | 6/2020 | Lyadvinsky ............ G06F 3/0622 |
| D892,855 | S | 8/2020 | Liu |
| 10,739,916 | B2 | 8/2020 | Skagmo et al. |
| 10,761,657 | B2 | 9/2020 | Christiansson et al. |
| 10,775,935 | B2 | 9/2020 | Kocovski et al. |
| 10,775,937 | B2 | 9/2020 | Christiansson et al. |
| 10,853,315 | B1* | 12/2020 | Faibish ................. G06F 16/137 |
| 10,860,142 | B1 | 12/2020 | Northcott et al. |
| 10,884,275 | B2 | 1/2021 | Yang et al. |
| 10,884,553 | B2 | 1/2021 | Weilbacher et al. |
| 10,892,303 | B2 | 1/2021 | Li |
| 10,963,104 | B2 | 3/2021 | Bergström et al. |
| 11,016,605 | B2 | 5/2021 | Christiansson et al. |
| 11,029,783 | B2 | 6/2021 | Wassvik et al. |
| 11,099,688 | B2 | 8/2021 | Christiansson et al. |
| 11,106,312 | B2 | 8/2021 | Christiansson et al. |
| 11,106,314 | B2 | 8/2021 | Krishnakumar et al. |
| 11,119,565 | B2 | 9/2021 | Avila et al. |
| 11,175,756 | B2 | 11/2021 | Andersson et al. |
| 11,182,023 | B2 | 11/2021 | Ohlsson et al. |
| 11,188,730 | B1 | 11/2021 | Kwon et al. |
| 11,243,640 | B2 | 2/2022 | Ancona et al. |
| 11,256,371 | B2 | 2/2022 | Bergstrom et al. |
| 11,263,028 | B2 | 3/2022 | Momchilov |
| 11,269,460 | B2 | 3/2022 | Skagmo et al. |
| 11,281,335 | B2 | 3/2022 | Kocovski et al. |
| 11,281,338 | B2 | 3/2022 | Skagmo et al. |
| 11,301,089 | B2 | 4/2022 | Christiansson et al. |
| 11,474,644 | B2 | 10/2022 | Kocovski et al. |
| 11,567,610 | B2 | 1/2023 | Bergstrom et al. |
| 11,579,731 | B2 | 2/2023 | Kocovski et al. |
| 11,579,732 | B2 | 2/2023 | Skagmo et al. |
| 11,650,699 | B2 | 5/2023 | Bergstrom et al. |
| 11,740,741 | B2 | 8/2023 | Bergström et al. |
| 11,868,568 | B2 | 1/2024 | Kocovski et al. |
| 11,893,189 | B2 | 2/2024 | Bergström |
| 11,909,033 | B2 | 2/2024 | Tsuzuki et al. |
| 11,914,819 | B2 | 2/2024 | Kocovski et al. |
| 2001/0002694 | A1 | 6/2001 | Nakazawa et al. |
| 2001/0005004 | A1 | 6/2001 | Shiratsuki et al. |
| 2001/0005308 | A1 | 6/2001 | Oishi et al. |
| 2001/0030642 | A1 | 10/2001 | Sullivan et al. |
| 2001/0055411 | A1 | 12/2001 | Black |
| 2002/0067348 | A1 | 6/2002 | Masters et al. |
| 2002/0075243 | A1 | 6/2002 | Newton |
| 2002/0085003 | A1 | 7/2002 | Nagashima |
| 2002/0118177 | A1 | 8/2002 | Newton |
| 2002/0130883 | A1 | 9/2002 | Huang et al. |
| 2002/0158823 | A1 | 10/2002 | Zavracky et al. |
| 2002/0158853 | A1 | 10/2002 | Sugawara et al. |
| 2002/0163505 | A1 | 11/2002 | Takekawa |
| 2003/0016450 | A1 | 1/2003 | Bluemel et al. |
| 2003/0034439 | A1 | 2/2003 | Reime et al. |
| 2003/0034935 | A1 | 2/2003 | Amanai et al. |
| 2003/0048257 | A1 | 3/2003 | Mattila |
| 2003/0052257 | A1 | 3/2003 | Sumriddetchkajorn |
| 2003/0085882 | A1 | 5/2003 | Lu |
| 2003/0095399 | A1 | 5/2003 | Grenda et al. |
| 2003/0107748 | A1 | 6/2003 | Lee |
| 2003/0137494 | A1 | 7/2003 | Tulbert |
| 2003/0156100 | A1 | 8/2003 | Gettemy |
| 2003/0160155 | A1 | 8/2003 | Liess |
| 2003/0210537 | A1 | 11/2003 | Engelmann |
| 2003/0214486 | A1 | 11/2003 | Roberts |
| 2004/0027339 | A1 | 2/2004 | Schulz |
| 2004/0032401 | A1 | 2/2004 | Nakazawa et al. |
| 2004/0090432 | A1 | 5/2004 | Takahashi et al. |
| 2004/0109664 | A1 | 6/2004 | Ohtsuki et al. |
| 2004/0130338 | A1 | 7/2004 | Wang et al. |
| 2004/0134772 | A1 | 7/2004 | Cohen et al. |
| 2004/0136564 | A1 | 7/2004 | Roeber et al. |
| 2004/0174541 | A1 | 9/2004 | Freifeld |
| 2004/0179001 | A1 | 9/2004 | Morrison et al. |
| 2004/0201579 | A1 | 10/2004 | Graham |
| 2004/0212603 | A1 | 10/2004 | Cok |
| 2004/0238627 | A1 | 12/2004 | Silverbrook et al. |
| 2004/0239702 | A1 | 12/2004 | Kang et al. |
| 2004/0245438 | A1 | 12/2004 | Payne et al. |
| 2004/0252091 | A1 | 12/2004 | Ma et al. |
| 2004/0252867 | A1 | 12/2004 | Lan et al. |
| 2005/0005319 | A1 | 1/2005 | Della-Cioppa et al. |
| 2005/0012714 | A1 | 1/2005 | Russo et al. |
| 2005/0022130 | A1 | 1/2005 | Fabritius |
| 2005/0024624 | A1 | 2/2005 | Gruhlke et al. |
| 2005/0041013 | A1 | 2/2005 | Tanaka |

(56) References Cited

U.S. PATENT DOCUMENTS

| | | |
|---|---|---|
| 2005/0053191 A1 | 3/2005 | Gohno et al. |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1* | 8/2005 | Nishikawa ............ G06F 3/0421 313/500 |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0248848 A1 | 11/2005 | Whitehead et al. |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0013353 A1 | 1/2006 | Hein |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0066586 A1 | 3/2006 | Gally et al. |
| 2006/0098004 A1* | 5/2006 | Cok ..................... G06F 3/0412 345/207 |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0144237 A1 | 7/2006 | Liang et al. |
| 2006/0158437 A1 | 7/2006 | Blythe et al. |
| 2006/0161871 A1 | 7/2006 | Hotelling et al. |
| 2006/0164443 A1 | 7/2006 | Kettle et al. |
| 2006/0170658 A1 | 8/2006 | Nakamura et al. |
| 2006/0182345 A1 | 8/2006 | Geidl et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1* | 4/2007 | Leung ................... G06F 16/122 |
| 2007/0120833 A1 | 5/2007 | Yamaguchi et al. |
| 2007/0125937 A1 | 6/2007 | Eliasson et al. |
| 2007/0146337 A1 | 6/2007 | Ording et al. |
| 2007/0152985 A1 | 7/2007 | Ostergaard et al. |
| 2007/0165008 A1 | 7/2007 | Crockett |
| 2007/0176162 A1 | 8/2007 | Kang |
| 2007/0195404 A1 | 8/2007 | Iijima |
| 2007/0201042 A1 | 8/2007 | Eliasson et al. |
| 2007/0285406 A1 | 12/2007 | Kukulj et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0012835 A1 | 1/2008 | Rimon et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0074402 A1* | 3/2008 | Cornish ............... G06F 3/0421 345/176 |
| 2008/0080811 A1 | 4/2008 | Deane |
| 2008/0088603 A1 | 4/2008 | Eliasson et al. |
| 2008/0115081 A1 | 5/2008 | Sankaravadivelu et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0180404 A1 | 7/2008 | Han et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0280952 A1 | 11/2008 | Giblin et al. |
| 2008/0284925 A1 | 11/2008 | Han |
| 2008/0285406 A1 | 11/2008 | Moro et al. |
| 2008/0291668 A1 | 11/2008 | Aylward et al. |
| 2008/0297482 A1 | 12/2008 | Weiss |
| 2008/0309626 A1 | 12/2008 | Westerman et al. |
| 2009/0000831 A1 | 1/2009 | Miller et al. |
| 2009/0002340 A1 | 1/2009 | Van Genechten |
| 2009/0006292 A1 | 1/2009 | Block |
| 2009/0013562 A1 | 1/2009 | Pelletier |
| 2009/0040786 A1 | 2/2009 | Mori |
| 2009/0058832 A1* | 3/2009 | Newton ................. G06F 3/0421 345/175 |
| 2009/0058833 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0100383 A1 | 4/2009 | Sunday et al. |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0127005 A1 | 5/2009 | Zachut et al. |
| 2009/0128499 A1 | 5/2009 | Izadi et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0174679 A1 | 7/2009 | Westerman |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0209420 A1 | 8/2009 | Kalgutkar et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0273795 A1 | 11/2009 | Bacher et al. |
| 2009/0278795 A1 | 11/2009 | Hansen et al. |
| 2009/0278816 A1 | 11/2009 | Colson |
| 2009/0278913 A1 | 11/2009 | Rosenfeld et al. |
| 2009/0295752 A1 | 12/2009 | Liu et al. |
| 2009/0297009 A1 | 12/2009 | Xu et al. |
| 2010/0007331 A1 | 1/2010 | Hawkins et al. |
| 2010/0014024 A1 | 1/2010 | Tatsumi et al. |
| 2010/0026667 A1 | 2/2010 | Bernstein |
| 2010/0033444 A1 | 2/2010 | Kobayashi |
| 2010/0045629 A1 | 2/2010 | Newton |

(56) References Cited

U.S. PATENT DOCUMENTS

| | | |
|---|---|---|
| 2010/0045634 A1 | 2/2010 | Su et al. |
| 2010/0057235 A1 | 3/2010 | Wang et al. |
| 2010/0059295 A1 | 3/2010 | Hotelling et al. |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0128985 A1 | 5/2010 | El-Sana et al. |
| 2010/0130257 A1 | 5/2010 | Jang |
| 2010/0130280 A1 | 5/2010 | Arezina et al. |
| 2010/0134435 A1 | 6/2010 | Kimura et al. |
| 2010/0141604 A1 | 6/2010 | Cai et al. |
| 2010/0142823 A1 | 6/2010 | Wang et al. |
| 2010/0166276 A1 | 7/2010 | Dube et al. |
| 2010/0176732 A1 | 7/2010 | Schenk et al. |
| 2010/0187422 A1 | 7/2010 | Kothari et al. |
| 2010/0189376 A1 | 7/2010 | Bertram et al. |
| 2010/0193259 A1 | 8/2010 | Wassvik |
| 2010/0195804 A1 | 8/2010 | Dafni et al. |
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0238686 A1 | 9/2010 | Weber et al. |
| 2010/0245292 A1 | 9/2010 | Wu |
| 2010/0253645 A1 | 10/2010 | Bolender |
| 2010/0259939 A1 | 10/2010 | Chen et al. |
| 2010/0265170 A1 | 10/2010 | Norieda |
| 2010/0277436 A1 | 11/2010 | Feng et al. |
| 2010/0277728 A1 | 11/2010 | Imura |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0309139 A1 | 12/2010 | Ng |
| 2010/0315379 A1 | 12/2010 | Allard et al. |
| 2010/0321328 A1 | 12/2010 | Chang et al. |
| 2010/0321341 A1 | 12/2010 | Cho et al. |
| 2010/0322550 A1 | 12/2010 | Trott |
| 2010/0325547 A1 | 12/2010 | Keng et al. |
| 2010/0328265 A1 | 12/2010 | Hotelling et al. |
| 2011/0007021 A1 | 1/2011 | Bernstein et al. |
| 2011/0037735 A1 | 2/2011 | Land et al. |
| 2011/0043490 A1 | 2/2011 | Powell et al. |
| 2011/0049388 A1 | 3/2011 | Delaney et al. |
| 2011/0050576 A1 | 3/2011 | Forutanpour et al. |
| 2011/0050649 A1 | 3/2011 | Newton et al. |
| 2011/0051394 A1 | 3/2011 | Bailey |
| 2011/0057102 A1 | 3/2011 | Yao |
| 2011/0065424 A1* | 3/2011 | Estevez .............. H04W 48/18 455/414.3 |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0102320 A1 | 5/2011 | Hauke et al. |
| 2011/0102374 A1 | 5/2011 | Wassvik et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0140106 A1 | 6/2011 | Forbes |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1* | 7/2011 | Goertz .................. G06F 3/042 345/175 |
| 2011/0169756 A1 | 7/2011 | Ogawa et al. |
| 2011/0169780 A1 | 7/2011 | Goertz et al. |
| 2011/0175852 A1 | 7/2011 | Goertz et al. |
| 2011/0181552 A1 | 7/2011 | Magnus et al. |
| 2011/0199297 A1 | 8/2011 | Antonyuk et al. |
| 2011/0205186 A1 | 8/2011 | Newton et al. |
| 2011/0205189 A1 | 8/2011 | Newton |
| 2011/0205750 A1 | 8/2011 | Krijn et al. |
| 2011/0210946 A1 | 9/2011 | Goertz et al. |
| 2011/0216042 A1 | 9/2011 | Wassvik et al. |
| 2011/0220794 A1 | 9/2011 | Censor et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0255305 A1 | 10/2011 | Chen et al. |
| 2011/0260829 A1 | 10/2011 | Lee |
| 2011/0261020 A1 | 10/2011 | Song et al. |
| 2011/0266423 A1 | 11/2011 | Koeppe et al. |
| 2011/0267264 A1 | 11/2011 | McCarthy et al. |
| 2011/0267296 A1 | 11/2011 | Noguchi et al. |
| 2011/0287317 A1 | 11/2011 | Nakanishi |
| 2011/0291944 A1 | 12/2011 | Simmons et al. |
| 2011/0291988 A1 | 12/2011 | Bamji et al. |
| 2011/0291989 A1 | 12/2011 | Lee |
| 2011/0298743 A1 | 12/2011 | Machida et al. |
| 2011/0304577 A1 | 12/2011 | Brown et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Yu-Jen et al. |
| 2012/0017182 A1 | 1/2012 | Bau |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0044572 A1 | 2/2012 | Simmonds et al. |
| 2012/0045170 A1 | 2/2012 | Shibata et al. |
| 2012/0050336 A1 | 3/2012 | Nave et al. |
| 2012/0056081 A1* | 3/2012 | Kozodoy .............. G02B 6/0023 385/36 |
| 2012/0056807 A1 | 3/2012 | Chapman et al. |
| 2012/0056814 A1 | 3/2012 | Sudo |
| 2012/0062474 A1 | 3/2012 | Weishaupt et al. |
| 2012/0062489 A1 | 3/2012 | Andersson et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0091912 A1 | 4/2012 | Brown Elliott |
| 2012/0096383 A1 | 4/2012 | Sakamoto et al. |
| 2012/0098733 A1* | 4/2012 | Masuda ............... G06F 3/1454 345/2.2 |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0146950 A1 | 6/2012 | Park et al. |
| 2012/0146957 A1 | 6/2012 | Dunagan |
| 2012/0153134 A1 | 6/2012 | Bergström et al. |
| 2012/0154338 A1 | 6/2012 | Bergström et al. |
| 2012/0154339 A1 | 6/2012 | Land et al. |

(56) References Cited

U.S. PATENT DOCUMENTS

| | | |
|---|---|---|
| 2012/0162142 A1 | 6/2012 | Christiansson et al. |
| 2012/0162144 A1 | 6/2012 | Fåhraeus et al. |
| 2012/0169672 A1* | 7/2012 | Christiansson ....... G06F 3/0421 345/175 |
| 2012/0170056 A1 | 7/2012 | Jakobsen et al. |
| 2012/0173343 A1 | 7/2012 | Koning |
| 2012/0176343 A1* | 7/2012 | Holmgren ............. G06F 3/0421 345/175 |
| 2012/0181419 A1 | 7/2012 | Momtahan |
| 2012/0182266 A1 | 7/2012 | Han |
| 2012/0188205 A1 | 7/2012 | Jansson et al. |
| 2012/0188206 A1* | 7/2012 | Sparf ..................... G06F 3/042 362/326 |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0206375 A1 | 8/2012 | Fyke et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1 | 8/2012 | Drumm |
| 2012/0221715 A1* | 8/2012 | Hamada ................ H04L 67/535 709/224 |
| 2012/0223916 A1 | 9/2012 | Kukulj |
| 2012/0235892 A1 | 9/2012 | Narendra et al. |
| 2012/0235955 A1 | 9/2012 | Ng et al. |
| 2012/0242622 A1 | 9/2012 | Tseng et al. |
| 2012/0249477 A1 | 10/2012 | Popovich et al. |
| 2012/0249478 A1 | 10/2012 | Chang et al. |
| 2012/0249485 A1 | 10/2012 | Ye et al. |
| 2012/0256882 A1 | 10/2012 | Christiansson et al. |
| 2012/0257004 A1 | 10/2012 | Smith et al. |
| 2012/0262407 A1 | 10/2012 | Hinckley et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0274583 A1 | 11/2012 | Haggerty |
| 2012/0299852 A1 | 11/2012 | Hsu et al. |
| 2012/0305755 A1 | 12/2012 | Hong et al. |
| 2012/0313865 A1 | 12/2012 | Pearce |
| 2013/0002536 A1 | 1/2013 | Yoshida et al. |
| 2013/0007579 A1* | 1/2013 | Dancy ..................... G06Q 50/01 715/205 |
| 2013/0016059 A1 | 1/2013 | Lowles et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1 | 4/2013 | Tan et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120274 A1 | 5/2013 | Ha et al. |
| 2013/0120320 A1 | 5/2013 | Liu et al. |
| 2013/0120324 A1 | 5/2013 | Diverdi et al. |
| 2013/0125016 A1 | 5/2013 | Pallakoff et al. |
| 2013/0127765 A1 | 5/2013 | Behdasht et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0136304 A1 | 5/2013 | Anabuki et al. |
| 2013/0141388 A1 | 6/2013 | Ludwig et al. |
| 2013/0141395 A1* | 6/2013 | Holmgren ........... G06F 3/04883 345/175 |
| 2013/0141397 A1 | 6/2013 | Dunagan |
| 2013/0154983 A1 | 6/2013 | Christiansson et al. |
| 2013/0155027 A1* | 6/2013 | Holmgren ............... G06F 1/169 345/175 |
| 2013/0155655 A1 | 6/2013 | Lee et al. |
| 2013/0155723 A1 | 6/2013 | Coleman |
| 2013/0158504 A1 | 6/2013 | Ruchti et al. |
| 2013/0162588 A1 | 6/2013 | Wen |
| 2013/0181896 A1 | 7/2013 | Gruhlke et al. |
| 2013/0181908 A1 | 7/2013 | Santiago et al. |
| 2013/0181953 A1 | 7/2013 | Hinckley et al. |
| 2013/0187891 A1 | 7/2013 | Eriksson et al. |
| 2013/0187957 A1 | 7/2013 | Andersson et al. |
| 2013/0201142 A1 | 8/2013 | Suarez Rovere |
| 2013/0205963 A1 | 8/2013 | Prochello et al. |
| 2013/0208506 A1 | 8/2013 | Ye et al. |
| 2013/0222344 A1 | 8/2013 | Lu et al. |
| 2013/0222346 A1 | 8/2013 | Chen et al. |
| 2013/0229357 A1 | 9/2013 | Powell et al. |
| 2013/0234991 A1 | 9/2013 | Sparf |
| 2013/0241886 A1* | 9/2013 | Eriksson ............... G02B 6/0075 362/606 |
| 2013/0241887 A1 | 9/2013 | Sharma |
| 2013/0249833 A1 | 9/2013 | Christiansson et al. |
| 2013/0250354 A1* | 9/2013 | Kato ................... H04N 1/00225 358/1.15 |
| 2013/0254314 A1* | 9/2013 | Chow ..................... H04L 51/08 709/206 |
| 2013/0257793 A1 | 10/2013 | Zeliff et al. |
| 2013/0257810 A1 | 10/2013 | Niu et al. |
| 2013/0263042 A1 | 10/2013 | Buening |
| 2013/0263240 A1 | 10/2013 | Moskovitch |
| 2013/0269867 A1 | 10/2013 | Trott |
| 2013/0271487 A1 | 10/2013 | Lincoln |
| 2013/0275082 A1 | 10/2013 | Follmer et al. |
| 2013/0279190 A1 | 10/2013 | Huang |
| 2013/0285920 A1 | 10/2013 | Colley |
| 2013/0285968 A1 | 10/2013 | Christiansson et al. |
| 2013/0285977 A1 | 10/2013 | Baharav et al. |
| 2013/0300714 A1 | 11/2013 | Goh et al. |
| 2013/0300716 A1 | 11/2013 | Craven-Bartle et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0328790 A1 | 12/2013 | Liu et al. |
| 2013/0342490 A1 | 12/2013 | Wallander et al. |
| 2014/0002400 A1 | 1/2014 | Christiansson et al. |
| 2014/0009430 A1 | 1/2014 | Italia et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1* | 1/2014 | Kapoor ................. G06F 9/5083 709/224 |
| 2014/0035836 A1 | 2/2014 | Cui et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0104190 A1 | 4/2014 | Davidson |
| 2014/0104195 A1 | 4/2014 | Davidson |
| 2014/0109219 A1 | 4/2014 | Rohrweck et al. |
| 2014/0111416 A1 | 4/2014 | Sugiura |
| 2014/0111478 A1 | 4/2014 | Lin et al. |
| 2014/0111480 A1 | 4/2014 | Kim et al. |
| 2014/0118295 A1 | 5/2014 | Motoi |
| 2014/0125633 A1 | 5/2014 | Fåhraeus et al. |
| 2014/0139467 A1 | 5/2014 | Ghosh et al. |
| 2014/0149880 A1 | 5/2014 | Farouki |
| 2014/0152624 A1 | 6/2014 | Piot et al. |
| 2014/0160762 A1 | 6/2014 | Dudik et al. |
| 2014/0168153 A1 | 6/2014 | Deichmann et al. |
| 2014/0192023 A1 | 7/2014 | Hoffman |
| 2014/0204036 A1 | 7/2014 | Schillings et al. |
| 2014/0210793 A1 | 7/2014 | Eriksson et al. |
| 2014/0218467 A1 | 8/2014 | You et al. |
| 2014/0225868 A1 | 8/2014 | Huang et al. |
| 2014/0226084 A1 | 8/2014 | Utukuri et al. |
| 2014/0232669 A1 | 8/2014 | Ohlsson et al. |
| 2014/0237401 A1 | 8/2014 | Krus et al. |

(56) References Cited

U.S. PATENT DOCUMENTS

| | | |
|---|---|---|
| 2014/0237408 A1 | 8/2014 | Ohlsson et al. |
| 2014/0237422 A1 | 8/2014 | Ohlsson et al. |
| 2014/0253514 A1 | 9/2014 | Omura et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0267147 A1 | 9/2014 | Buelow et al. |
| 2014/0292690 A1 | 10/2014 | Sugihara |
| 2014/0292699 A1 | 10/2014 | Ando |
| 2014/0292701 A1 | 10/2014 | Christiansson et al. |
| 2014/0300572 A1 | 10/2014 | Ohlsson et al. |
| 2014/0320459 A1 | 10/2014 | Pettersson et al. |
| 2014/0320460 A1 | 10/2014 | Johansson et al. |
| 2014/0324953 A1 | 10/2014 | Seo et al. |
| 2014/0334767 A1 | 11/2014 | Lim et al. |
| 2014/0347325 A1 | 11/2014 | Wallander et al. |
| 2014/0362046 A1 | 12/2014 | Yoshida |
| 2014/0362053 A1 | 12/2014 | Holmgren et al. |
| 2014/0362404 A1* | 12/2014 | Miyasaka ............ G06F 3/1273 358/1.15 |
| 2014/0367873 A1 | 12/2014 | Yang et al. |
| 2014/0368471 A1 | 12/2014 | Christiansson et al. |
| 2014/0375607 A1 | 12/2014 | Christiansson et al. |
| 2014/0380193 A1 | 12/2014 | Coplen et al. |
| 2015/0002386 A1 | 1/2015 | Mankowski et al. |
| 2015/0002470 A1 | 1/2015 | Zhu et al. |
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0062021 A1 | 3/2015 | Skaljak et al. |
| 2015/0062085 A1 | 3/2015 | Lu et al. |
| 2015/0070327 A1* | 3/2015 | Hsieh ................ G06F 3/0421 345/175 |
| 2015/0083891 A1 | 3/2015 | Wallander |
| 2015/0091832 A1 | 4/2015 | Mizunuma et al. |
| 2015/0092233 A1* | 4/2015 | Park ................ H04N 1/00244 358/1.15 |
| 2015/0103013 A9 | 4/2015 | Huang |
| 2015/0103051 A1 | 4/2015 | Wyrwas et al. |
| 2015/0109403 A1* | 4/2015 | Krishnan ............... H04N 7/152 348/14.08 |
| 2015/0121691 A1 | 5/2015 | Wang |
| 2015/0130769 A1 | 5/2015 | Björklund |
| 2015/0131010 A1 | 5/2015 | Sugiyama |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0154291 A1 | 6/2015 | Shepherd et al. |
| 2015/0160851 A1 | 6/2015 | Michihata et al. |
| 2015/0169948 A1 | 6/2015 | Motoi |
| 2015/0193141 A1 | 7/2015 | Goldsmith et al. |
| 2015/0193585 A1 | 7/2015 | Sunna |
| 2015/0194668 A1 | 7/2015 | Ueda et al. |
| 2015/0199071 A1 | 7/2015 | Hou |
| 2015/0205441 A1 | 7/2015 | Bergström et al. |
| 2015/0212607 A1 | 7/2015 | Miller et al. |
| 2015/0215450 A1 | 7/2015 | Seo et al. |
| 2015/0227261 A1 | 8/2015 | Huang et al. |
| 2015/0242055 A1 | 8/2015 | Wallander |
| 2015/0253568 A1 | 9/2015 | Kobayashi |
| 2015/0256658 A1 | 9/2015 | Shin et al. |
| 2015/0261323 A1 | 9/2015 | Cui et al. |
| 2015/0261375 A1 | 9/2015 | Leigh et al. |
| 2015/0271481 A1 | 9/2015 | Guthrie et al. |
| 2015/0277663 A1 | 10/2015 | Goertz et al. |
| 2015/0286698 A1 | 10/2015 | Gagnier et al. |
| 2015/0286810 A1 | 10/2015 | Lebert |
| 2015/0288327 A1* | 10/2015 | Cherukupalli .......... H02S 40/32 136/251 |
| 2015/0293600 A1 | 10/2015 | Sears |
| 2015/0302026 A1* | 10/2015 | Nam .................... G06F 16/183 707/827 |
| 2015/0309662 A1 | 10/2015 | Wyrwas et al. |
| 2015/0309765 A1* | 10/2015 | Nagahara ............. H04M 3/567 345/2.2 |
| 2015/0317036 A1 | 11/2015 | Johansson et al. |
| 2015/0324028 A1 | 11/2015 | Wassvik et al. |
| 2015/0325848 A1 | 11/2015 | Yamashita et al. |
| 2015/0331461 A1 | 11/2015 | Delano et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0334138 A1 | 11/2015 | Conklin et al. |
| 2015/0334139 A1 | 11/2015 | Conklin et al. |
| 2015/0339000 A1 | 11/2015 | Lee et al. |
| 2015/0346856 A1 | 12/2015 | Wassvik |
| 2015/0346911 A1 | 12/2015 | Christiansson |
| 2015/0363041 A1 | 12/2015 | Zeliff et al. |
| 2015/0363042 A1 | 12/2015 | Krus et al. |
| 2015/0373864 A1 | 12/2015 | Jung |
| 2016/0004898 A1 | 1/2016 | Holz |
| 2016/0021833 A1 | 1/2016 | Nishimura et al. |
| 2016/0026297 A1 | 1/2016 | Shinkai et al. |
| 2016/0026337 A1 | 1/2016 | Wassvik et al. |
| 2016/0034099 A1 | 2/2016 | Christiansson et al. |
| 2016/0034109 A1 | 2/2016 | Cho et al. |
| 2016/0041629 A1 | 2/2016 | Rao et al. |
| 2016/0050263 A1* | 2/2016 | Hwang .......... H04N 21/234363 709/204 |
| 2016/0050746 A1 | 2/2016 | Wassvik et al. |
| 2016/0056471 A1 | 2/2016 | Sugimori et al. |
| 2016/0062549 A1 | 3/2016 | Drumm et al. |
| 2016/0065633 A1* | 3/2016 | Kawakubo ......... H04N 21/4788 715/753 |
| 2016/0070415 A1 | 3/2016 | Christiansson et al. |
| 2016/0070416 A1 | 3/2016 | Wassvik |
| 2016/0092021 A1 | 3/2016 | Tu et al. |
| 2016/0098148 A1 | 4/2016 | Gandra et al. |
| 2016/0098152 A1 | 4/2016 | Drumm et al. |
| 2016/0103026 A1 | 4/2016 | Povazay et al. |
| 2016/0117019 A1 | 4/2016 | Michiaki |
| 2016/0124546 A1 | 5/2016 | Chen et al. |
| 2016/0124551 A1 | 5/2016 | Christiansson et al. |
| 2016/0147375 A1 | 5/2016 | Bok et al. |
| 2016/0077616 A1 | 6/2016 | Durojaiye et al. |
| 2016/0154531 A1 | 6/2016 | Wall |
| 2016/0154532 A1 | 6/2016 | Campbell |
| 2016/0154533 A1 | 6/2016 | Eriksson et al. |
| 2016/0179261 A1 | 6/2016 | Drumm |
| 2016/0195975 A1 | 7/2016 | Baum et al. |
| 2016/0202801 A1 | 7/2016 | Odagiri et al. |
| 2016/0202841 A1 | 7/2016 | Christiansson et al. |
| 2016/0209886 A1 | 7/2016 | Suh et al. |
| 2016/0210306 A1* | 7/2016 | Kumarasamy ........ G06F 16/252 |
| 2016/0216844 A1 | 7/2016 | Bergström |
| 2016/0224144 A1 | 8/2016 | Klinghult et al. |
| 2016/0227381 A1* | 8/2016 | Bargetzi ................ H04B 7/155 |
| 2016/0231833 A1 | 8/2016 | Gu et al. |
| 2016/0239153 A1 | 8/2016 | Holmgren et al. |
| 2016/0246390 A1 | 8/2016 | Lukanc et al. |
| 2016/0253568 A1 | 9/2016 | Idzik et al. |
| 2016/0255713 A1 | 9/2016 | Kim et al. |
| 2016/0269329 A1* | 9/2016 | Willis .................... H04L 51/08 |
| 2016/0295711 A1 | 10/2016 | Ryu et al. |
| 2016/0299583 A1 | 10/2016 | Watanabe |
| 2016/0299593 A1 | 10/2016 | Christiansson et al. |
| 2016/0306501 A1 | 10/2016 | Drumm et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0031516 A1 | 2/2017 | Sugiyama et al. |
| 2017/0075476 A1 | 3/2017 | Kwon et al. |
| 2017/0075484 A1 | 3/2017 | Kali et al. |

(56) References Cited

U.S. PATENT DOCUMENTS

| | | |
|---|---|---|
| 2017/0075494 A1 | 3/2017 | Kwon et al. |
| 2017/0083164 A1 | 3/2017 | Sheng et al. |
| 2017/0090090 A1 | 3/2017 | Craven-Bartle et al. |
| 2017/0090598 A1 | 3/2017 | Morrison et al. |
| 2017/0094224 A1* | 3/2017 | Hasegawa ............ H04L 65/1069 |
| 2017/0102827 A1 | 4/2017 | Christiansson et al. |
| 2017/0115235 A1 | 4/2017 | Ohlsson et al. |
| 2017/0115823 A1 | 4/2017 | Huang et al. |
| 2017/0123257 A1 | 5/2017 | Zhao |
| 2017/0131846 A1 | 5/2017 | Huitema |
| 2017/0139541 A1 | 5/2017 | Christiansson et al. |
| 2017/0147105 A1 | 5/2017 | Kwon et al. |
| 2017/0153763 A1 | 6/2017 | Vavra et al. |
| 2017/0160871 A1 | 6/2017 | Drumm |
| 2017/0177163 A1 | 6/2017 | Wallander et al. |
| 2017/0185186 A1 | 6/2017 | Liu |
| 2017/0185230 A1 | 6/2017 | Wallander et al. |
| 2017/0185269 A1 | 6/2017 | Antilla et al. |
| 2017/0192493 A1 | 7/2017 | Ofek et al. |
| 2017/0192596 A1 | 7/2017 | Lee et al. |
| 2017/0220204 A1 | 8/2017 | Huang et al. |
| 2017/0235537 A1 | 8/2017 | Liu et al. |
| 2017/0237871 A1* | 8/2017 | Fan .................... H04N 1/00482 358/1.13 |
| 2017/0242579 A1 | 8/2017 | Poon et al. |
| 2017/0249030 A1 | 8/2017 | Park et al. |
| 2017/0255337 A1* | 9/2017 | Drumm ................ G06F 3/0428 |
| 2017/0264865 A1 | 9/2017 | Huangfu |
| 2017/0277355 A1 | 9/2017 | Kang |
| 2017/0285789 A1 | 10/2017 | Barel |
| 2017/0293392 A1 | 10/2017 | Christiansson et al. |
| 2017/0308236 A1 | 10/2017 | Lee |
| 2017/0318115 A1* | 11/2017 | Peng ...................... H04W 4/00 |
| 2017/0336891 A1 | 11/2017 | Rosenberg et al. |
| 2017/0344185 A1 | 11/2017 | Ohlsson et al. |
| 2018/0018061 A1 | 1/2018 | Christiansson et al. |
| 2018/0031753 A1 | 2/2018 | Craven-Bartle et al. |
| 2018/0049014 A1 | 2/2018 | Patil et al. |
| 2018/0062158 A1 | 3/2018 | Kim et al. |
| 2018/0074654 A1 | 3/2018 | Tanaka et al. |
| 2018/0107373 A1 | 4/2018 | Cheng |
| 2018/0113569 A1 | 4/2018 | Pommier et al. |
| 2018/0129311 A1 | 5/2018 | Westhues et al. |
| 2018/0129354 A1 | 5/2018 | Christiansson et al. |
| 2018/0136787 A1 | 5/2018 | Echols et al. |
| 2018/0136788 A1 | 5/2018 | He et al. |
| 2018/0149792 A1 | 5/2018 | Lee et al. |
| 2018/0168153 A1 | 6/2018 | Chen et al. |
| 2018/0203557 A1 | 7/2018 | Kim |
| 2018/0204877 A1 | 7/2018 | Jalili et al. |
| 2018/0205989 A1 | 7/2018 | Srinivasan et al. |
| 2018/0210572 A1 | 7/2018 | Wallander et al. |
| 2018/0225006 A1 | 8/2018 | Wall |
| 2018/0235017 A1 | 8/2018 | Sakamoto |
| 2018/0253187 A1 | 9/2018 | Christiansson et al. |
| 2018/0267672 A1 | 9/2018 | Wassvik et al. |
| 2018/0275788 A1 | 9/2018 | Christiansson et al. |
| 2018/0275830 A1 | 9/2018 | Christiansson et al. |
| 2018/0275831 A1 | 9/2018 | Christiansson et al. |
| 2018/0275836 A1 | 9/2018 | Hermans et al. |
| 2018/0279454 A1 | 9/2018 | Takeshita et al. |
| 2018/0293436 A1 | 10/2018 | Jeon et al. |
| 2018/0314206 A1 | 11/2018 | Lee et al. |
| 2018/0349014 A1 | 12/2018 | Samuel et al. |
| 2018/0356940 A1 | 12/2018 | Christiansson et al. |
| 2019/0004668 A1 | 1/2019 | Jeong et al. |
| 2019/0012027 A1 | 1/2019 | Park et al. |
| 2019/0025977 A1 | 1/2019 | Christiansson et al. |
| 2019/0025984 A1 | 1/2019 | Weilbacher et al. |
| 2019/0050074 A1 | 2/2019 | Kocovski |
| 2019/0065030 A1 | 2/2019 | Kang et al. |
| 2019/0079637 A1 | 3/2019 | Kocovski et al. |
| 2019/0079638 A1 | 3/2019 | Kocovski et al. |
| 2019/0094990 A1 | 3/2019 | Fahraeus et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196657 A1 | 6/2019 | Skagmo et al. |
| 2019/0196659 A1 | 6/2019 | Skagmo et al. |
| 2019/0196660 A1 | 6/2019 | Skagmo et al. |
| 2019/0227670 A1 | 7/2019 | O'Cleirigh et al. |
| 2019/0235665 A1 | 8/2019 | Kim et al. |
| 2019/0235701 A1 | 8/2019 | Han et al. |
| 2019/0250755 A1 | 8/2019 | Liu et al. |
| 2019/0250769 A1 | 8/2019 | Wallander |
| 2019/0258353 A1 | 8/2019 | Drumm et al. |
| 2019/0265941 A1* | 8/2019 | Baba .................... G06F 16/955 |
| 2019/0272052 A1 | 9/2019 | Wallander et al. |
| 2019/0317640 A1 | 10/2019 | Christiansson et al. |
| 2019/0324570 A1 | 10/2019 | Kolundzjia et al. |
| 2019/0377431 A1 | 12/2019 | Drumm |
| 2019/0377435 A1 | 12/2019 | Piot et al. |
| 2020/0006761 A1 | 1/2020 | Fujino et al. |
| 2020/0012359 A1 | 1/2020 | Jakobson et al. |
| 2020/0012408 A1 | 1/2020 | Drumm et al. |
| 2020/0064937 A1 | 2/2020 | Wassvik et al. |
| 2020/0064966 A1 | 2/2020 | Kocovski et al. |
| 2020/0073509 A1 | 3/2020 | Shih et al. |
| 2020/0098147 A1 | 3/2020 | Ha et al. |
| 2020/0110508 A1 | 4/2020 | Kocovski et al. |
| 2020/0125189 A1 | 4/2020 | Kim et al. |
| 2020/0150822 A1 | 5/2020 | Christiansson et al. |
| 2020/0159382 A1 | 5/2020 | Drumm |
| 2020/0167033 A1 | 5/2020 | Kim et al. |
| 2020/0173050 A1 | 6/2020 | Curran et al. |
| 2020/0174644 A1 | 6/2020 | Weibull et al. |
| 2020/0177742 A1 | 6/2020 | Homma et al. |
| 2020/0201479 A1 | 6/2020 | Wassvik et al. |
| 2020/0225006 A1 | 7/2020 | Skagmo et al. |
| 2020/0249777 A1 | 8/2020 | Hou et al. |
| 2020/0257405 A1 | 8/2020 | Craven-Bartle et al. |
| 2020/0293136 A1 | 9/2020 | Jakobson et al. |
| 2020/0310592 A1 | 10/2020 | Bergstrom et al. |
| 2020/0310621 A1 | 10/2020 | Piot et al. |
| 2020/0341587 A1 | 10/2020 | Drumm |
| 2020/0348473 A1 | 11/2020 | Drumm |
| 2020/0348817 A1 | 11/2020 | Ohlsson et al. |
| 2020/0387237 A1 | 12/2020 | Drumm |
| 2020/0393935 A1 | 12/2020 | Christiansson et al. |
| 2020/0401270 A1 | 12/2020 | Bergström et al. |
| 2021/0013496 A1 | 1/2021 | Tsuzuki et al. |
| 2021/0026466 A1 | 1/2021 | Andersson et al. |
| 2021/0026587 A1 | 1/2021 | Christiansson et al. |
| 2021/0041970 A1 | 2/2021 | Bergstrom et al. |
| 2021/0050086 A1 | 2/2021 | Rose et al. |
| 2021/0055825 A1 | 2/2021 | Christiansson et al. |
| 2021/0081071 A1 | 3/2021 | Koh et al. |
| 2021/0089164 A1 | 3/2021 | Christiansson et al. |
| 2021/0096604 A1 | 4/2021 | Curran et al. |
| 2021/0096691 A1 | 4/2021 | Skagmo et al. |
| 2021/0103356 A1 | 4/2021 | Christiansson et al. |
| 2021/0173514 A1 | 6/2021 | Kocovski et al. |
| 2021/0173515 A1 | 6/2021 | Skagmo et al. |
| 2021/0255662 A1 | 8/2021 | Svensson et al. |
| 2021/0286464 A1 | 9/2021 | Kocovski et al. |
| 2022/0035481 A1 | 2/2022 | Bergstrom et al. |
| 2022/0109809 A1 | 4/2022 | Wassvik et al. |
| 2022/0221955 A1 | 7/2022 | Bergstrom et al. |
| 2022/0236828 A1 | 7/2022 | Skagmo et al. |
| 2022/0291774 A1 | 9/2022 | Bergström et al. |
| 2022/0413652 A1 | 12/2022 | Andersson et al. |
| 2023/0009306 A1 | 1/2023 | Andreasson |
| 2023/0057020 A1 | 2/2023 | Wassvik |
| 2023/0068643 A1 | 3/2023 | Bergstrom et al. |
| 2023/0080260 A1 | 3/2023 | Bergstrom et al. |
| 2023/0082401 A1 | 3/2023 | Andreasson et al. |
| 2023/0168774 A1 | 6/2023 | Kocovski et al. |
| 2023/0168775 A1 | 6/2023 | Skagmo et al. |
| 2023/0229266 A1 | 7/2023 | Bergstrom et al. |
| 2023/0315234 A1 | 10/2023 | Kocovski et al. |
| 2023/0393692 A1 | 12/2023 | Krus |

(56) References Cited

U.S. PATENT DOCUMENTS

| | | | |
|---|---|---|---|
| 2023/0400948 A1 | 12/2023 | Bergström et al. | |
| 2024/0004501 A1 | 1/2024 | Bergström et al. | |

FOREIGN PATENT DOCUMENTS

| | | | |
|---|---|---|---|
| CA | 2745422 A1 | 6/2010 | |
| CN | 1794157 A | 6/2006 | |
| CN | 201233592 Y | 5/2009 | |
| CN | 101174191 A | 6/2009 | |
| CN | 101644854 A | 2/2010 | |
| CN | 201437963 U | 4/2010 | |
| CN | 201465071 U | 5/2010 | |
| CN | 101882034 | 11/2010 | |
| CN | 102117155 A | 7/2011 | |
| CN | 101019071 B | 6/2012 | |
| CN | 101206550 B | 6/2012 | |
| CN | 102929449 A | 2/2013 | |
| CN | 202887145 U | 4/2013 | |
| CN | 103123556 A | 5/2013 | |
| CN | 203189466 U | 9/2013 | |
| CN | 203224848 U | 10/2013 | |
| CN | 203453994 U | 2/2014 | |
| CN | 101075168 B | 4/2014 | |
| CN | 102414646 B | 4/2014 | |
| CN | 203720812 U | 7/2014 | |
| CN | 203786707 U | 8/2014 | |
| CN | 203786708 U | 8/2014 | |
| CN | 203825586 U | 9/2014 | |
| CN | 204288179 U | 4/2015 | |
| CN | 104808843 A | 7/2015 | |
| CN | 204695282 U | 10/2015 | |
| CN | 105183241 A | 12/2015 | |
| CN | 205015574 U | 2/2016 | |
| CN | 205384833 U | 7/2016 | |
| CN | 106648222 A * | 5/2017 | ........... G06F 1/1626 |
| CN | 206400503 U | 8/2017 | |
| CN | 104391611 A | 9/2017 | |
| CN | 105320382 B | 4/2021 | |
| CN | 113010053 A | 6/2021 | |
| DE | 3511330 C2 | 5/1988 | |
| DE | 68902419 T2 | 3/1993 | |
| DE | 69000920 T2 | 6/1993 | |
| DE | 19809934 A1 | 9/1999 | |
| DE | 10026201 A1 | 12/2000 | |
| DE | 10025175 A1 | 12/2001 | |
| DE | 102009003990 A1 | 7/2010 | |
| DE | 102010000473 A1 | 8/2010 | |
| EP | 0845812 B1 | 6/1998 | |
| EP | 0600576 B1 | 10/1998 | |
| EP | 0931731 A1 | 7/1999 | |
| EP | 1471459 A2 | 10/2004 | |
| EP | 1798630 A2 | 6/2007 | |
| EP | 1835464 A1 | 9/2007 | |
| EP | 0897161 B1 | 10/2007 | |
| EP | 2088501 A1 | 8/2009 | |
| EP | 1512989 B1 | 9/2009 | |
| EP | 2077490 A3 | 1/2010 | |
| EP | 1126236 B1 | 12/2010 | |
| EP | 2314203 A1 | 4/2011 | |
| EP | 2325735 A2 | 5/2011 | |
| EP | 2339437 A3 | 10/2011 | |
| EP | 2442180 A1 | 4/2012 | |
| EP | 2466428 A2 | 6/2012 | |
| EP | 2466429 A1 | 6/2012 | |
| EP | 2479642 A1 | 7/2012 | |
| EP | 1457870 B1 | 8/2012 | |
| EP | 2565770 A2 | 3/2013 | |
| EP | 2765622 A2 | 8/2014 | |
| EP | 2778849 A1 | 9/2014 | |
| EP | 2797143 A1 | 10/2014 | |
| EP | 2840470 | 2/2015 | |
| EP | 2515216 A1 | 3/2016 | |
| EP | 3002666 | 4/2016 | |
| EP | 3043242 A1 | 7/2016 | |
| EP | 3535640 A1 | 9/2019 | |
| EP | 3537269 A1 | 9/2019 | |
| EP | 3644167 A1 | 4/2020 | |
| FR | 2172828 A1 | 10/1973 | |
| FR | 2617619 B1 | 1/1990 | |
| FR | 2614711 B1 | 3/1992 | |
| FR | 2617620 B1 | 9/1992 | |
| FR | 2676275 A1 | 11/1992 | |
| GB | 1380144 A | 1/1975 | |
| GB | 2131544 B | 3/1986 | |
| GB | 2204126 A | 11/1988 | |
| GB | 2263765 A | 8/1993 | |
| GB | 2472444 A | 2/2011 | |
| JP | S62159213 A | 7/1987 | |
| JP | H05190066 A | 7/1993 | |
| JP | 11-085399 A | 3/1999 | |
| JP | 2000506655 A | 5/2000 | |
| JP | 2000172438 A | 6/2000 | |
| JP | 2000-268824 A | 9/2000 | |
| JP | 2000259334 A | 9/2000 | |
| JP | 2000293311 A | 10/2000 | |
| JP | 2003330603 A | 11/2003 | |
| JP | 2005004278 A | 1/2005 | |
| JP | 2008506173 A | 2/2008 | |
| JP | 2009-004139 A | 1/2009 | |
| JP | 2009-543173 A | 12/2009 | |
| JP | 2010-238426 A | 10/2010 | |
| JP | 2011530124 A | 12/2011 | |
| JP | 2015-038862 A | 2/2015 | |
| JP | 2015-049965 A | 3/2015 | |
| JP | 2016192688 | 11/2016 | |
| JP | 6211595 B2 | 10/2017 | |
| JP | 2015158831 A | 2/2018 | |
| KR | 10-2001-0060254 A | 7/2001 | |
| KR | 100359400 | 7/2001 | |
| KR | 100940435 | 2/2010 | |
| KR | 101081586 B1 | 11/2011 | |
| KR | 10-1319543 B1 | 10/2013 | |
| KR | 20150125374 A | 11/2015 | |
| KR | 10-2016-0075643 A | 6/2016 | |
| TW | M517370 U | 2/2016 | |
| WO | WO 1984/003186 A1 | 8/1984 | |
| WO | WO 95/27919 A2 | 10/1995 | |
| WO | 96/10148 A1 | 4/1996 | |
| WO | 96/23649 A1 | 8/1996 | |
| WO | WO 1999/046602 A1 | 9/1999 | |
| WO | 00/50807 A1 | 8/2000 | |
| WO | 01/20781 A1 | 3/2001 | |
| WO | 01/27867 A1 | 4/2001 | |
| WO | WO 01/127867 A1 | 4/2001 | |
| WO | 01/71654 A1 | 9/2001 | |
| WO | WO 01/84251 A2 | 11/2001 | |
| WO | 02/07072 A2 | 1/2002 | |
| WO | WO 02/35460 A1 | 5/2002 | |
| WO | WO 02/077915 A2 | 10/2002 | |
| WO | WO 02/095668 A1 | 11/2002 | |
| WO | 03/41006 A1 | 5/2003 | |
| WO | WO 03/076870 A1 | 9/2003 | |
| WO | WO 2004/032210 A2 | 4/2004 | |
| WO | WO 2004/081502 A2 | 9/2004 | |
| WO | WO 2004/081956 A2 | 9/2004 | |
| WO | WO 2005/026938 A2 | 3/2005 | |
| WO | WO 2005/029172 A2 | 3/2005 | |
| WO | WO 2005/029395 A2 | 3/2005 | |
| WO | WO 2005/125011 A1 | 12/2005 | |
| WO | 2006/003245 A1 | 1/2006 | |
| WO | WO 2006/081633 A1 | 8/2006 | |
| WO | WO 2006/095320 A2 | 9/2006 | |
| WO | WO 2006/124551 A2 | 11/2006 | |
| WO | WO 2007/003196 A2 | 1/2007 | |
| WO | WO 2007/047685 A2 | 4/2007 | |
| WO | WO 2007/058924 A2 | 5/2007 | |
| WO | WO 2007/112742 A1 | 10/2007 | |
| WO | 2008/004097 A2 | 1/2008 | |
| WO | 2008/007372 A2 | 1/2008 | |
| WO | WO 2008/004103 A2 | 1/2008 | |
| WO | WO 2008/007276 A2 | 1/2008 | |
| WO | WO 2008/017077 A2 | 2/2008 | |
| WO | 2008/032270 A2 | 3/2008 | |
| WO | WO 2008/034184 A1 | 3/2008 | |

(56) References Cited

FOREIGN PATENT DOCUMENTS

| | | |
|---|---|---|
| WO | 2008/038066 A2 | 4/2008 |
| WO | WO 2008/039006 A1 | 4/2008 |
| WO | WO 2008/044024 | 4/2008 |
| WO | WO 2008/068607 A2 | 6/2008 |
| WO | WO 2006/124551 B1 | 7/2008 |
| WO | 2009/000289 A1 | 12/2008 |
| WO | 2009/007704 A1 | 1/2009 |
| WO | WO 2008/017077 A4 | 2/2009 |
| WO | WO 2009029764 A1 | 3/2009 |
| WO | WO 2009/048365 A1 | 4/2009 |
| WO | WO 2009/077962 A2 | 6/2009 |
| WO | WO 2009/102681 A2 | 8/2009 |
| WO | 2009/135320 A1 | 11/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | 2010/015410 A2 | 2/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | 2011/031215 A1 | 3/2011 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | 2011/104673 A1 | 9/2011 |
| WO | WO 2011/119483 A1 | 9/2011 |
| WO | WO 2011/139213 A1 | 11/2011 |
| WO | 2012/005051 A1 | 1/2012 |
| WO | 2012/012165 A1 | 1/2012 |
| WO | WO 2012/002894 A1 | 1/2012 |
| WO | WO 2012/010078 A1 | 1/2012 |
| WO | 2012/015810 A2 | 2/2012 |
| WO | WO 2012/018176 A2 | 2/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/171181 | 12/2012 |
| WO | WO 2012/172302 A1 | 12/2012 |
| WO | WO 2012/176801 A1 | 12/2012 |
| WO | 2013/011571 A1 | 1/2013 |
| WO | 2013/014534 A2 | 1/2013 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/081818 | 6/2013 |
| WO | WO 2013/089622 A2 | 6/2013 |
| WO | 2013/108031 A2 | 7/2013 |
| WO | 2013/126005 A2 | 8/2013 |
| WO | WO 2013/115710 A2 | 8/2013 |
| WO | WO 2013/133756 A1 | 9/2013 |
| WO | WO 2013/133757 A2 | 9/2013 |
| WO | WO 2013/138003 | 9/2013 |
| WO | WO 2013/159472 | 10/2013 |
| WO | 2013/165305 A2 | 11/2013 |
| WO | 2013/165306 A2 | 11/2013 |
| WO | WO 2013/176613 A2 | 11/2013 |
| WO | WO 2013/176614 A2 | 11/2013 |
| WO | WO 2013/176615 A2 | 11/2013 |
| WO | 2013/191638 A1 | 12/2013 |
| WO | 2014/016685 A1 | 1/2014 |
| WO | 2014/017973 A1 | 1/2014 |
| WO | 2014/027241 A2 | 2/2014 |
| WO | 2014/037963 A1 | 3/2014 |
| WO | WO 2014/044181 A1 | 3/2014 |
| WO | WO 2014/055809 A1 | 4/2014 |
| WO | WO 2014/065601 | 5/2014 |
| WO | 2014/093937 A1 | 6/2014 |
| WO | WO 2014/086084 A1 | 6/2014 |
| WO | WO 2014/098742 | 6/2014 |
| WO | WO 2014/098744 A1 | 6/2014 |
| WO | WO 2014/104967 A1 | 7/2014 |
| WO | WO 2014/130515 | 8/2014 |
| WO | WO 2014/131221 | 9/2014 |
| WO | 2015/029350 A1 | 3/2015 |
| WO | 2015/084644 A1 | 6/2015 |
| WO | WO 2015/123322 A1 | 8/2015 |
| WO | WO 2015/175586 A1 | 11/2015 |
| WO | 2015/199602 A1 | 12/2015 |
| WO | WO 2016/130074 A1 | 8/2016 |
| WO | 2016/160745 A1 | 10/2016 |
| WO | 2016/177592 A1 | 11/2016 |
| WO | 2017/026821 A1 | 2/2017 |
| WO | WO 2017/099657 | 6/2017 |
| WO | WO 2017/138863 | 8/2017 |
| WO | 2018/003929 A1 | 1/2018 |
| WO | WO 2018/096430 A1 | 5/2018 |
| WO | WO 2018/106172 A1 | 6/2018 |
| WO | WO 2018/106176 | 6/2018 |
| WO | WO 2018/141948 | 8/2018 |
| WO | WO 2018/182476 | 10/2018 |
| WO | WO 2019/045629 | 3/2019 |
| WO | WO 2019/156609 | 8/2019 |
| WO | WO 2019/172826 | 9/2019 |
| WO | WO 2019/172827 | 9/2019 |
| WO | WO 2020/022096 | 1/2020 |
| WO | 2020/078339 A1 | 4/2020 |
| WO | 2020/078749 A1 | 4/2020 |
| WO | 2020/168802 A1 | 8/2020 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Iizuka, K., "Boundaries, Near-Field Optics, and Near-Field Imaging," Elements of Photonics, vol. 1: In Free Space and Special Media, Wiley & Sons, 2002, in 57 pages.
International Search Report for International App. No. PCT/SE2017/050102, dated Apr. 5, 2017, in 4 pages.
International Search Report for International App. No. PCT/SE2018/050871, dated Jan. 25, 2019, in 5 pages.
International Search Report in International Application No. PCT/SE2020/051172 dated Feb. 4, 2021 in 5 pages.
Johnson, M., "Enhanced Optical Touch Input Panel", IBM Technical Disclosure Bulletin, 1985, in 3 pages.
Kak, et al., "Principles of Computerized Tomographic Imaging", Institute of Electrical Engineers, Inc., 1999, in 333 pages.
Kar-Han Tan, Robinson I N, Culbertson B, Apostolopoulos J, 'ConnectBoard: Enable Genuine EyeContact and Accurate Gaze in Remote Collaboration', In: IEEE Transaction on Multimedia, Jun. 2011, vol. 13, No. 3, ISSN: 1520-9210.
The Laser Wall, MIT, 1997, http://web.media.mit.edu/"joep/SpectrumWeb/captions/Laser.html.
Liu, J., et al. "Multiple touch points identifying method, involves starting touch screen, driving specific emission tube, and computing and transmitting coordinate of touch points to computer system by direct lines through interface of touch screen," 2007, in 25 pages.
Machine translation of KR10-2016-0075643 (Year: 2017).

(56) References Cited

OTHER PUBLICATIONS

Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Tedaldi, M., et al. "Refractive index mapping of layered samples using optical coherence refractometry," Proceedings of SPIE, vol. 7171, 2009, in 8 pages.
Supplementary European Search Report for European App. No. EP 16759213, dated Oct. 4, 2018, in 9 pages.
Extended European Search Report for European App. No. 16743795. 3, dated Sep. 11, 2018, in 5 pages.
International Search Report for International App. No. PCT/SE2017/051224, dated Feb. 23, 2018, in 5 pages.
International Search Report for International App. No. PCT/IB2017/057201, dated Mar. 6, 2018, in 4 pages.
Extended European Search Report in European Application No. 19165019.1, dated Jul. 18, 2019 in 8 pages.
International Preliminary Report on Patentability received in International Application No. PCT/SE2017/051233, dated Jun. 11, 2019, in 6 pages.
International Search Report for International App. No. PCT/SE2018/050070, dated Apr. 25, 2018, in 4 pages.
International Search Report / Written Opinion received in International Application No. PCT/SE2021/051151 dated Jan. 26, 2022, in 13 pages.
Extended European Search Report in European Application No. 17750516.1, dated Jul. 16, 2019 in 4 pages.
Extended European Search Report in European Application No. 16873465.5, date Jun. 25, 2019 in 9 pages.
Report on the Filing or Determination of an Action Regarding a Patent or Trademark. For U.S. Pat. No. 10,282,035, U.S. District of Delaware, dated Dec. 10, 2019, in 1 page.
Civil Cover Sheet *FlatFrog Laboratories AB v. Promethean Ltd. and Promethean Inc.*, dated Dec. 10, 2019, in 1 page.
Complaint for Patent Infringement, *FlatFrog Laboratories AB v. Promethean Ltd. and Promethean Inc.*, C.A. No. 19-2246, dated Dec. 10, 2019, in 83 pages.
Executed Summons in a Civil Action to Promethean Inc., C.A. No. 19-2246, dated Dec. 10, 2019 in 2 pages.
Summons in a Civil Action to Promethean Inc., C.A. No. 19-2246, dated Dec. 10, 2019 in 2 pages.
Summons in a Civil Action to Promethean Ltd., C.A. No. 19-2246, dated Dec. 10, 2019 in 2 pages.
Defendants' Answer to Second Amended Complaint and Defendant Promethean Inc.'s Counterclaims Against FlatFrog Laboratories AB., C.A. No. 19-2246, dated May 22, 2020, in 29 pages.
Extended European Search Report for European App. No. 18772370. 5, dated Dec. 9, 2020, in 8 pages.
Extended European Search Report for European App. No. 18772178. 2, dated Dec. 10, 2020, in 8 pages.
Extended European Search Report for European App. No. 18774232. 5, dated Dec. 21, 2020, in 9 pages.
Defendants' Initial Invalidity Contentions, *FlatFrog Laboratories AB v. Promethean Ltd. and Promethean Inc.*, C.A. No. 1:19-cv-02246-MN, dated Apr. 23, 2021, in 26 pages.
Notice of Service, *FlatFrog Laboratories AB v. Promethean Ltd. and Promethean Inc.*, C.A. No. 1:19-cv-02246-MN, dated Apr. 23, 2021, in 2 pages.
Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *FlatFrog Laboratories AB v. Promethean Ltd. and Promethean Inc.*, C.A. No. 1:19-cv-02246-MN, dated Apr. 23, 2021, in 43 pages.
Exhibit 2: Invalidity Claim Chart Against U.S. Pat. No. 10,775,935 Based on U.S. Patent No. U.S. Pre-Grant Pub. No. 2019/0235701 to Han et al., *FlatFrog Laboratories AB v. Promethean Ltd. and Promethean Inc.*, C.A. No. 1:19-cv-02246-MN, dated Apr. 23, 2021, in 16 pages.
Exhibit 3A: Invalidity Claim Chart Against U.S. Pat. No. 10,775,935 Based on U.S. Pat. No. 4,751,379 to Sasaki et al., *FlatFrog Laboratories AB v. Promethean Ltd. and Promethean Inc.*, C.A. No. 1:19-cv-02246-MN, dated Apr. 23, 2021, in 13 pages.
Exhibit 3B: Invalidity Claim Chart Against U.S. Pat. No. 10,775,935 Based on U.S. Pat. No. 4,751,379 to Sasaki et al., *FlatFrog Laboratories AB v. Promethean Ltd. and Promethean Inc.*, C.A. No. 1:19-cv-02246-MN, dated Apr. 23, 2021, in 14 pages.
Exhibit 3C: Invalidity Claim Chart Against U.S. Pat. No. 10,775,935 Based on U.S. Pat. No. 4,751,379 to Sasaki et al., *FlatFrog Laboratories AB v. Promethean Ltd. and Promethean Inc.*, C.A. No. 1:19-cv-02246-MN, dated Apr. 23, 2021, in 13 pages.
Exhibit 4A: Invalidity Claim Chart Against U.S. Pat. No. 10,775,935 Based on U.S. Pre-Grant Pub. No. 2019/0004668 to Jeong et al., *FlatFrog Laboratories AB v. Promethean Ltd. and Promethean Inc.*, C.A. No. 1:19-cv-02246-MN, dated Apr. 23, 2021, in 14 pages.
Exhibit 4B: Invalidity Claim Chart Against U.S. Pat. No. 10,775,935 Based on U.S. Pre-Grant Pub. No. 2019/0004668 to Jeong et al., *FlatFrog Laboratories AB v. Promethean Ltd. and Promethean Inc.*, C.A. No. 1:19-cv-02246-MN, dated Apr. 23, 2021, in 15 pages.
Exhibit 4C: Invalidity Claim Chart Against U.S. Pat. No. 10,775,935 Based on U.S. Pre-Grant Pub. No. 2019/0004668 to Jeong et al., *FlatFrog Laboratories AB v. Promethean Ltd. and Promethean Inc.*, C.A. No. 1:19-cv-02246-MN, dated Apr. 23, 2021, in 14 pages.
Exhibit 5A: Invalidity Claim Chart Against U.S. Pat. No. 10,775,935 Based on U.S. Pat. No. 9,983,626 to Cao et al., *FlatFrog Laboratories AB v. Promethean Ltd. and Promethean Inc.*, C.A. No. 1:19-cv-02246-MN, dated Apr. 23, 2021, in 13 pages.
Exhibit 5B: Invalidity Claim Chart Against U.S. Pat. No. 10,775,935 Based on U.S. Pat. No. 9,983,626 to Cao et al., *FlatFrog Laboratories AB v. Promethean Ltd. and Promethean Inc.*, C.A. No. 1:19-cv-02246-MN, dated Apr. 23, 2021, in 15 pages.
Exhibit 5C: Invalidity Claim Chart Against U.S. Pat. No. 10,775,935 Based on U.S. Pat. No. 9,983,626 to Cao et al., *FlatFrog Laboratories AB v. Promethean Ltd. and Promethean Inc.*, C.A. No. 1:19-cv-02246-MN, dated Apr. 23, 2021, in 13 pages.
Exhibit 6A: Invalidity Claim Chart Against U.S. Pat. No. 10,775,935 Based on U.S. Pre-Grant Pub. No. 2019/0025984 to Weilbacher et al., *FlatFrog Laboratories AB v. Promethean Ltd. and Promethean Inc.*, C.A. No. 1:19-cv-02246-MN, dated Apr. 23, 2021, in 9 pages.
Exhibit 6B: Invalidity Claim Chart Against U.S. Pat. No. 10,775,935 Based on U.S. Pre-Grant Pub. No. 2019/0025984 to Weilbacher et al., *FlatFrog Laboratories AB v. Promethean Ltd. and Promethean Inc.*, C.A. No. 1:19-cv-02246-MN, dated Apr. 23, 2021, in 9 pages.
Exhibit 6C: Invalidity Claim Chart Against U.S. Pat. No. 10,775,935 Based on U.S. Pre-Grant Pub. No. 2019/0025984 to Weilbacher et al., *FlatFrog Laboratories AB v. Promethean Ltd. and Promethean Inc.*, C.A. No. 1:19-cv-02246-MN, dated Apr. 23, 2021, in 9 pages.
Exhibit 7A: Invalidity Claim Chart Against U.S. Pat. No. 10,775,935 Based on U.S. Pat. No. 9,207,800 to Eriksson et al., *FlatFrog Laboratories AB v. Promethean Ltd. and Promethean Inc.*, C.A. No. 1:19-cv-02246-MN, dated Apr. 23, 2021, in 9 pages.
Exhibit 7B: Invalidity Claim Chart Against U.S. Pat. No. 10,775,935 Based on U.S. Pat. No. 9,207,800 to Eriksson et al., *FlatFrog Laboratories AB v. Promethean Ltd. and Promethean Inc.*, C.A. No. 1:19-cv-02246-MN, dated Apr. 23, 2021, in 9 pages.
Exhibit 7C: Invalidity Claim Chart Against U.S. Pat. No. 10,775,935 Based on U.S. Pat. No. 9,207,800 to Eriksson et al., *FlatFrog Laboratories AB v. Promethean Ltd. and Promethean Inc.*, C.A. No. 1:19-cv-02246-MN, dated Apr. 23, 2021, in 9 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *FlatFrog Laboratories AB v. Promethean Ltd. and Promethean Inc.*, C.A. No. 1:19-cv-02246-MN, dated Apr. 23, 2021, in 21 pages.
Exhibit 9: Invalidity Claim Chart Against U.S. Pat. No. 10,739,916 Based on Chinese Utility Model No. CN 203786707 U to Chen et al., *FlatFrog Laboratories AB v. Promethean Ltd. and Promethean Inc.*, C.A. No. 1:19-cv-02246-MN, dated Apr. 23, 2021, in 4 pages.

(56) References Cited

OTHER PUBLICATIONS

Exhibit 10: Invalidity Claim Chart Against U.S. Pat. No. 10,739,916 Based on International App. Pub. No. WO2014131221 to Chen et al., *FlatFrog Laboratories AB v. Promethean Ltd. and Promethean Inc.*, C.A. No. 1:19-cv-02246-MN, dated Apr. 23, 2021, in 4 pages.
Exhibit 11: Invalidity Claim Chart Against U.S. Pat. No. 10,739,916 Based on Chinese Pub. App. No. 104391611 A to Hu et al., *FlatFrog Laboratories AB v. Promethean Ltd. and Promethean Inc.*, C.A. No. 1:19-cv-02246-MN, dated Apr. 23, 2021, in 4 pages.
Exhibit 12: Invalidity Claim Chart Against U.S. Pat. No. 10,739,916 Based on Chinese Utility Model No. 203786708 U to Cao, *FlatFrog Laboratories AB v. Promethean Ltd. and Promethean Inc.*, C.A. No. 1:19-cv-02246-MN, dated Apr. 23, 2021, in 4 pages.
Exhibit 13: Invalidity Claim Chart Against U.S. Pat. No. 10,739,916 Based on Chinese Utility Model No. 204288179 U to Mo et al., *FlatFrog Laboratories AB v. Promethean Ltd. and Promethean Inc.*, C.A. No. 1:19-cv-02246-MN, dated Apr. 23, 2021, in 4 pages.
Defendants Promethean Ltd. and Promethean Inc.'s Preliminary Proposed Claim Constructions, *FlatFrog Laboratories AB v. Promethean Ltd. and Promethean Inc.*, C.A. No. 1:19-cv-02246-MN, dated May 24, 2021, in 8 pages.
Defendants' Sur-Reply Claim Construction Brief, *FlatFrog Laboratories AB v. Promethean Ltd. and Promethean Inc.*, C.A. No. 1:19-cv-02246-MN, dated Sep. 13, 2021, in 24 pages.
ASTM International, "Standard Specification for Heat-Treated Flat Glass-Kind HS, Kind FT Coated and Uncoated Glass," Designation: C 1048-04, in 7 pages.
British Standard, "Glass in building—Thermally toughened soda lime silicate safety glass," EN 12150-1:2000, ISBN 0 580 36171 3, Aug. 15, 2000, in 28 pages.
Joint Claim Construction Brief, *FlatFrog Laboratories AB v. Promethean Ltd. and Promethean Inc.*, C.A. No. 1:19-cv-02246-MN, dated Sep. 20, 2021, in 92 pages.
Joint Appendix of Exhibits to Joint Claim Construction Brief, *FlatFrog Laboratories AB v. Promethean Ltd. and Promethean Inc.*, C.A. No. 1:19-cv-02246-MN, dated Sep. 20, 2021, in 127 pages, (uploaded in 4 parts, part 1 of 4).
Joint Appendix of Exhibits to Joint Claim Construction Brief, *FlatFrog Laboratories AB v. Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *FlatFrog Laboratories AB v. Promethean Ltd. and Promethean Inc.*, C.A. No. 1:19-cv-02246-MN, dated Sep. 20, 2021, in 65 pages, (uploaded in 4 parts, part 3 of 4).
Joint Appendix of Exhibits to Joint Claim Construction Brief, *FlatFrog Laboratories AB v. Promethean Ltd. and Promethean Inc.*, C.A. No. 1:19-cv-02246-MN, dated Sep. 20, 2021, in 128 pages, (uploaded in 4 parts, part 4 of 4).
International Search Report in PCT/SE2019/050189 dated May 29, 2019 in 5 pages.
International Search Report for International App. No. PCT/SE2019/050953, dated Nov. 26, 2019, in 4 pages.
International Search Report for International App. No. PCT/SE2020/050043, dated Feb. 24, 2020, in 5 pages.
International Search Report for International App. No. PCT/SE2020/050504, dated Sep. 4, 2020, in 5 pages.
International Search Report in App. No. PCT/SE2020/051117 dated Feb. 5, 2021 in 2 pages.
International Search Report in International Application No. PCT/SE2021/050040 dated May 10, 2021 in 3 pages.
International Search Report in International App. No. PCT/SE2021/050086 dated Feb. 26, 2021 in 6 pages.
International Search Report in International Application No. PCT/SE2021/050095 dated Jun. 2, 2021 in 7 pages.
International Search Report / Written Opinion of the International Searching Authority for PCT/SE2021/051018, dated Feb. 1, 2022, in 10 pages.

Anderson, R. Rox, B.S., and John A. Parrish, M.D. "The Optics of Human Skin." Journal of Investigative Dermatology 77.1 (1981): 13-19.
Barzilai et al., "Two-Point Step Size Gradient Methods", IMA Journal of Numerical Analysis, 1988, pp. 141-148.
Bose, R, "Strongly regular graphs, partial geometries and partially balanced designs", Pacific J. Math., vol. 13, No. 2 (1963), pp. 389-419.
Chen. Yhun, "Using micro-structures to couple light into thin light-guides," Master Of Science Thesis, Stockholm, 2011.
Communication pursuant to Article 94(3) in EP Application No. 20816652.0 dated Feb. 16, 2024.
Cornelissen, Hugo J. et al. "Injecting Light of High-Power LEDs into Thin Light Guides." Proc. SPIE 7652. International Optical Design Conference (2010): 7652121-7652126.
Ericson, Chris, "Real-Time Collision Detection", The Morgan Kaufmann Series in Interactive 30 Technology (2005) Chapters 5-9, pp. 125-412.
European Examination Report dated Aug. 3, 2015 issued in corresponding European Application No. 12860074.9.
European Office Action issued in European Patent Application No. 13183545, dated Feb. 12, 2014.
European Search Report dated Apr. 19, 2012 issued in European Application No. 09830665.7.
European Search Report dated Jan. 23, 2014 issued in corresponding European Appln. No. 13183545.6.
European Search Report issued in European Application No. 11777650.0, dated Nov. 22, 2013.
Extended (Supplementary) European Search Report dated Apr. 30, 2021, issued in counterpart EP application No. 19775915.2. (8 pages).
Farghal, et al., "Electromagnetic Modeling of Outcoupling Efficiency and Light Emission In Near-Infrared Quantum Dot Light Emitting Devices", published in Progress In Electromagnetics Research B., vol. 24, 263-284, 2010.
Final Office Action dated Nov. 24, 2017 in U.S. Appl. No. 14/652,757.
Final Office Action issued Nov. 30, 2017 in U.S. Appl. No. 14/652,736.
Giphy | Stickers | Closer Look Sticker by Cavan Infante, posted on May 24, 2019 by Cavan Infante, no copyright date posted [online], [site visited Oct. 13, 2020], Available from Internet, <URL: https://giphy.com/stickers/circle-underline-cavan-ZbB9lCitwN43fJvNSz/>.
Golub et al., "Matrix Computations", Third Edition, The Johns Hopkins University Press, 1996, 716 pages.
Golub et al: "Matrix Norms" in: "Matrix Computations" Aug. 21, 2005 (Aug. 21, 2005), Johns Hopkins University Press, pp. 54-59.s.
Holzammer, Andreas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf *.
Horwood, A. et al: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_1mageNormali zation.pdf*Paae 9, line 1-Paae 14, line 1*.
International Preliminary Report on Patentability received for PCT Patent Application No. PCT/EP2018/052757, mailed on Aug. 15, 2019, 7 pages.
International Preliminary Report on Patentability received for PCT Patent Application No. PCT/EP2019/077054, mailed on Apr. 29, 2021, 7 pages.
International Preliminary Report on Patentability received for PCT Patent Application No. PCT/IB2017/057201, mailed on Jun. 6, 2019, 8 pages.
International Preliminary Report on Patentability received for PCT Patent Application No. PCT/JP2019/001801, mailed on Oct. 15, 2020, 12 pages (6 pages of English Translation and 6 pages of Original Document).
International Preliminary Report on Patentability received for PCT Patent Application No. PCT/SE2009/051364, mailed on Jun. 16, 2011, 11 pages.

(56) References Cited

OTHER PUBLICATIONS

International Preliminary Report on Patentability received for PCT Patent Application No. PCT/SE2011/050520, mailed on Nov. 15, 2012, 6 pages.
International Preliminary Report on Patentability received for PCT Patent Application No. PCT/SE2011/050871, mailed on Jan. 17, 2013, 10 pages.
International Preliminary Report on Patentability received for PCT Patent Application No. PCT/SE2012/050086, mailed on Aug. 15, 2013, 8 pages.
International Preliminary Report on Patentability received for PCT Patent Application No. PCT/SE2012/051419, mailed on Jul. 3, 2014, 6 pages.
International Preliminary Report on Patentability received for PCT Patent Application No. PCT/SE2013/050064, mailed on Aug. 14, 2014, 7 pages.
International Preliminary Report on Patentability received for PCT Patent Application No. PCT/SE2013/050137, mailed on Sep. 4, 2014, 6 pages.
International Preliminary Report on Patentability received for PCT Patent Application No. PCT/SE2013/050473, mailed on Nov. 13, 2014, 8 pages.
International Preliminary Report on Patentability received for PCT Patent Application No. PCT/SE2013/050585, mailed on Dec. 4, 2014, 10 pages.
International Preliminary Report on Patentability received for PCT Patent Application No. PCT/SE2013/051044, mailed on Mar. 26, 2015, 7 pages.
International Preliminary Report on Patentability received for PCT Patent Application No. PCT/SE2013/051533, mailed on Jul. 2, 2015, 8 pages.
International Preliminary Report on Patentability received for PCT Patent Application No. PCT/SE2013/051534, mailed on Jul. 2, 2015, 8 pages.
International Preliminary Report on Patentability received for PCT Patent Application No. PCT/SE2013/051537, mailed on Jul. 2, 2015, 9 pages.
International Preliminary Report on Patentability received for PCT Patent Application No. PCT/SE2014/050435, mailed on Oct. 22, 2015, 8 pages.
International Preliminary Report on Patentability received for PCT Patent Application No. PCT/SE2014/050437, mailed on Oct. 22, 2015, 6 pages.
International Preliminary Report on Patentability received for PCT Patent Application No. PCT/SE2014/050438, mailed on Oct. 22, 2015, 6 pages.
International Preliminary Report on Patentability received for PCT Patent Application No. PCT/SE2014/050701, mailed on Jan. 21, 2016, 8 pages.
International Preliminary Report on Patentability received for PCT Patent Application No. PCT/SE2014/051363, mailed on Jun. 2, 2016, 6 pages.
International Preliminary Report on Patentability received for PCT Patent Application No. PCT/SE2015/050041, mailed on Jul. 28, 2016, 10 pages.
International Preliminary Report on Patentability received for PCT Patent Application No. PCT/SE2015/050042, mailed on Jul. 28, 2016, 10 pages.
International Preliminary Report on Patentability received for PCT Patent Application No. PCT/SE2015/050043, mailed on Jul. 28, 2016, 9 pages.
International Preliminary Report on Patentability received for PCT Patent Application No. PCT/SE2015/050044, mailed on Jul. 28, 2016, 8 pages.
International Preliminary Report on Patentability received for PCT Patent Application No. PCT/SE2015/050724, mailed on Jan. 5, 2017, 7 pages.
International Preliminary Report on Patentability received for PCT Patent Application No. PCT/SE2016/050053, mailed on Aug. 10, 2017, 13 pages.
International Preliminary Report on Patentability received for PCT Patent Application No. PCT/SE2016/050098, mailed on Aug. 24, 2017, 9 pages.
International Search Report and Written Opinion received for PCT Patent Application No. PCT/SE2016/050098, mailed on Jun. 29, 2016, 13 pages.
International Search Report and Written Opinion received for PCT Patent Application No. PCT/SE2016/050155, mailed on Jul. 15, 2016, 10 pages.
International Search Report and Written Opinion received for PCT Patent Application No. PCT/SE2016/051229, mailed on Mar. 10, 2017, 18 pages.
International Search Report and Written Opinion received for PCT Patent Application No. PCT/SE2017/051233, mailed on Mar. 12, 2018, 10 pages.
International Search Report and Written Opinion received for PCT Patent Application No. PCT/SE2018/050109, mailed on May 3, 2018, 15 pages.
International Search Report and Written Opinion received for PCT Patent Application No. PCT/SE2018/050817, mailed on Jan. 28, 2019, 12 pages.
International Search Report and Written Opinion received for PCT Patent Application No. PCT/SE2018/050896, mailed on Nov. 27, 2018, 13 pages.
International Search Report and Written Opinion received for PCT Patent Application No. PCT/SE2019/050193, mailed on Apr. 10, 2019, 11 pages.
International Search Report and Written Opinion received for PCT Patent Application No. PCT/SE2019/050195, mailed on Jun. 12, 2019, 13 pages.
International Search Report and Written Opinion received for PCT Patent Application No. PCT/SE2022/050139, mailed on Apr. 8, 2022, 12 pages.
International Search Report dated Sep. 25, 2015, in connection with SE 1550087-9 filed on Jan. 28, 2015.
International Search Report received for PCT Patent Application No. PCT/SE2015/050087, mailed on May 6, 2015, 4 pages.
International Search Report received for PCT Patent Application No. PCT/SE2018/050871, mailed on Jan. 25, 2019, 5 pages.
International Search Report received for PCT Patent Application No. PCT/SE2020/050043, mailed on Feb. 24, 2020, 5 pages.
International Search Report received for PCT Patent Application No. PCT/SE2021/050086, mailed Feb. 26, 2021, 6 pages.
Japanese Office Action issued in Japanese Patent Applicaiton No. 2011-539479, dated Feb. 25, 2014.
Joseph O'Rourke, "Computational Geometry In C", Second Edition, Cambridge University Press, (1998), pp. 252-264.
Kak, Avinash C. and Malcolm Slaney. Principles of Computerized Tomographic Imaging. New York: IEEE Press, 1988.
Machine translation of JP 11-85399 (Year: 1999).
Maximilian Karl: "Entwicklung und Bau einer neuartigen Mehrfinger-Touchscreen basierend auf frustrierter Totalreflexion," Landeswettbewerb in Bayern 2008 Jugend Forscht, Apr. 1, 2008.
McBeth, "Randi, the Badly Drawn Horse", Giphy, Online Available at https://giphy.com/stories/randy-the-badly-drawn-horse-258d6753-fb29, retrieved on Aug. 24, 2023, 15 pages.
Mu, Cong et al. "Dielectric multilayer angular filters for coupling LEDs to thin light guides." Proc SPIE 8170 (2011): 817001-1-817001-10.
Non-Final Office Action dated May 4, 2017 in U.S. Appl. No. 14/652,757.
Non-Final Office Action issued Jun. 14, 2018 in U.S. Appl. No. 14/652,757.
Non-Final Office Action issued Jun. 20, 2018 in U.S. Appl. No. 14/652,736.
Non-Final Office Action issued Mar. 23, 2017 in U.S. Appl. No. 14/652,736.
Office Action dated Aug. 13, 2015, in connection with Sweden Application No. 1550096-0, filed Jan. 30, 2015.
Panzer, et al., "Tunable Infrared Emission From Printed Colloidal Quantum Dot/Polymer Composite Films on Flexible Substrates", published in Journal of Display Technology, vol. 6, No. 3, Mar. 2010.

(56) References Cited

OTHER PUBLICATIONS

Press et al., "Numerical Recipes The Art of Scientific Computing", Third Edition, Cambridge University Press, 2007, pp. 1-1235.
Scheuplein, Robert J., Ph.D. "A Survey of Some Fundamental Aspects of the Absorption and Reflection of Light by Tissue." J. Soc. Cos. Chem. 15 (1964): 111-122.
Supplemental ESR dated Aug. 27, 2015 issued in corresponding EP Appin No. 13752508.
Supplementary European Search Report dated Aug. 14, 2015 issued in corresponding European Application No. 13744212.
Supplementary European Search Report for European App. No. EP 13752508, dated Aug. 27, 2015.
Supplementary European Search Report for European App. No. EP 16749542, dated Sep. 17, 2018, in 9 pages.
Swedish Search Report dated Dec. 22, 2014 issued in corresponding Swedish Application No. 1450651-3.
Swedish Search Report dated Dec. 11, 2013 issued in corresponding Swedish Application No. 1350181-2.
Thomas, G.L et al., "Some observations on fingerprint deposits." J. Phys. D: Appl. Phys. 8 (1975): 724-729.
Tympanus/Codrops | Animated Mesh Lines, posted on Jan. 8, 2019 by Jeremie Boulay, © Codrops 2020 [online], [site visited Oct. 13, 2020], Available from Internet, <URL: https://tympanus.net/codrops/2019/01/08/animated-mesh-lines/>.
International Preliminary Report on Patentability received for PCT Patent Application No. PCT/SE2016/050155, mailed on Sep. 14, 2017, 7 pages.
International Preliminary Report on Patentability received for PCT Patent Application No. PCT/SE2016/051229, mailed on Jun. 21, 2018, 15 pages.
International Preliminary Report on Patentability received for PCT Patent Application No. PCT/SE2017/050102, mailed on Aug. 23, 2018, 9 pages.
International Preliminary Report on Patentability received for PCT Patent Application No. PCT/SE2017/051224, mailed on Feb. 26, 2019, 13 pages.
International Preliminary Report on Patentability received for PCT Patent Application No. PCT/SE2018/050070, mailed on Aug. 22, 2019, 10 pages.
International Preliminary Report on Patentability received for PCT Patent Application No. PCT/SE2018/050109, mailed on Oct. 10, 2019, 12 pages.
International Preliminary Report on Patentability received for PCT Patent Application No. PCT/SE2018/050817, mailed on Mar. 5, 2020, 9 pages.
International Preliminary Report on Patentability received for PCT Patent Application No. PCT/SE2018/050896, mailed on Mar. 19, 2020, 10 pages.
International Preliminary Report on Patentability received for PCT Patent Application No. PCT/SE2019/050189, mailed on Sep. 17, 2020, 9 pages.
International Preliminary Report on Patentability received for PCT Patent Application No. PCT/SE2019/050190, mailed on Sep. 17, 2020, 8 pages.
International Preliminary Report on Patentability received for PCT Patent Application No. PCT/SE2019/050193, mailed on Sep. 17, 2020, 8 pages.
International Preliminary Report on Patentability received for PCT Patent Application No. PCT/SE2019/050195, mailed on Oct. 1, 2020, 10 pages.
International Preliminary Report on Patentability received for PCT Patent Application No. PCT/SE2019/050953, mailed on Apr. 29, 2021, 11 pages.
International Preliminary Report on Patentability received for PCT Patent Application No. PCT/SE2020/050504, mailed on Dec. 2, 2021, 10 pages.
International Preliminary Report on Patentability received for PCT Patent Application No. PCT/SE2020/051117, mailed on Jun. 9, 2022, 10 pages.
International Preliminary Report on Patentability received for PCT Patent Application No. PCT/SE2020/051172, mailed on Jun. 16, 2022, 8 pages.
International Preliminary Report on Patentability received for PCT Patent Application No. PCT/SE2021/050040, mailed on Aug. 25, 2022, 13 pages.
International Preliminary Report on Patentability received for PCT Patent Application No. PCT/SE2021/050095, mailed on Aug. 18, 2022, 11 pages.
International Preliminary Report on Patentability received for PCT Patent Application No. PCT/SE2021/051018, mailed on May 4, 2023, 8 pages.
International Preliminary Report on Patentability received for PCT Patent Application No. PCT/SE2021/051151, mailed on Jun. 1, 2023, 10 pages.
International Preliminary Report on Patentability received for PCT Patent Application No. PCT/SE22/050139, mailed on Aug. 24, 2023, 9 pages.
International Search Report and Written Opinion for International App. No. PCT/SE2019/050343, dated Sep. 3, 2019, in 13 pages.
International Search Report and Written Opinion issued in International Application No. PCT/SE2010/051103 dated Jan. 25, 2011.
International Search Report and Written Opinion issued in International Application No. PCT/SE2010/051105 dated Nov. 16, 2010.
International Search Report and Written Opinion issued in International Application No. PCT/SE2010/051107 dated Jan. 24, 2011.
International Search Report and Written Opinion received for PCT Patent Application No. PCT/SE2013/050064, mailed on Sep. 12, 2013, 10 pages.
International Search Report and Written Opinion received for PCT Patent Application No. PCT/SE2019/050190, mailed on Jun. 12, 2019, 11 pages.
International Search Report and Written Opinion received for PCT Patent Application No. PCT/EP2018/052757, mailed on Apr. 23, 2018, 9 pages.
International Search Report and Written Opinion received for PCT Patent Application No. PCT/EP2019/077054, mailed on Jan. 10, 2020, 9 pages.
International Search Report and Written Opinion received for PCT Patent Application No. PCT/JP2019/001801, mailed on Apr. 23, 2019, 13 pages (6 pages of English Translation and 7 pages of Original Document).
International Search Report and Written Opinion received for PCT Patent Application No. PCT/SE2009/051364, mailed on May 4, 2010, 15 pages.
International Search Report and Written Opinion received for PCT Patent Application No. PCT/SE2011/050520, mailed on Aug. 18, 2011, 8 pages.
International Search Report and Written Opinion received for PCT Patent Application No. PCT/SE2012/051419, mailed on Aug. 26, 2013, 8 pages.
International Search Report and Written Opinion received for PCT Patent Application No. PCT/SE2013/050137, mailed on Oct. 15, 2013, 9 pages.
International Search Report and Written Opinion received for PCT Patent Application No. PCT/SE2013/050473, mailed on Feb. 3, 2014, 11 pages.
International Search Report and Written Opinion received for PCT Patent Application No. PCT/SE2013/050585, mailed on Jan. 21, 2014, 13 pages.
International Search Report and Written Opinion received for PCT Patent Application No. PCT/SE2013/051044, mailed on Mar. 20, 2014, 9 pages.
International Search Report and Written Opinion received for PCT Patent Application No. PCT/SE2013/051533, mailed on Apr. 15, 2014, 10 pages.
International Search Report and Written Opinion received for PCT Patent Application No. PCT/SE2013/051534, mailed on May 6, 2014, 11 pages.
International Search Report and Written Opinion received for PCT Patent Application No. PCT/SE2013/051537, mailed on Apr. 25, 2014, 12 pages.

(56) References Cited

OTHER PUBLICATIONS

International Search Report and Written Opinion received for PCT Patent Application No. PCT/SE2014/050435, mailed on Jun. 12, 2014, 11 pages.
International Search Report and Written Opinion received for PCT Patent Application No. PCT/SE2014/050437, mailed on Jul. 1, 2014, 9 pages.
International Search Report and Written Opinion received for PCT Patent Application No. PCT/SE2014/050438, mailed on Jul. 1, 2014, 9 pages.
International Search Report and Written Opinion received for PCT Patent Application No. PCT/SE2014/050701, mailed on Nov. 6, 2014, 11 pages.
International Search Report and Written Opinion received for PCT Patent Application No. PCT/SE2014/051363, mailed on Feb. 12, 2015, 9 pages.
International Search Report and Written Opinion received for PCT Patent Application No. PCT/SE2015/050041, mailed on Apr. 29, 2015, 12 pages.
International Search Report and Written Opinion received for PCT Patent Application No. PCT/SE2015/050042, mailed on Sep. 28, 2015, 14 pages.
International Search Report and Written Opinion received for PCT Patent Application No. PCT/SE2015/050044, mailed on May 19, 2015, 11 pages.
International Search Report and Written Opinion received for PCT Patent Application No. PCT/SE2015/050724, mailed on Oct. 6, 2015, 10 pages.
International Search Report and Written Opinion received for PCT Patent Application No. PCT/SE2016/050053, mailed on May 2, 2016, 16 pages.

* cited by examiner

OPTICAL COMPONENT

TECHNICAL FIELD

The present invention relates to touch-sensing apparatus that operate by propagating light by diffusive light scattering above a panel, and in particular to optical and mechanical solutions for defining the light paths over the panel. The present invention relates furthermore to a method of assembling a touch sensing apparatus.

BACKGROUND ART

In one category of touch-sensitive panels known as 'above surface optical touch systems', a set of optical emitters are arranged around the periphery of a touch surface to emit light that is reflected to travel above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors.

Some prior art systems rely on coupling and propagation of collimated light across the light transmissive panel. Such systems are cumbersome to reliably implement due to the small tolerances with respect to the alignment of the components thereof. E.g. the light emitters- and detectors need to be precisely aligned in relation to various lenses and reflect the light via concave and/or convex reflection and/or refraction to get the desired collimation. Such precise alignment may be difficult to achieve in mass production. The use of collimated light also adds to this complexity, which in turn results in a more expensive and less compact system. Furthermore, to reduce system cost, it may be desirable to minimize the number of electro-optical components.

BRIEF DESCRIPTION OF DRAWINGS

These and other aspects, features and advantages of which examples of the invention are capable of will be apparent and elucidated from the following description of examples of the present invention, reference being made to the accompanying drawings, in which.

SUMMARY

Figure 1A:
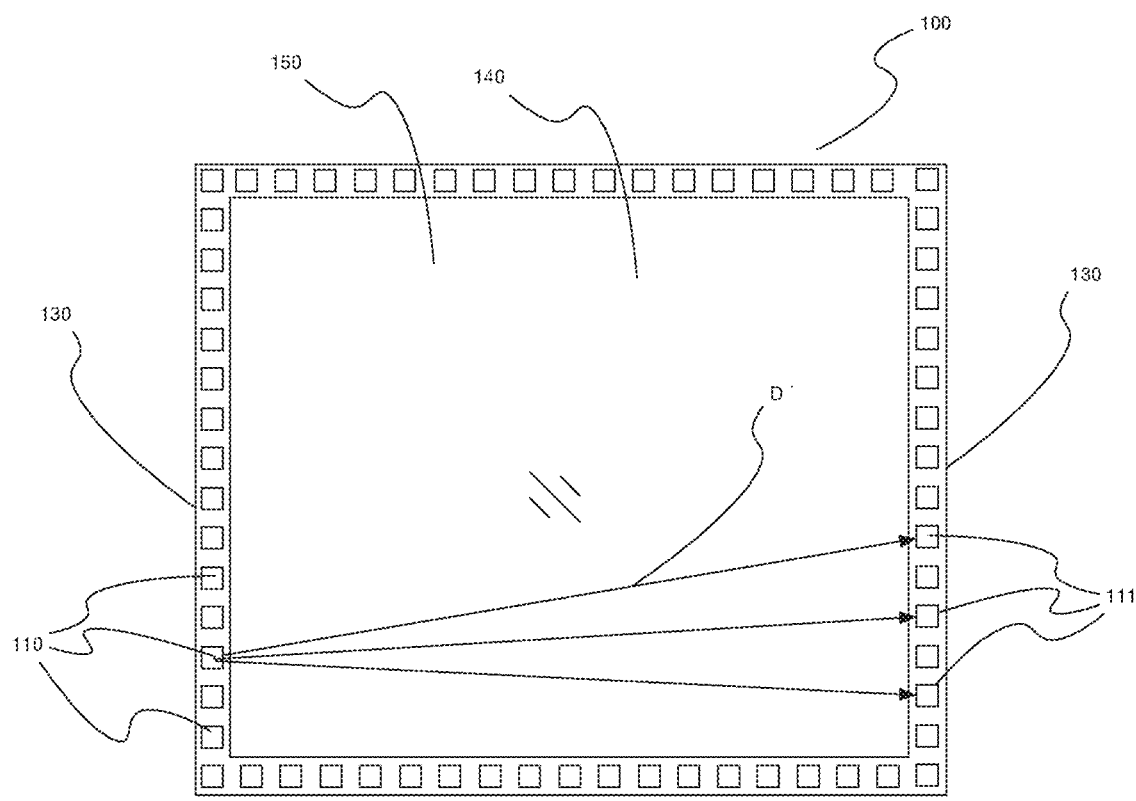
FIGS. 1a, 1b, 1c shows an embodiment with a diffusive transmissive light guide configured to direct and receive light around the edge of the panel.

It is an objective of the invention to at least partly overcome one or more of the above-identified limitations of the prior art.

One or more of these objectives, as well as further objectives that may appear from the description below, are at least partly achieved by means of a method for data processing, a computer readable medium, devices for data processing, and a touch-sensing apparatus according to the independent claims, embodiments thereof being defined by the dependent claims.

An aspect of the invention provides a touch sensing apparatus, comprising: a light transmissive panel that defines a touch surface, a plurality of light emitters and detectors arranged along a perimeter of the light transmissive panel, a plurality of optical components arranged along the perimeter of the light transmissive panel, wherein the light emitters are arranged to emit a respective beam of emitted light and the optical components are configured to direct the emitted light to a path across the light transmissive panel. Optionally, optical components comprise a light guide arranged to receive light from the light emitters through a first surface and couple out light travelling in the light guide to the touch surface through a second surface. The second surface may be diffusively transmissive. The light guide may further comprise a reflective surface configured to internally reflect light travelling in the light guide from the first surface to the diffusive surface. The reflective surface may be diffusely reflective, partially diffusely reflective, or specularly reflective.

The reflective surface may be coated by at least one of a high refractive index coating and a scratch resistant coating. At least one of the first and or second surfaces may comprise a dioptric power. At least one of the first and or second surfaces may comprise a corrugation. A ditch may be formed between the second surface and the panel.

At least one protective stop may be mounted to touch sensing apparatus proximal to an optical component and extending further from the touch surface along the normal to the plane of the touch surface than any optical component surface. The optical components may comprise a reflector surface to reflect light from the light emitters to the touch surface, wherein the reflector surface reflects light diffusively, partially diffusively, or specularly.

An angular filter may be arranged between the optical components and touch surface and configured to only allow light travelling within 10 degrees of the plane of touch surface to pass between the touch surface and the optical components.

An elongate channel may be positioned between each light emitter and/or detector and a surface of a corresponding optical component, wherein the elongate channel comprising channel walls, and wherein at least a portion of the channel walls are configured to absorb light. The elongate channel may be formed from a light guide, an airgap, or other light transmissive medium.

The elongate channel may optionally not be straight and/or the channel walls comprise internally reflective surfaces.

DETAILED DESCRIPTION OF EMBODIMENTS

In the following, embodiments will be presented of touch-sensitive apparatus. Throughout the description, the same reference numerals are used to identify corresponding elements.

FIG. 1a illustrates a top plan view of an example of an optical touch-sensitive apparatus. Emitters 110 are distributed around the periphery of panel 150, to project light across the panel 150. Detectors 111 are distributed around the periphery of panel 150, to receive part of the propagating light. The light from each of emitters 110 will thereby propagate to a number of different detectors 111 on a plurality of light paths D. The light paths D may conceptually be represented as "detection lines" that extend across the touch surface 140 of panel 150. Thereby, the emitters 110 and detectors 111 collectively define a grid of detection lines D ("detection grid") on the touch surface 140, as seen in a top plan view. The spacing of intersections in the detection grid defines the spatial resolution of the touch-sensitive apparatus 100, i.e. the smallest object that can be detected on the touch surface 140.

As used herein, the emitters 110 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 110 may also be formed by the end of an optical fibre. The emitters 110 may generate light in any wavelength range. The following examples presume that the light is generated in the infrared (IR), i.e. at wavelengths above about 750 nm. Analogously, the detectors 111 may be any device capable of converting light (in the same wavelength range) into an electrical signal, such as a photo-detector, a CCD device, a CMOS device, etc.

The detectors 111 collectively provide an output signal, which is received and sampled by a signal processor. The output signal contains a number of sub-signals, also denoted "projection signals", each representing the energy of light received by one of light detectors 111 from one of light emitters 110. Depending on implementation, the signal processor may need to process the output signal for separation of the individual projection signals. The projection signals represent the received energy, intensity or power of light received by the detectors 111 on the individual detection lines D. Whenever an object touches a detection line D, the received energy on this detection line is decreased or "attenuated".

The signal processor may be configured to process the projection signals so as to determine a property of the touching objects, such as a position (e.g. in a x,y coordinate system), a shape, or an area. This determination may involve a straight-forward triangulation based on the attenuated detection lines, e.g. as disclosed in U.S. Pat. No. 7,432,893 and WO2010/015408, or a more advanced processing method to recreate a distribution of attenuation values (for simplicity, referred to as an "attenuation pattern") across the touch surface 140, where each attenuation value represents a local degree of light attenuation. The attenuation pattern may be further processed by the signal processor for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

In an embodiment, the apparatus 100 also includes a controller which is connected to selectively control the activation of the emitters 110 and, possibly, the readout of data from the detectors 111. Depending on implementation, the emitters 110 and/or detectors 111 may be activated in sequence or concurrently, e.g. as disclosed in U.S. Pat. No. 8,581,884. The signal processor and the controller may be configured as separate units, or they may be incorporated in a single unit. One or both of the signal processor and the controller may be at least partially implemented by software executed by a hardware CPU.

Figure 1B:
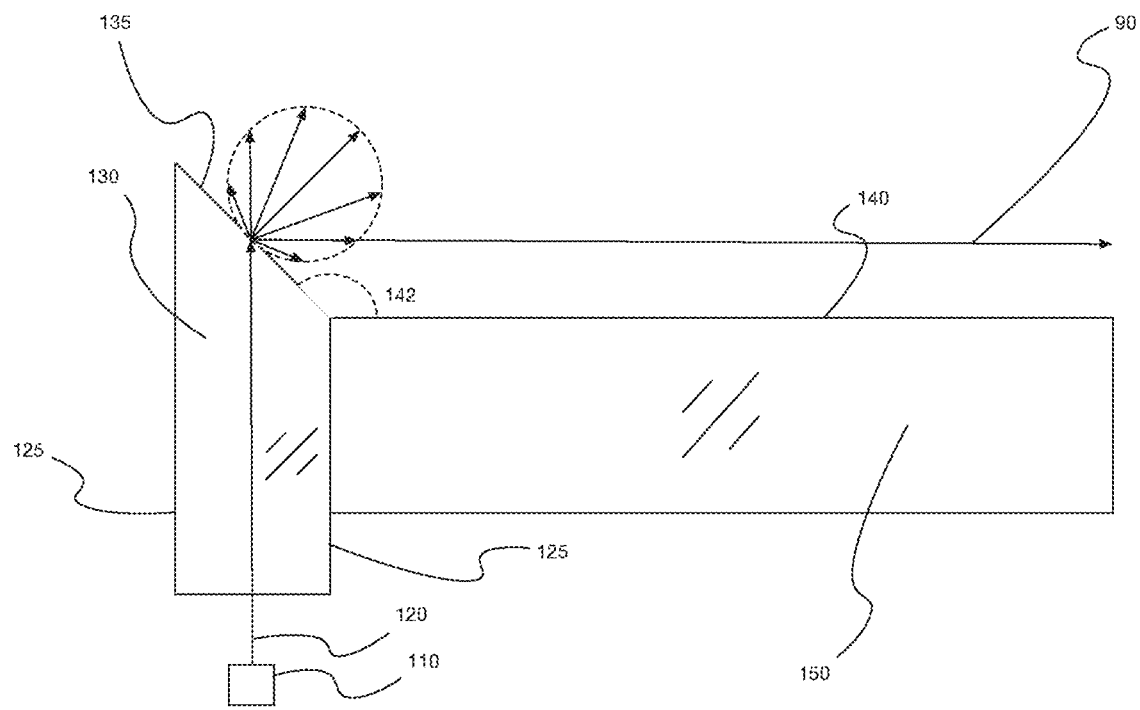
Figure 1C:
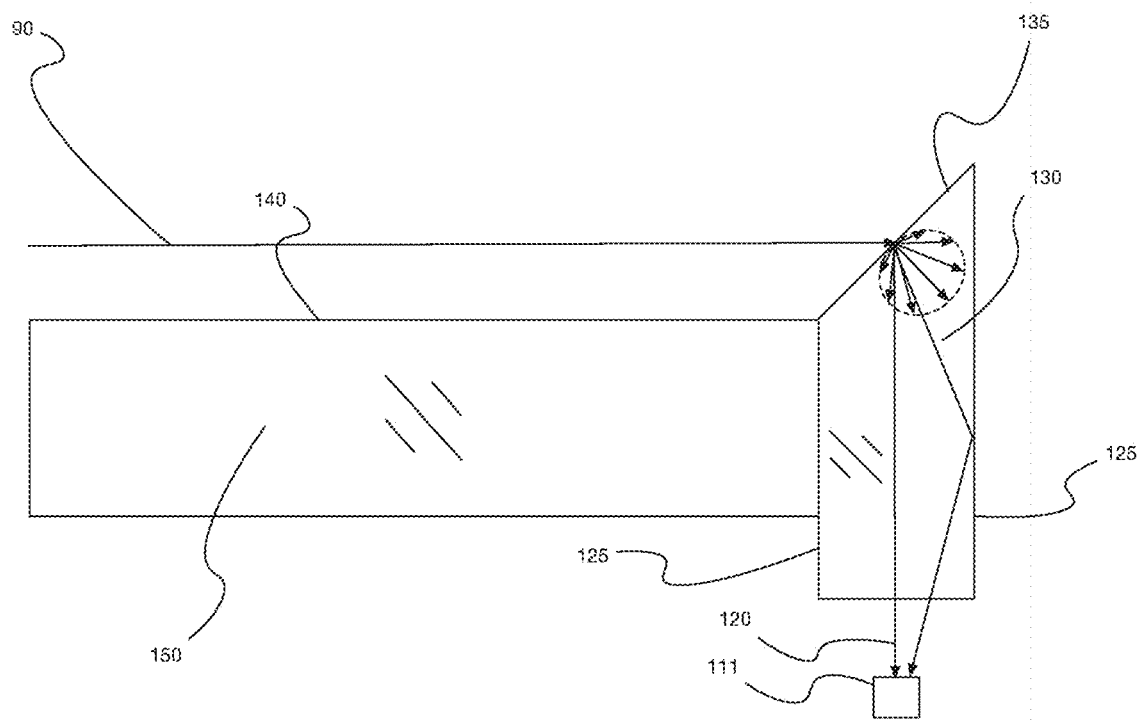

FIG. 1b illustrates an embodiment in which the light 120 emitted by emitter 110 is transmitted through light guide 130. The light exits light guide 130 through diffusive surface 135 and is distributed so that a portion of the light travels along path 90 in a plane substantially parallel with touch surface 140. FIG. 1c shows an opposite side of touch surface 140 where the same light guide 130 plays a reverse role. In FIG. 1c, light 120 is received by surface 135 of light guide 130 which then diffusively transmits the light into light guide 130. The light is then conveyed to detector 111 through light guide 130. Diffusive surface 135 may comprise a coating or other surface finish for providing an optical diffusion. Protective surfaces 125 are provided to reflect light whilst blocking ambient light. Protective surfaces 125 may comprise a white layering, e.g. paint. In one embodiment, the paint comprises titanium dioxide. This embodiment advantageously allows an uncomplicated solution for delivering light from an emitter to touch surface 140. Protective surfaces 125 for suppressing ambient light may be provided for all embodiments provided in the present description that include a light guide.

The optical arrangement shown in all of the figures may be understood to play a transmitting role when the optical arrangement conveys light from an emitter to touch surface 110 (i.e. as explicitly shown and described in FIG. 1b) and a receiving role when the optical arrangement conveys light from touch surface 140 to a detector 111 (i.e. as explicitly shown and described in FIG. 1c). Unless described otherwise, the optical arrangement is understood to be the same for the transmitting role and receiving role. This advantageously allows low production costs for manufacturing of an optical touch sensitive system as the same optical arrangement is used along the periphery of the system regardless of whether it is positioned over or near a detector or an emitter. The direction of light used to describe the function of the optical arrangement may depend on the functions of the individual components of the described embodiment. i.e. Where the key features of an embodiment are important in the receiving role, the direction of light used to describe the function may be according to the receiving role.

In the embodiment shown in FIG. 1b, diffusive surface 135 is positioned at an obtuse angle 142 relative to touch surface 140. This advantageously allows a convenient cleaning edge for removing dust, a reduction in Fresnel reflections, and a smooth transition from the touch surface to a bezel. Diffusive surface 135 is preferably angled at between 130° and 160° relative to touch surface 140.

In all of the embodiments described in this description, the dimensions of the components may be understood to vary. Preferably, the optical components have a height no greater than 10 mm from touch surface 140, a depth of up to than 10 mm below the panel 150, and a distance from an edge of a panel of up to 20 mm.

Figure 2:
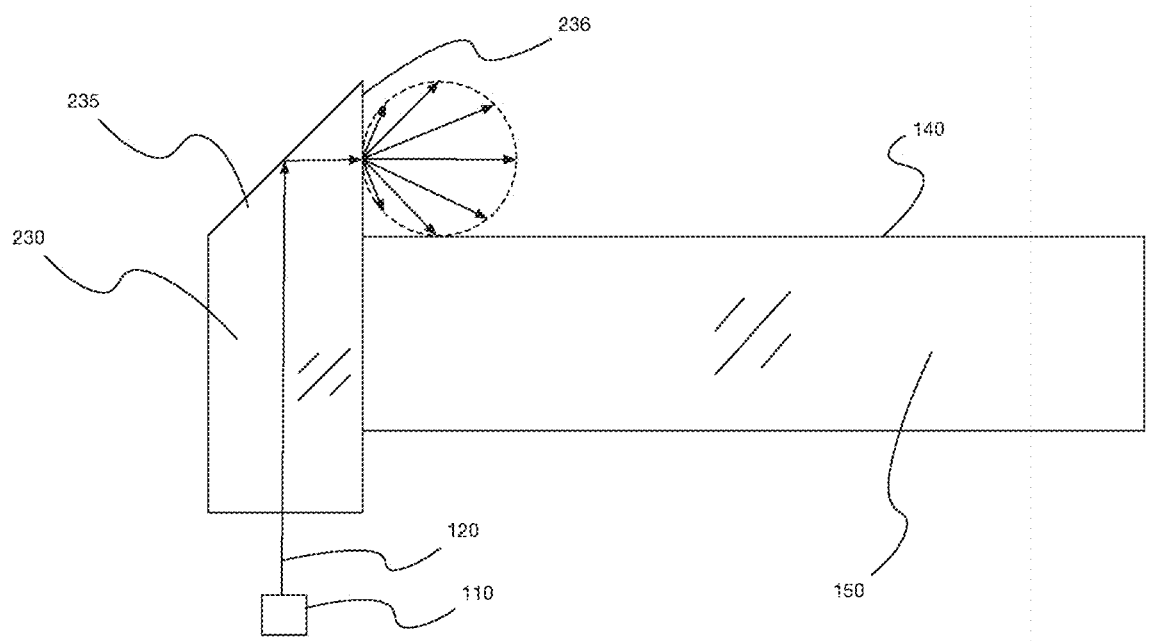
FIG. 2 shows an embodiment with a diffusive transmissive light guide configured to direct and receive light around the edge of the panel.

In an embodiment according to FIG. 2, light 120 emitted by emitter 110 is transmitted through light guide 230. The light internally reflects off surface 235, before exiting light guide 230 through diffusive surface 236. A portion of the light travels across a plane parallel with touch surface 140. Surface 235 may be angled to optimally specularly reflect light towards relative to touch surface 140. Diffusive surface 236 is preferably angled at between 45° and 160° relative to touch surface 140.

Figure 3A:
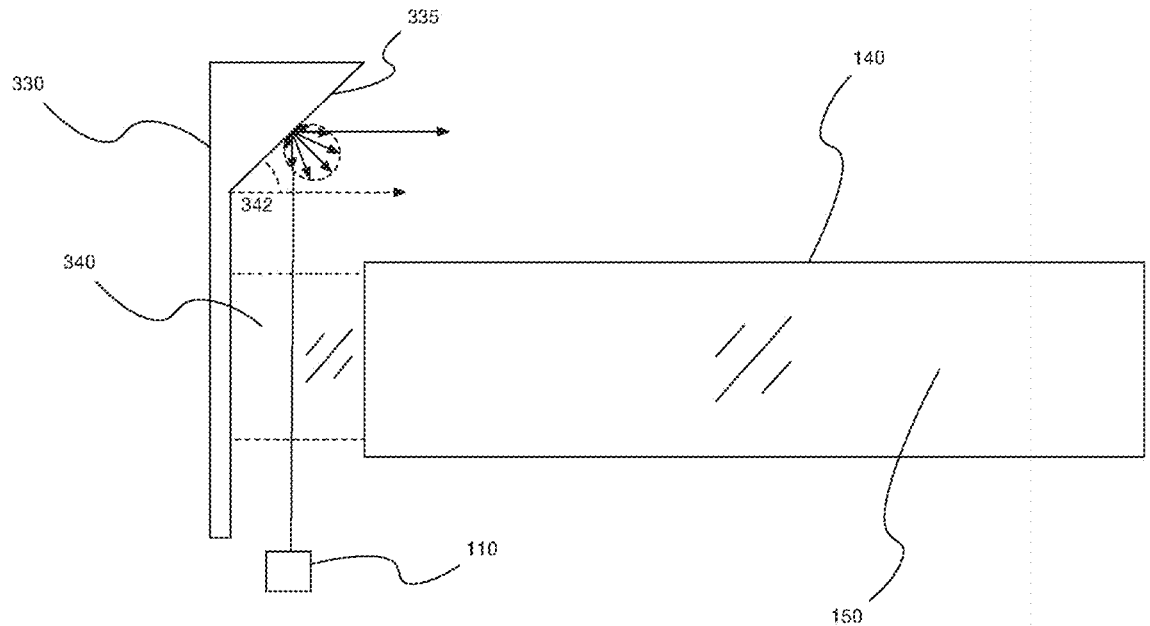
FIGS. 3a, 3b show an embodiment with a diffusive reflective component configured to direct and receive light around the edge of the panel.

In an embodiment according to FIG. 3a, the light emitted by emitter 110 is transmitted through gap 340. Gap 340 may be an air gap or other transmissive medium with a low refractive index. The light totally reflects off diffusive, reflective surface 335 of optical component 330. A portion of the light travels along across a plane parallel with touch surface 140. This advantageously removes the need for transmitting the light through a light guide providing better transmission. Surface 335 may be angled 342 at between 20° and 50° relative to touch surface 140.

Figure 3B:
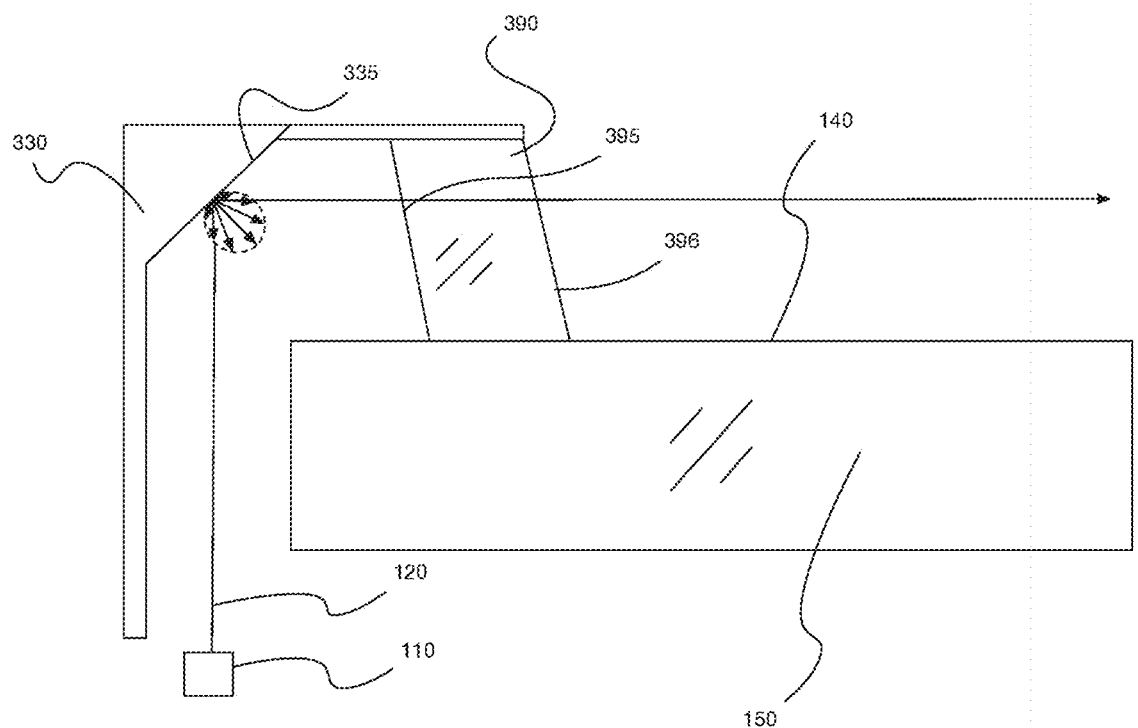

In FIG. 3b, an embodiment similar to that shown in FIG. 3a is shown further comprising dust shield 390 forming a physical barrier preventing dust from reaching diffusive, reflective surface 335 or emitter 110. Dust shield 390 comprises a transparent window through which the light 120 may pass unhindered. Preferably, dust shield 390 forms inside edge 395 and outside edge 396, from touch surface 140 to the top edge of dust shield 390. A slope on outside edge 396 allows dust shield 390 to be effectively wiped clean. Sloping edges 395 and 396 may be angled at between 100° and 80° relative to touch surface 140.

Returning to FIG. 3a, gap 340 may be filled with a dust shield forming a physical barrier preventing dust from reaching below the glass, in much the same way as for embodiment 3b. Positioning the dust shield in this position instead of on touch surface 140 allows the size of the bezel component above touch surface 140 to be smaller than the embodiment shown in FIG. 3b.

Figure 4A:
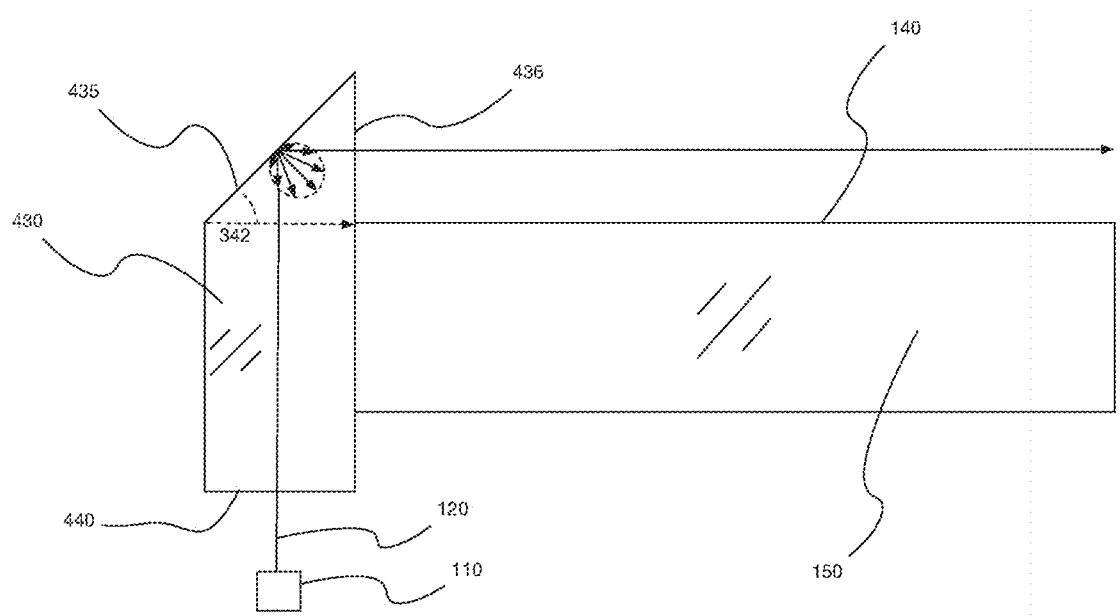
FIGS. 4a, 4b shows another embodiment with a diffusive reflective light guide configured to direct and receive light around the edge of the panel.

In an embodiment according to FIG. 4a, light 120 emitted by emitter 110 is transmitted through light guide 430. The light totally internally reflects off diffusive, reflective surface 435, before exiting light guide 430 through surface 436. This advantageously allows an embodiment similar to the embodiment shown in FIG. 3b without the need for a dust shield. Surface 435 may be angled 342 at between 10° and 50° relative to touch surface 140. Surface 435 may comprise a diffuse paint layer, a diffusive tape layer, or other diffusive reflective coating or layer. Surface 436 is preferably angled at between 100° and 80° relative to touch surface 140. Light guide 430 may be formed via co-extrusion with diffusive materials applied to surface 435.

Figure 4B:
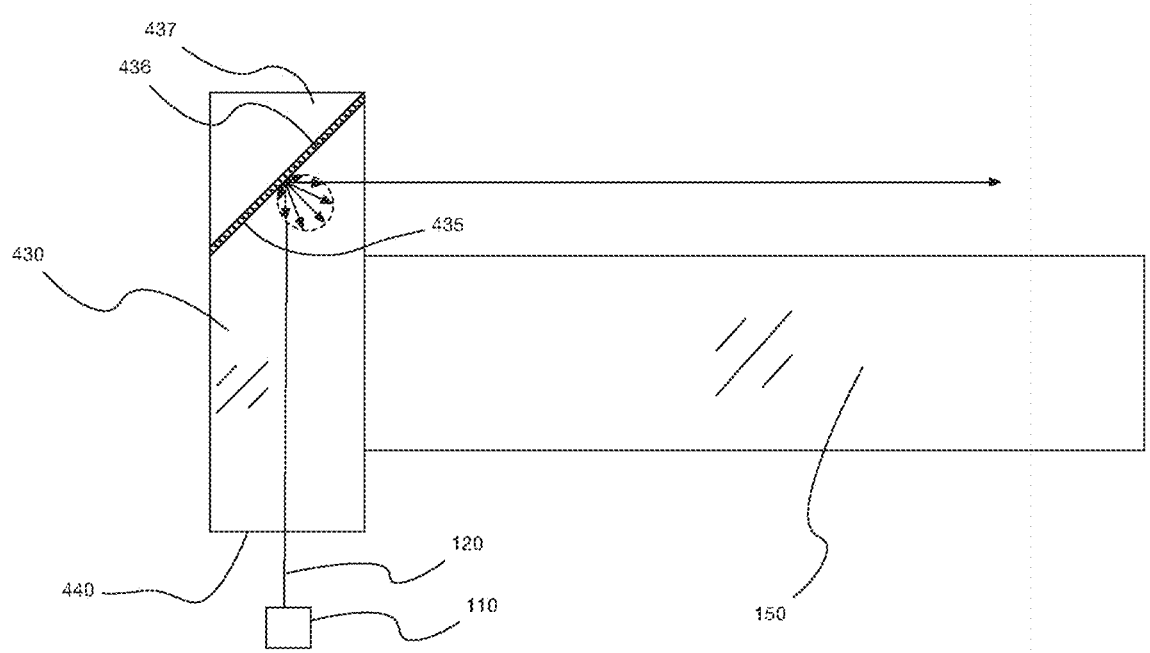

In FIG. 4b, an embodiment similar to that shown in FIG. 4a is shown wherein light guide 430 further comprises extension 437 and diffusive layer 436. In this embodiment, light guide 430 and extension 437 are formed from a single block of material and diffusive layer 436 is formed by modifying the internal structure of the block of material. In one embodiment, gas bubbles are formed in the light guide by focused high intensity laser beams. As the bubbles are optically diffusive, the resultant effect is a plane of bubbles in the light guide forming a diffusive layer. In other embodiments, extension 437 is a separate component from light guide 430 and is attached to light guide 430 during manufacturing. In these embodiments, layer 436 may be formed by etching or by microstructures on a surface of the light guide 430 and/or extension 437.

Figure 5:
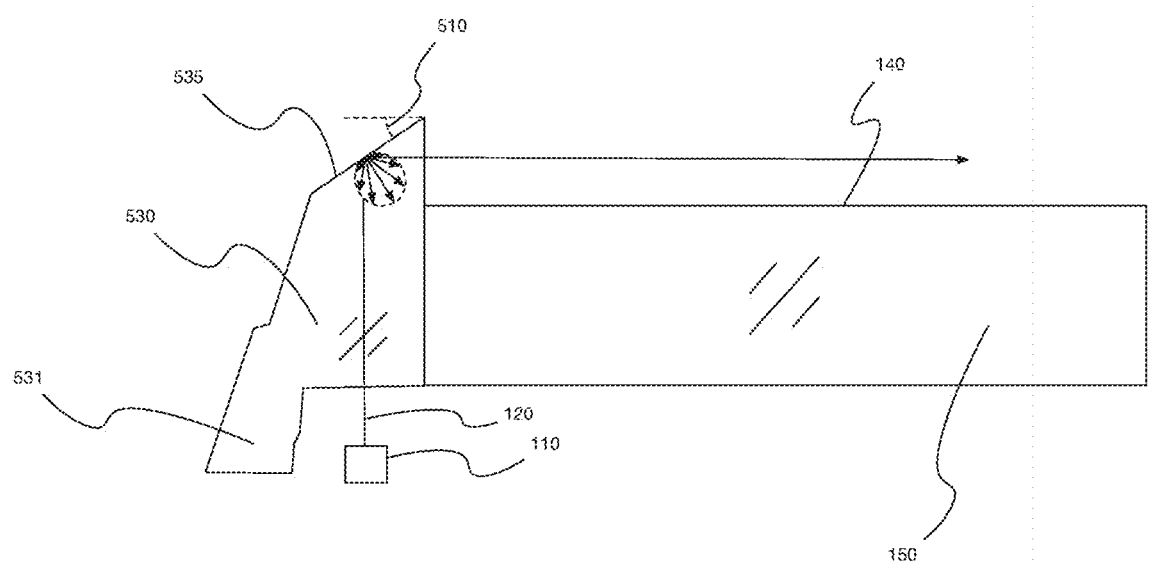
FIG. 5 shows another embodiment with a diffusive reflective light guide configured to direct and receive light around the edge of the panel.

In FIG. 5, an embodiment similar to that shown in FIG. 4a is shown further comprising mounting component 531. This advantageously allows light guide 530 to be clamped to a touch apparatus using a feature that is formed as part of the same material as the light guide. Surface 535 may be angled 510 at between 20° and 50° relative to touch surface 140. At 20°, the surface 535 will collect more light from the emitter 110 whereas at 45°, surface 535 will reflect most of the specular component of light 120 towards the touch surface 140.

Figure 6:
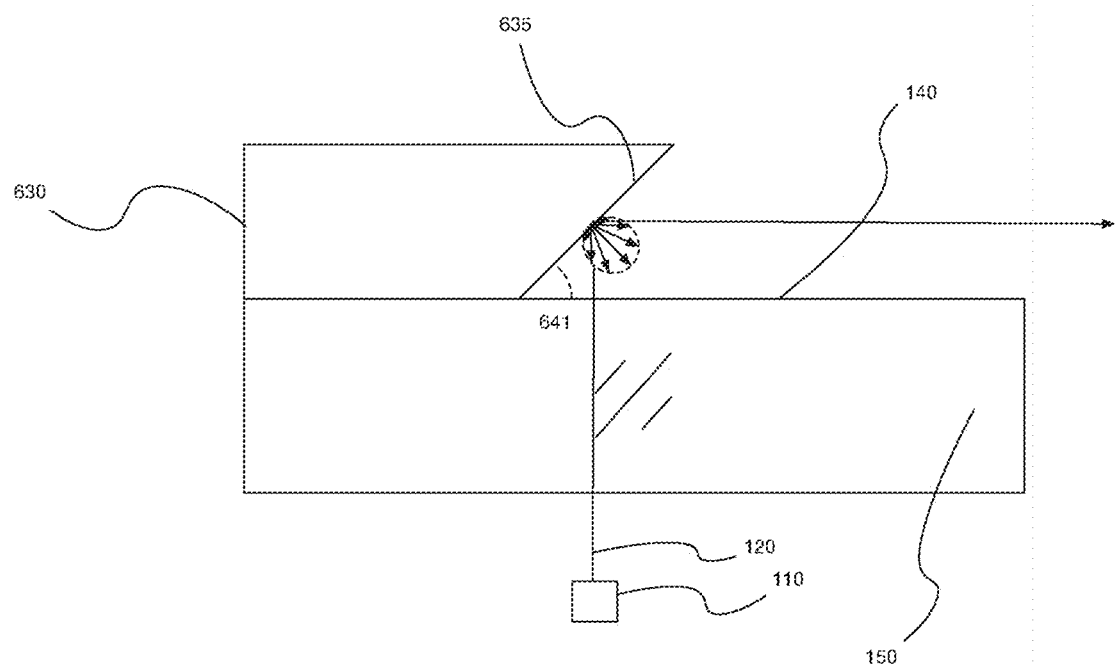
FIG. 6 shows an embodiment with a diffusive reflective component configured to direct and receive light through the panel.

In an embodiment according to FIG. 6, the light 120 emitted by emitter 110 is transmitted through panel 150. The light reflects off diffusive reflective surface 635 of component 630. A portion of the light travels along across a plane parallel with touch surface 140. The feature of transmitting the light from the emitters 110 to diffusive reflective surface 635 through panel 150 has a number of advantages over the solutions presented by the prior art. In particular, manufacture of touch-sensitive apparatus 100 becomes significantly less expensive. This feature allows an arrangement where no components need to be mounted to the edges of the panel 150, allowing expensive finishing (where the panel 150 is formed from glass) to regulate the edges of the glass to be avoided. Furthermore, fastening of the components to panel 150 is simplified and optical tolerances are improved. Surface 635 may be angled 641 at between 20° and 50° relative to touch surface 140.

Figure 7A:
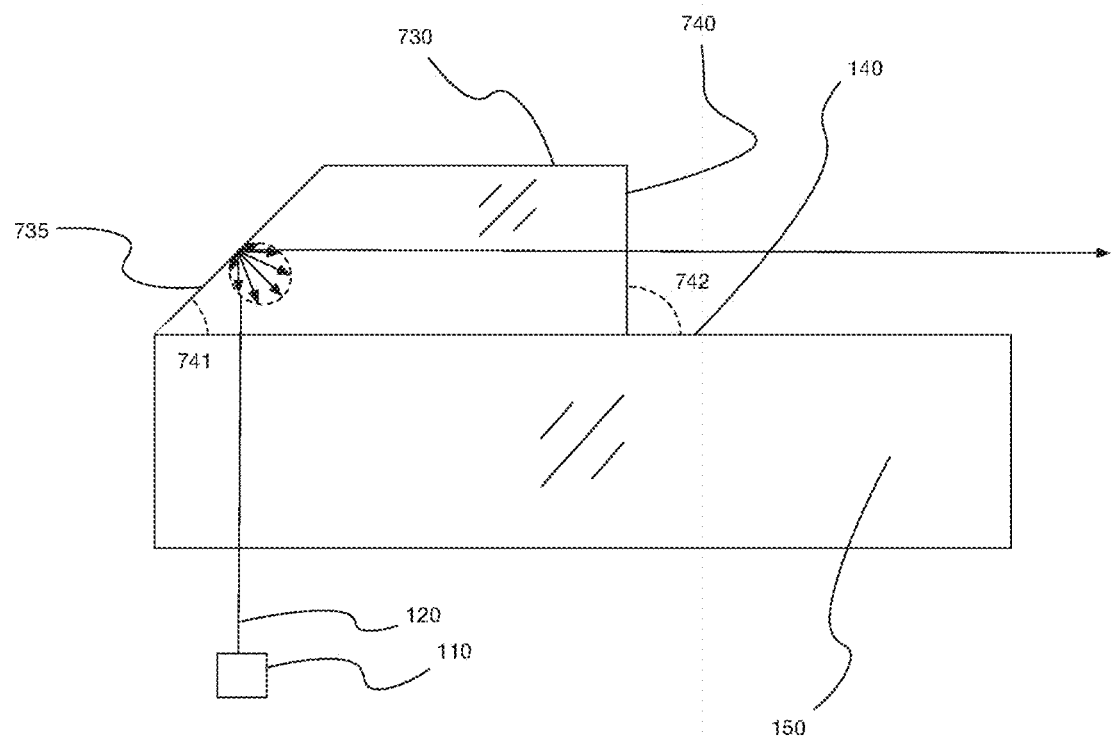
FIGS. 7a, 7b show another embodiment with a diffusive reflective light guide configured to direct and receive light through the panel.

In an embodiment according to FIG. 7a, the light 120 emitted by emitter 110 is transmitted through panel 150. The light internally reflects off diffusive reflective surface 735 of component 730, before exiting light guide 130 through surface 740. This advantageously allows the use of a single component mounted on the touch surface without the need for a dust cover.

Surface 735 may be angled 741 at between 20° and 50° relative to touch surface 140. Surface 740 is preferably angled 742 at between 100° and 80° relative to touch surface 140.

Figure 7B:
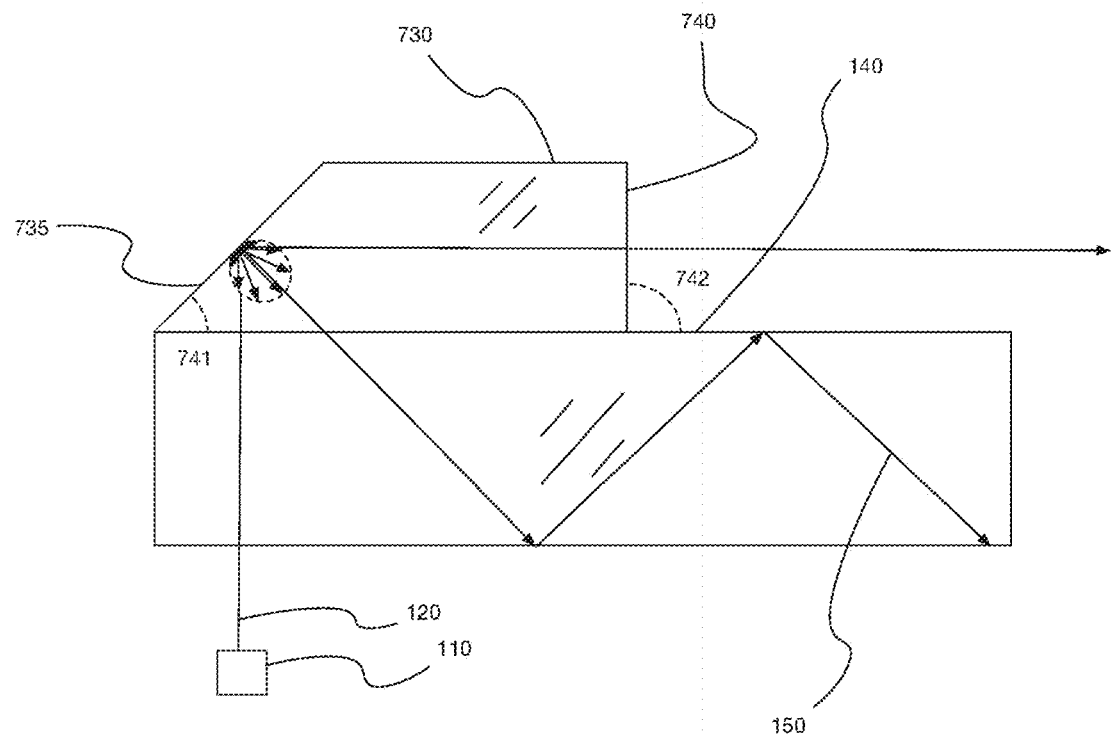

In an embodiment similar to FIG. 7a, FIG. 7b shows an embodiment where the light 120 emitted by emitter 110 is transmitted through panel 150. The light internally reflects off diffusive reflective surface 735 of light guide 730, before exiting light guide 730 through surface 740. A portion of the light also travels through panel 150 via total internal reflection.

Figure 8:
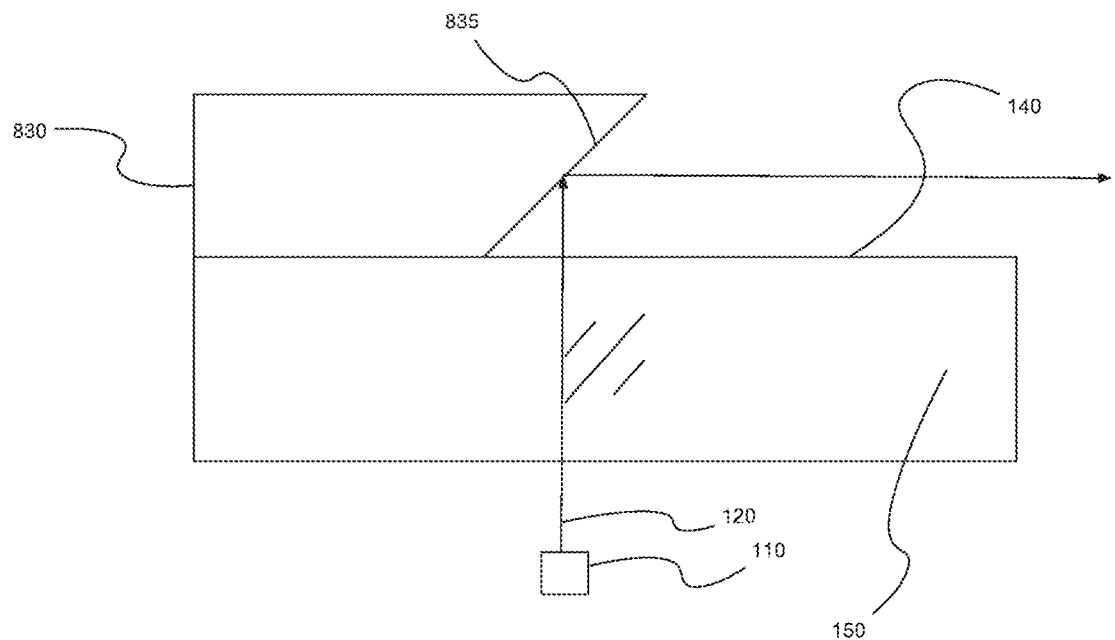
FIG. 8 shows an embodiment with a specular reflective component configured to direct and receive light through the panel.

In an embodiment according to FIG. 8, the light 120 emitted by emitter 110 is transmitted through panel 150. The light reflects off specular or partially specular reflective surface 835 of component 830. The specular reflection of light 120 advantageously allows a much brighter light signal to reach the corresponding detector 111 than in embodiments employing diffusive surfaces above. Surface 835 may comprise a mirror coating. In another embodiment, component 830 is formed from a specularly reflective material, such as a metal.

Figure 9:
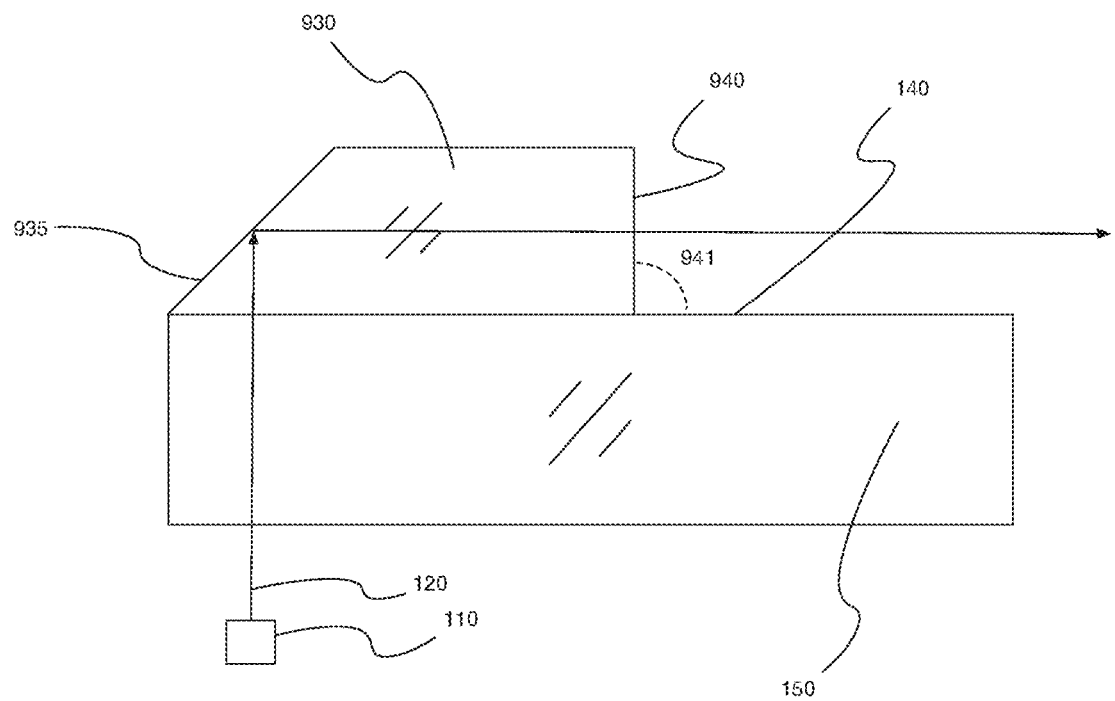
FIG. 9 shows another embodiment with a specular reflective light guide configured to direct and receive light through the panel.

In an embodiment according to FIG. 9, the light 120 emitted by emitter 110 is transmitted through panel 150. The light internally reflects off specular or partially specular reflective surface 935 of component 930, before exiting light guide 930 through surface 940. This advantageously allows an embodiment where the reflective surface (e.g. 935) is set back from the touch surface 140. Surface 940 is preferably angled 941 at between 100° and 80° relative to touch surface 140.

Figure 10:
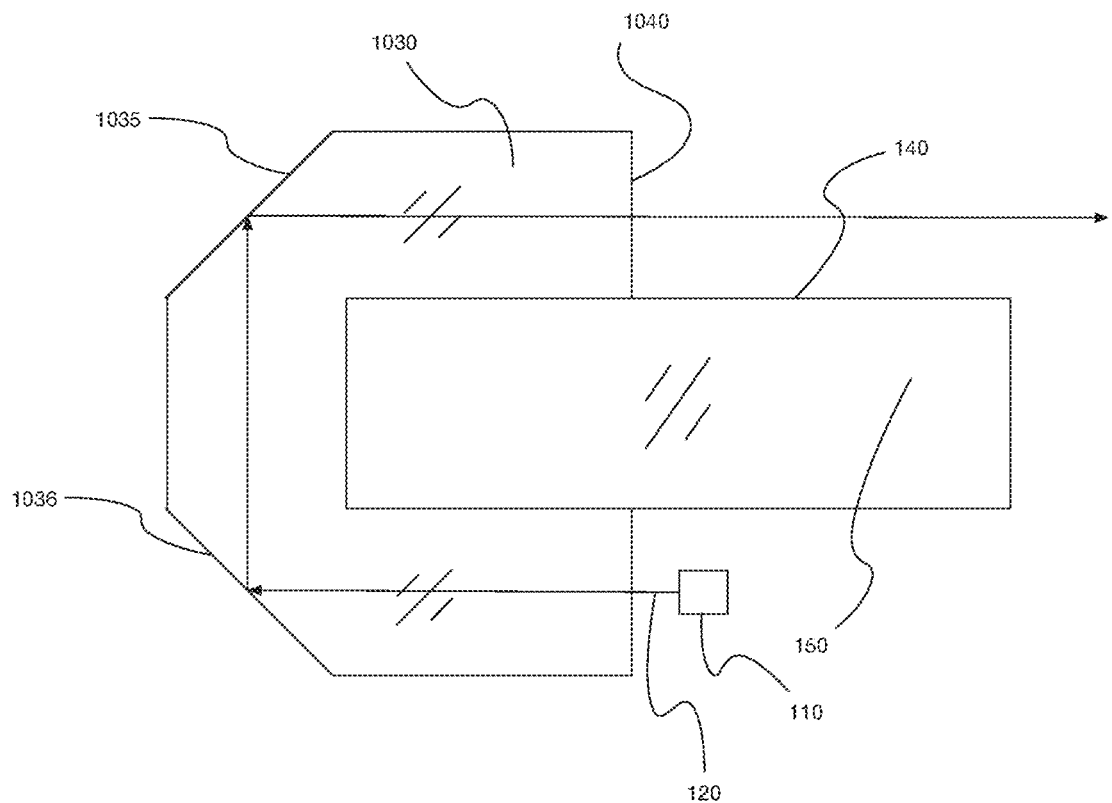
FIG. 10 shows another embodiment with multiple specular reflective light guides configured to direct and receive light around the edge of the panel.

In an embodiment according to FIG. 10, the light 120 emitted by emitter 110 is transmitted through light guide 1030. The light internally reflects off specular or partially specular reflective surface 1036 of light guide 1030. The light then internally reflects off specular or partially specular reflective surface 1035, before exiting light guide 1030 through surface 1040. This U-shaped configuration of light guide 1030 advantageously allows a light guide 1030 to be clamped onto an edge of the glass.

Figure 11:
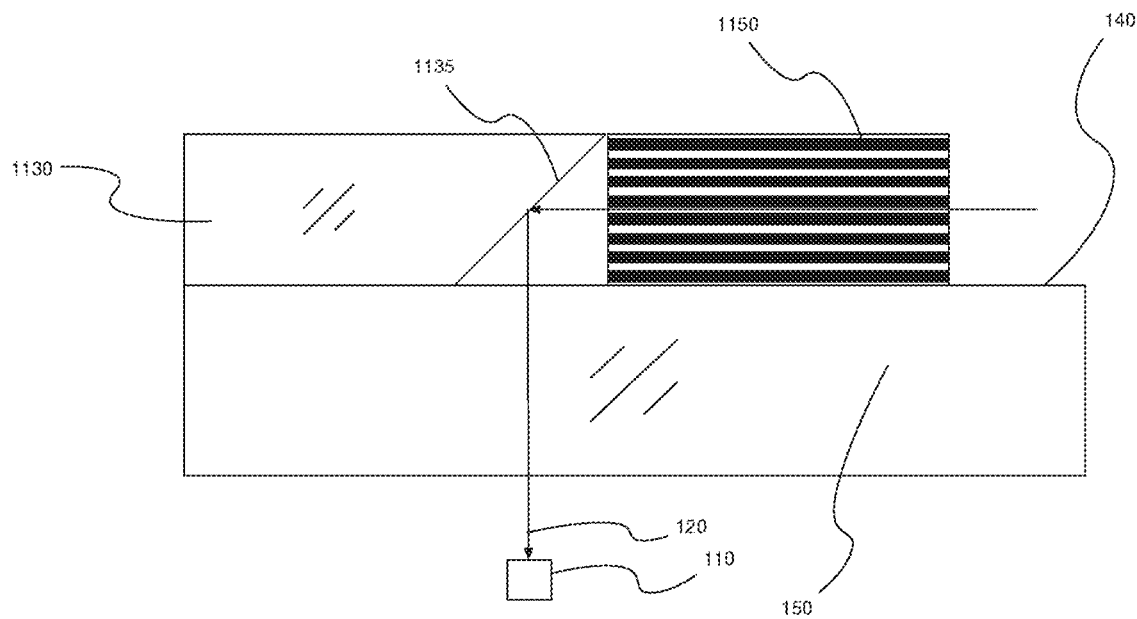
FIG. 11 shows an embodiment with a reflective component comprising an angular filter.

In FIG. 11, an embodiment similar to that shown in FIG. 8 is shown further comprising angular filter 1150. The light 120 from touch surface 140 is filtered by angular filter 1150 to allow only light within a narrow angular range to reach specular or partially specular reflective surface 1135. The light 120 is then reflected by surface 1135 of component 1130 before being received by detector 111 through panel 150. Angular filter 1150 advantageously ensures a much narrower angular spectrum of light to reach detector 111, allowing significant suppression of ambient light noise. This is especially relevant to the specular embodiments described herein. Angular filters 1150 may be applied to any of the embodiments shown in the present description to filter light reaching the optical component from touch surface 140. Angular filters 1150 may also be applied between the optical components and the emitters 110/detectors 111. In an embodiment, the angular filters are manufactured by producing a stack of alternating IR transmissive (e.g. PMMA sheets) and IR blocking material. The layers are laminated together. The stack may then be stretched in a guided manner and cut into optical components.

Figure 12A:
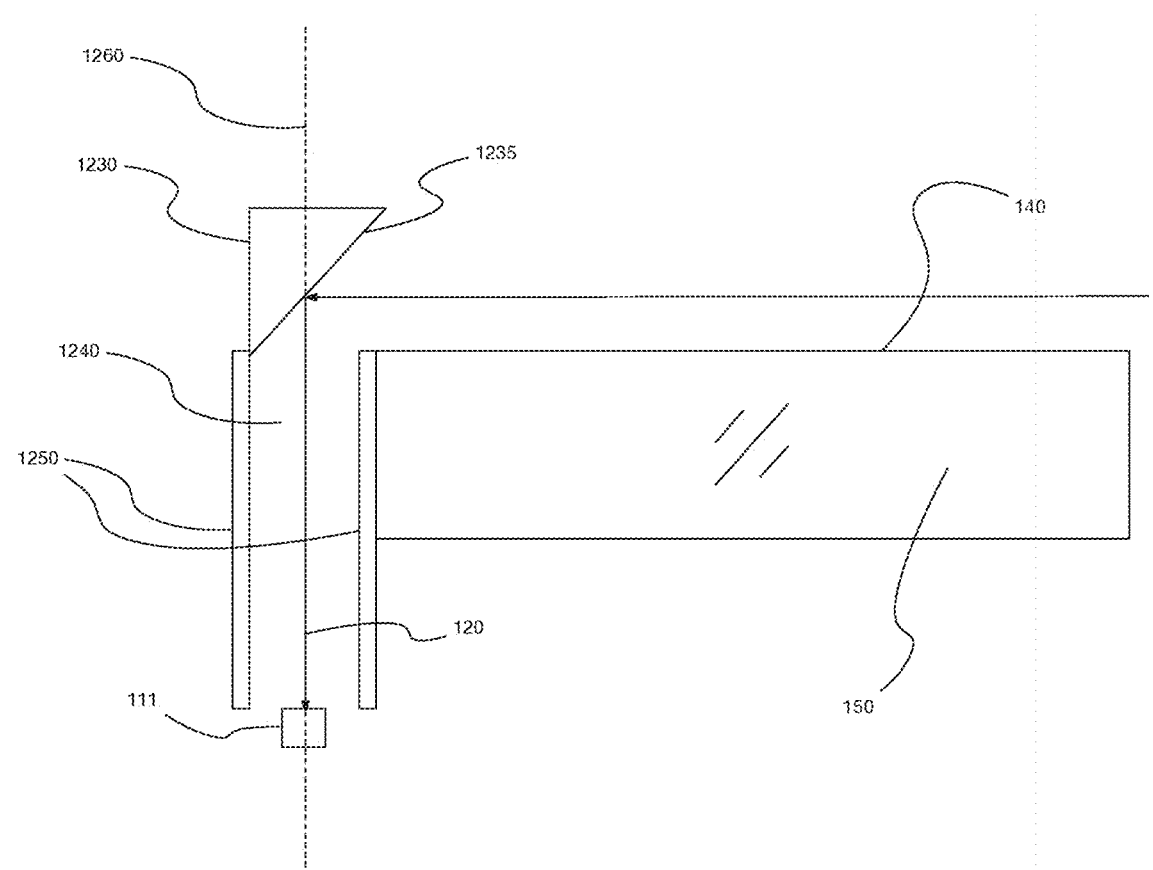
FIG. 12a shows an embodiment with a reflective component and an elongate channel having light absorbing walls.

In an embodiment according to FIG. 12a, the light 120 is received by surface 1235 of optical component 1230 from touch surface 140 which then reflects the light to detector 111 via channel 1240 having a channel axis 1260. Channel 1240 may comprise an air gap or other transmissive medium. Channel 1240 may comprise one or more light absorbent walls 1250 configured to absorb light travelling at an angle sufficiently deviant from the angle of channel axis 1260. This advantageously allows angular filtering of ambient light.

Figure 12B:
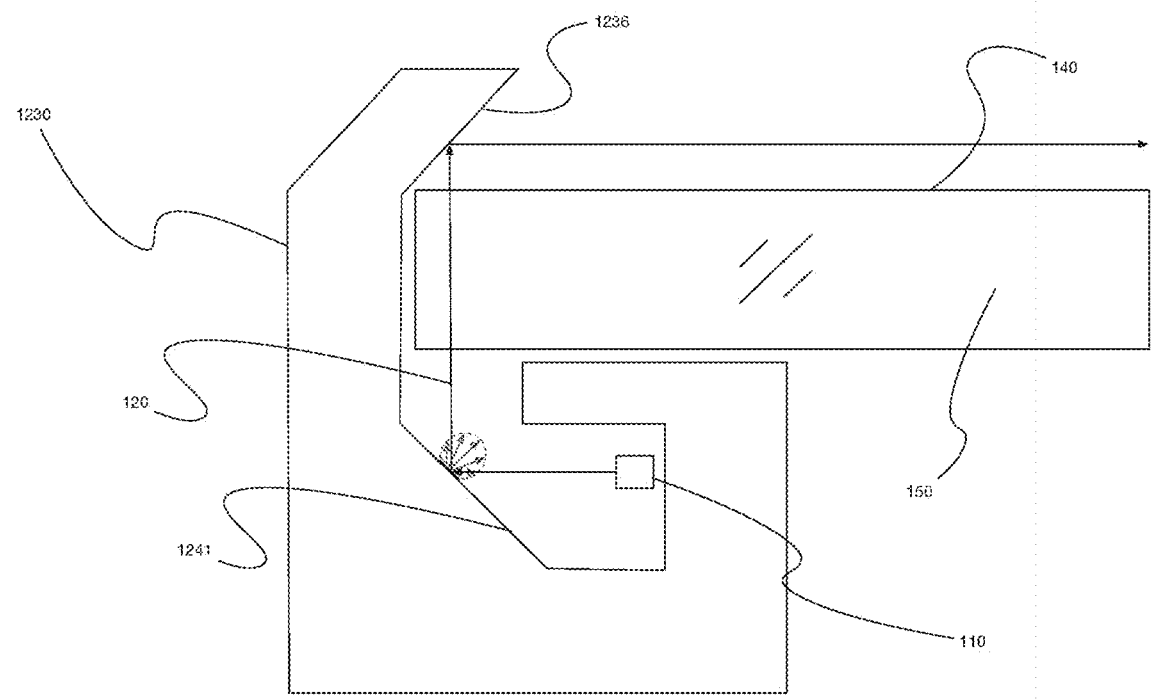
FIG. 12b shows an embodiment with a diffusive surface and a second reflective surface.
Figure 13A:
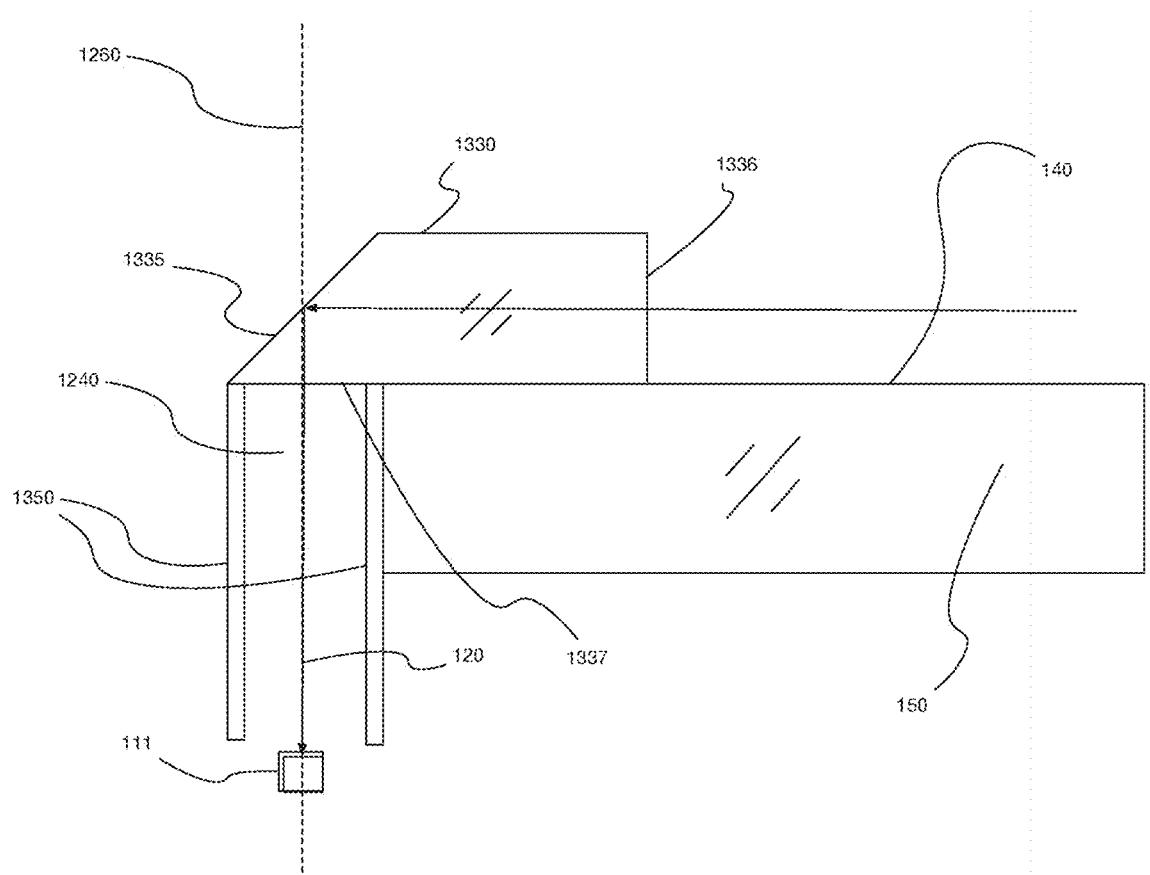
FIGS. 13a, 13b show an embodiment with a reflective light guide incorporating an elongate channel having light absorbing walls.

In an embodiment according to FIG. 12b, the light 120 is emitted from emitter 110 onto surface 1241 and then directed up through panel 150 to surface 1236 before being directed out across touch surface 140. Surface 1241 is a diffusive, preferably matte surface, causing a component of light 120 to be scattered. Preferably, surface 1241 comprises a matte paint, matte diffuser film, or matte surface treatment. Surface 1236 is a mirror surface providing high quality, specular reflection to light 120 of above 50%. Preferably, specular reflection of light 120 is above 60%. Surface 1236 is preferably angled at 45° from the plane of touch surface 140 with a range of ±15°. In one embodiment, surface 1236 is angled a small distance from 45° to avoid unwanted optical effects resulting from light bouncing off other surfaces of the touch system. Preferably, surface 1236 is angled between 0.5° and 3° from 45°. i.e. Between 42° and 44.5° or between 45.5° and 48°. Where optical component 1230 is an anodized extruded component made from aluminium or other suitable metal, mirrored surface 1236 may be formed through diamond cut milling of component 1230 to produce the mirrored finish. Alternatively, a mirror film may be applied to component 1230. In FIG. 13a, an embodiment similar to that shown in FIG. 12 is shown but wherein the light enters light guide 1330 internally through surface 1336, reflects off specular or partially specular reflective surface 1335, before exiting light guide 1330 through surface 1337. In combination with channel 1240, this advantageously allows light guide 1330 to block dust from reaching detector 111. Surface 1336 may be angled at between 80° and 100° relative to touch surface 140.

Figure 13B:
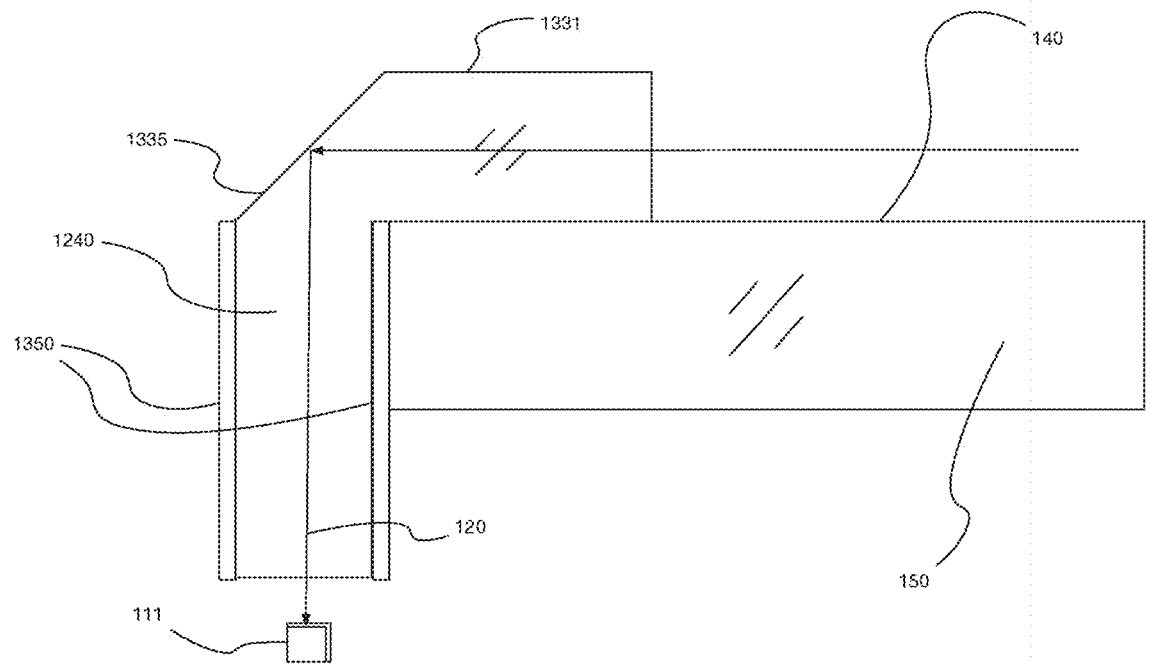

In FIG. 13b, an embodiment similar to that shown in FIG. 13a is shown in which channel 1240 comprises a light transmissive material having a similar refractive index to component 1331. Alternatively, light guide 1331 and channel 1240 are formed from a continuous light guide component. This advantageously allows light guide 1331 to be easily clamped to the glass, improving tolerances.

Figure 14:
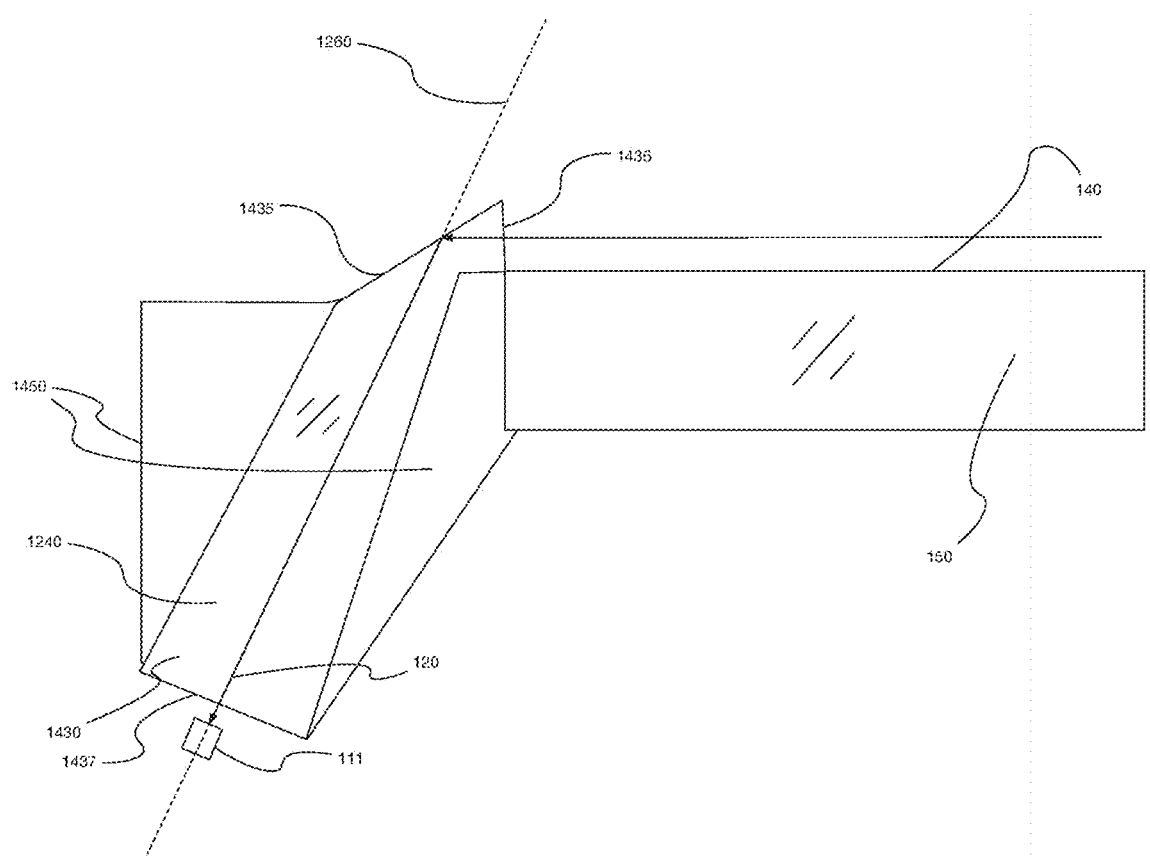
FIG. 14 shows another embodiment with a reflective light guide incorporating an elongate channel having light absorbing walls.

In FIG. 14, an embodiment similar to that shown in FIG. 13b is shown where light guide 1330 and channel 1240 are formed from a continuous light guide component 1430. This advantageously prevents any paths for ambient light to reach detector through surface 1435. The light enters light guide 1430 internally through surface 1436, reflects off specular or partially specular reflective surface 1435, before exiting light guide 1430 through surface 1437. Support components 1450 may be used to mount light guide 1430 to an external frame (not shown) and to panel 150. Support components 1450 may comprise a light absorbent material and perform essentially the same optical function as light absorbent surfaces 1250 in earlier embodiments.

Figure 15:
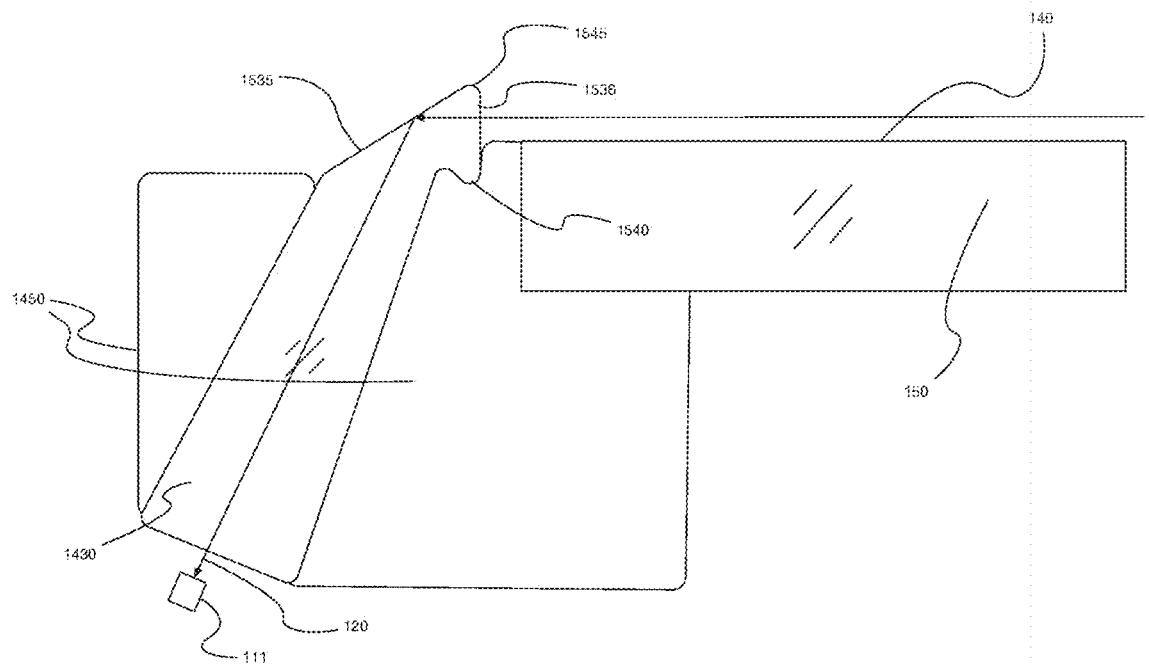
FIG. 15 shows another embodiment with a reflective light guide incorporating an elongate channel having light absorbing walls.

In FIG. 15, an embodiment similar to that shown in FIG. 14 is shown where light guide component 1430 has top edge 1545 having a radius. Due to manufacturing limitations, it is difficult to ensure a sharp edge. A sharp edge may also be dangerous to a user. Therefore, a radius of the edge is assumed. Although light guide component 1430 may be designed to minimize ambient light from reaching detector 111, the radius of edge 1545 will inevitably allow light from undesirable angles to enter the light guide and consequently reach detector 111. Similarly, an edge 1540 at the bottom of surface 1536 may reflect light at undesirable angles when not perfectly sharp. Consequently, in one embodiment, edge 1540 is positioned below the plane of touch surface 140 and shielded by absorbent material 1450. Preferably, edge 1545 and edge 1540 have a radius of 0.1 mm.

Figure 16:
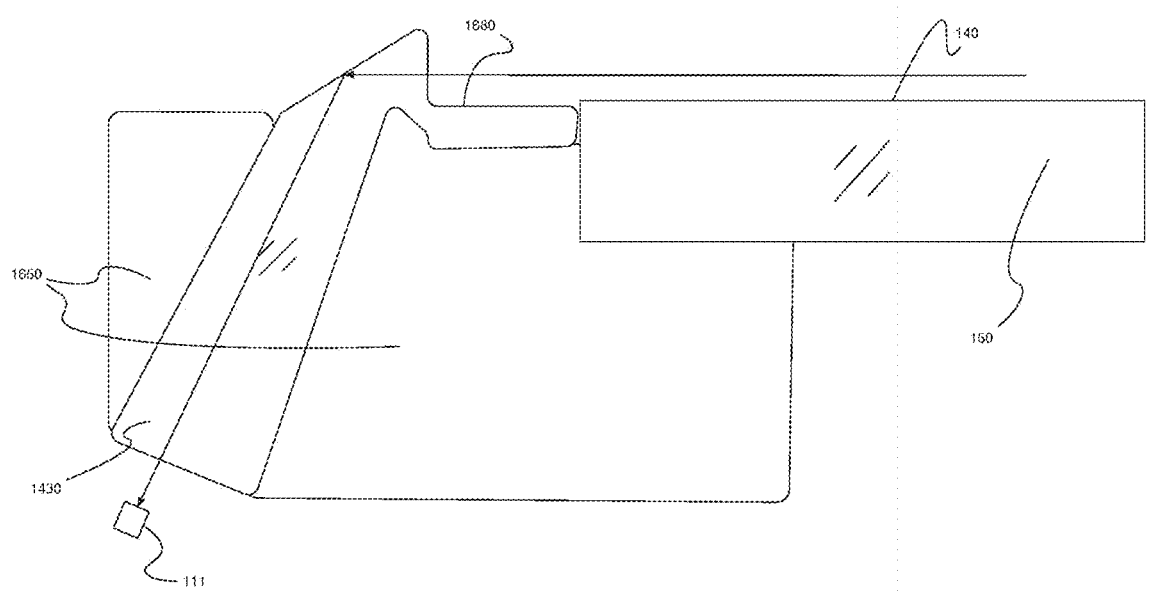
FIG. 16 shows an embodiment with a reflective light guide incorporating a support member.

In FIG. 16, an embodiment similar to that shown in FIG. 14 is shown where light guide component 1430 further comprises extended lip 1680.

Figure 17:
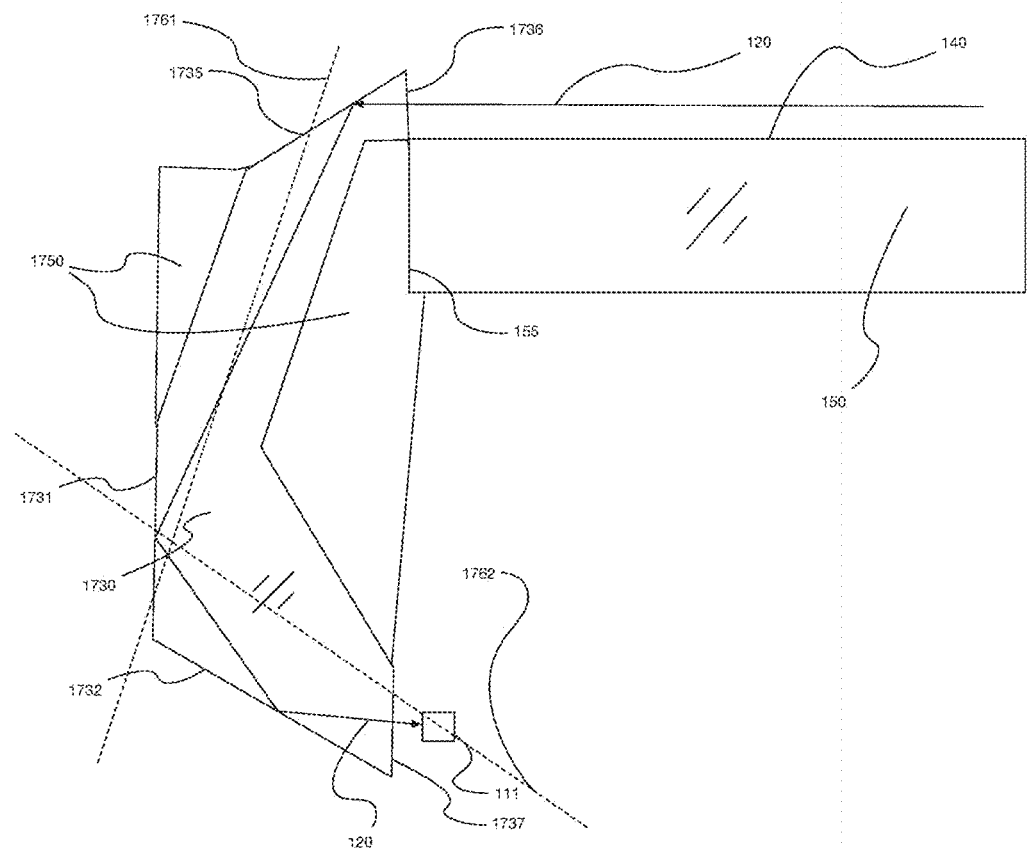
FIG. 17 shows an embodiment with a reflective light guide incorporating an elongate channel having with at least two channel axes.

In FIG. 17, an embodiment similar to that shown in FIG. 14 is shown where light guide component 1730 comprises a channel having at least two channel axes 1761, 1762. In this embodiment, light 120 enters light guide 1730 internally through surface 1736, internally reflects off specular or partially specular reflective surface 1735 as well as surface 1731 and/or surface 1732 before exiting light guide 1730 through surface 1737 to reach detector 111. Light 120 is internally reflected by at least two surfaces before reaching a detector. This advantageously allows the more flexible positioning of emitter/detector components with respect to the panel 150 and the minimisation of the width of components from edge 155.

Figure 18:
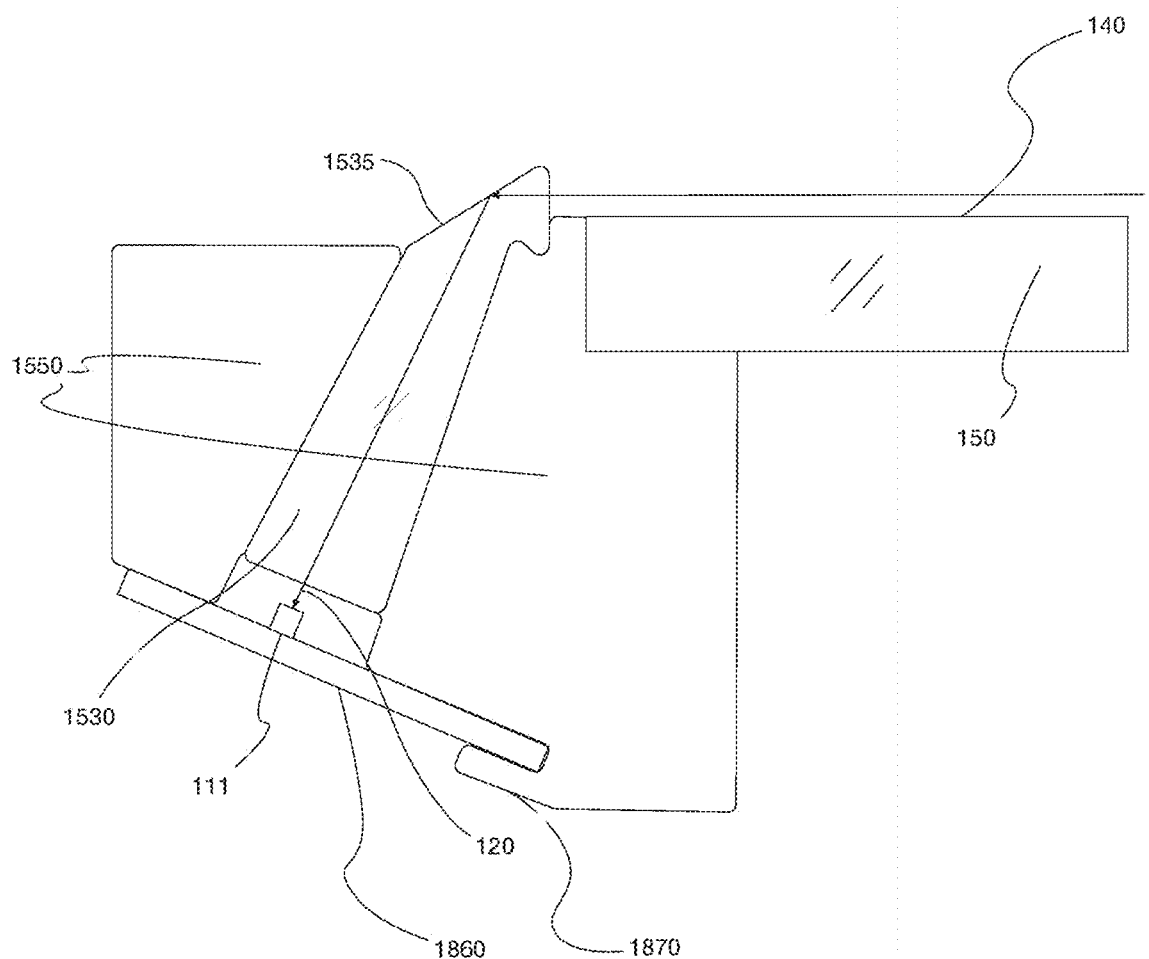
FIG. 18 shows an embodiment with a reflective light guide and a PCB with a mounted emitter/detector component.

In FIG. 18, an embodiment similar to that shown in FIG. 15 is shown where emitters 110 and detectors 111 are mounted on substrate 1860. In this embodiment, support components 1550 comprise support slot 1870, which provide physically supports substrate 1860.

Figure 19:
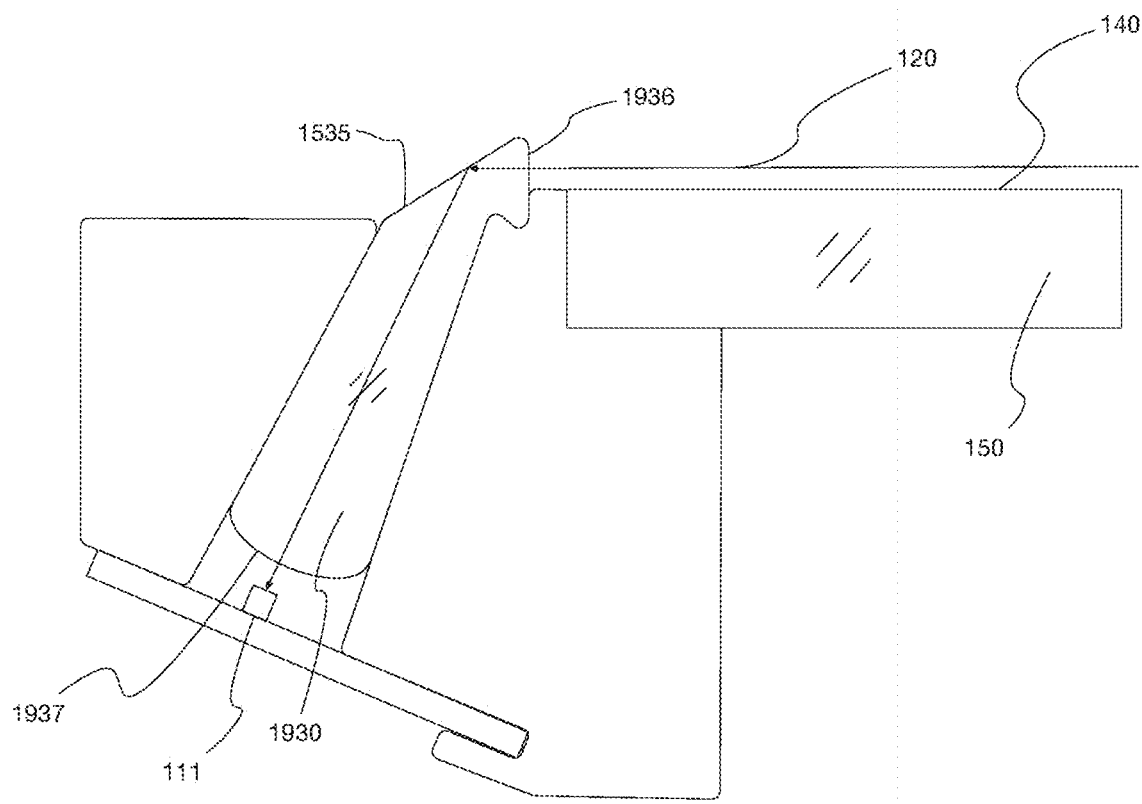
FIG. 19 shows an embodiment with a reflective light guide having a surface providing a dioptric power.

In FIG. 19, an embodiment similar to that shown in FIG. 15 is shown where light guide component 1930 comprises a bottom coupling surface 1937 providing a dioptric power. The light 120 enters light guide 1930 internally through surface 1936 and reflects off specular or partially specular reflective surface 1535. The light then exits light guide 1930 through bottom coupling surface 1937 and is converged on to the detectors 111 by the optical power of bottom coupling surface 1937. In the transmitter role, the light emitted by emitters 110 is substantially columnated by the optical power of bottom coupling surface 1937. This advantageously allows the capture of a larger angular distribution of light 120 from emitter 110 and collimating the light to direct it to surface 1535. This feature of the surface coupling light to a detector or from an emitter having a dioptric power may be applied to any of the embodiments provided in the present description comprising a light guide. The curvature angles are preferably within 5-10 mm per radius of curvature.

Figure 20:
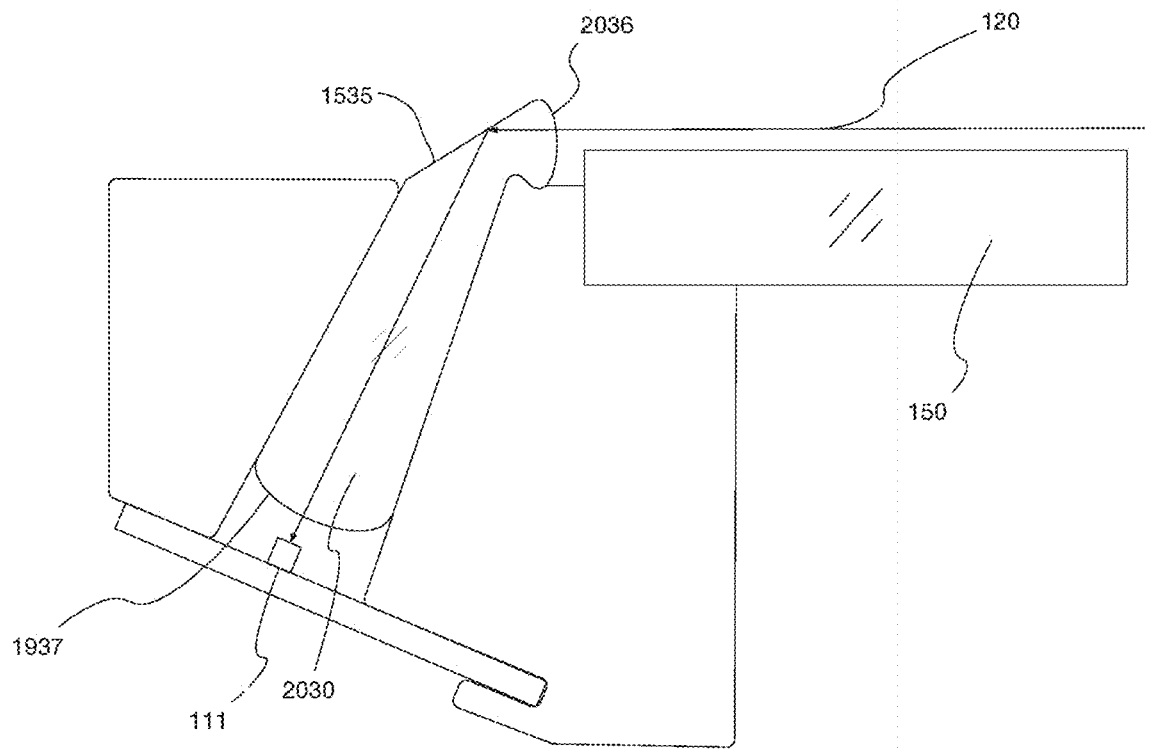
FIG. 20 shows an embodiment with a reflective light guide having a plurality of surfaces providing a dioptric power.

In FIG. 20, an embodiment similar to that shown in FIG. 15 is shown where light guide component 2030 comprises a top coupling surface 2036 providing a dioptric power. The light 120 enters light guide 2030 internally through top coupling surface 2036 and reflects off specular or partially specular reflective surface 1535. The light 120 is substantially columnated by the optical power of top coupling surface 2036 where the power is convex. The light then exits light guide 2030 through bottom coupling surface 1937 and is converged on to the detectors 111 by the optical power of top coupling surface 2037. In the transmitter role, the light emitted by emitters 110 is substantially columnated by the optical power of top coupling surface 1937 where the power is concave. This advantageously spreads out light beam 120 vertically, reducing tolerance problems for component alignment. Where the power is convex, light beam 120 is made narrower but more intense. This feature of the surface 2036 having a dioptric power may be applied to any of the embodiments provided in the present description comprising a light guide. The curvature angles are preferably within 5-10 mm per radius of curvature.

Figure 21:
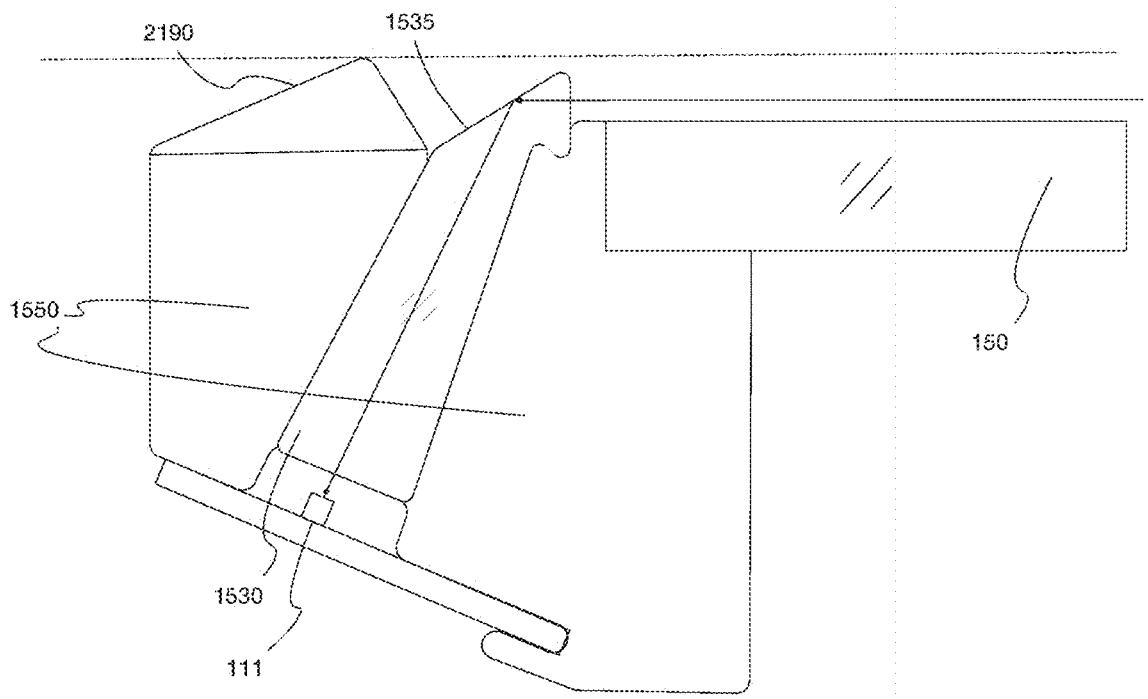
FIG. 21 shows an embodiment with a protective stopping component.

In FIG. 21, an embodiment is shown with a feature that may be added to any other embodiment of the disclosure. Protective stop 2190 may be an extension of support component 1550 or a separate component fixed to support component 1550. Protective stop 2190 provides a physical stop which extends further from the touch surface along the normal to the plane of the touch surface than any light guide component (e.g. 1530 as shown in FIG. 21). This protective stop ensures that if the touch apparatus 100 is placed against a flat surface, e.g. a wall or floor, top surface 1535 of light guide component 1530 will not be scratched or damaged by the flat surface, as protective stop 2190 will hold the touch apparatus 100 and light guide component 1530 away from the flat surface, leaving a gap. Preferably, protective stop 2190 extends at least 0.1 mm further from the touch surface along the normal to the plane of the touch surface than any light guide component.

Figure 22:
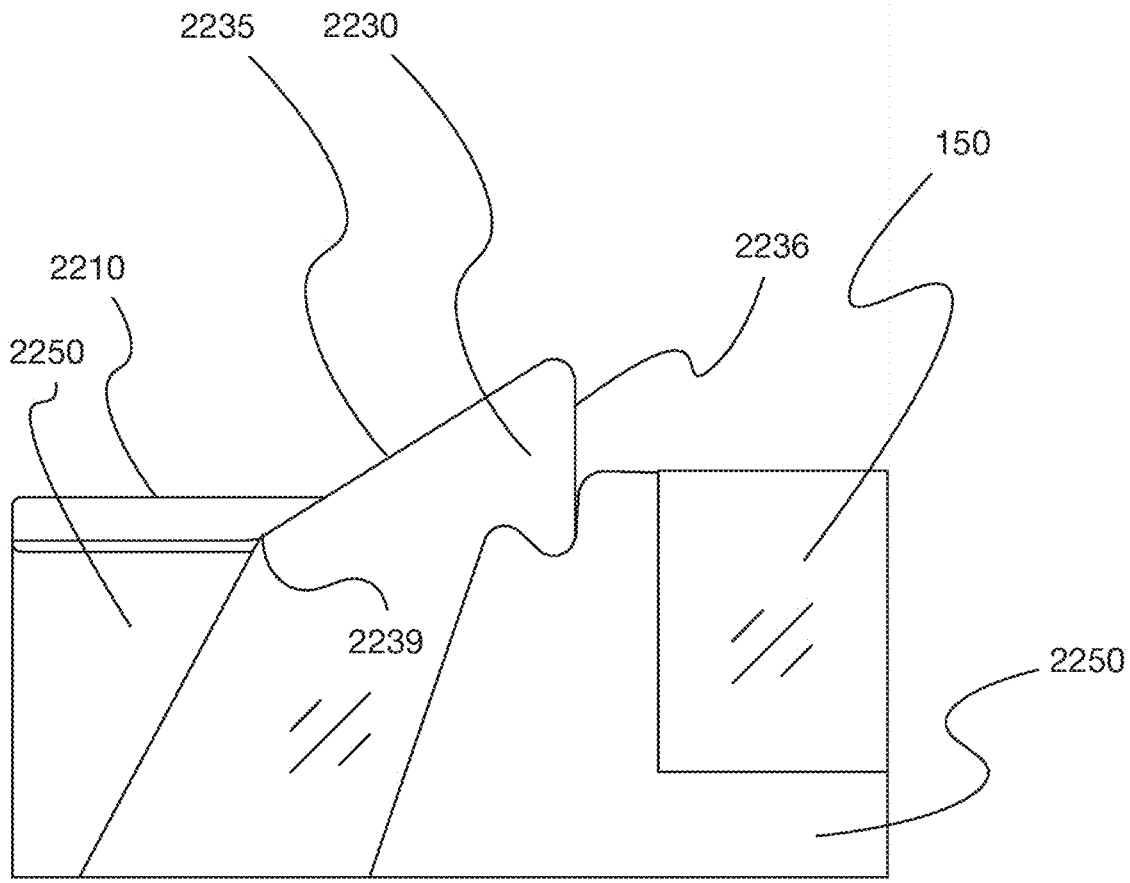
FIG. 22 shows an embodiment with an additional light absorbing layer.

In FIG. 22, an embodiment similar to that shown in FIG. 15 is shown with a zoomed view on top coupling surface 2236, reflective surface 2235, reflective surface edge 2239, light guide 2230, and support components 2250. In this embodiment, an additional light absorbing layer 2210 is provided, wherein light absorbing layer 2210 covers reflective surface edge 2239 and optionally partially overlaps reflective surface 2235. This advantageously allows the reduction of ambient light received through edge 2239 and/or reflected at an undesirable angle from within light guide 2230. This feature may be applied to any of the embodiments provided in the present description comprising a light guide with edges that are exposed to ambient light.

Figure 23:
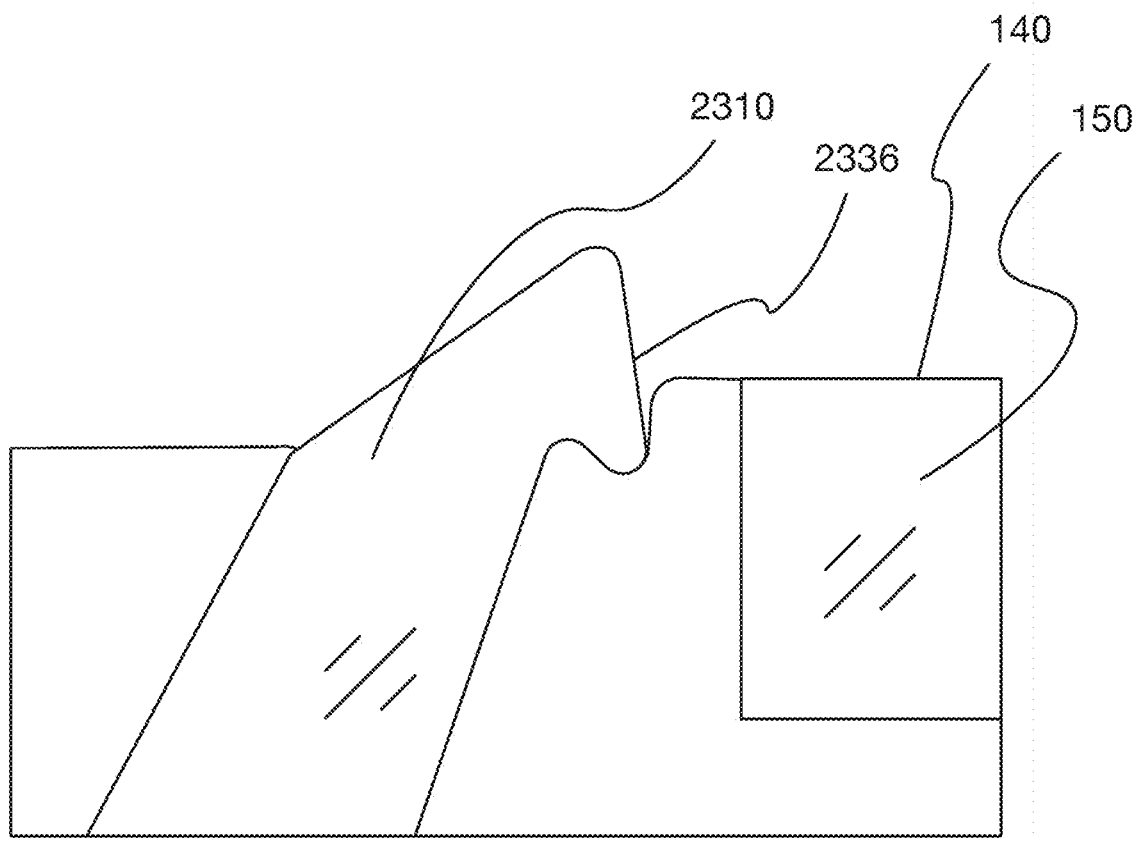
FIG. 23 shows an embodiment with a reflective light guide wherein the surface proximal the panel is slanted.

In FIG. 23, an embodiment similar to that shown in FIG. 22 is shown, wherein top coupling surface 2336 is angled relative to the touch surface 140. Top coupling surface 2336 may be angled at between 100° and 80° relative to touch surface 140. This feature of the surface coupling light to or from the touch surface 140 having an angle may be applied to any of the embodiments provided in the present description comprising a light guide.

Figure 24:
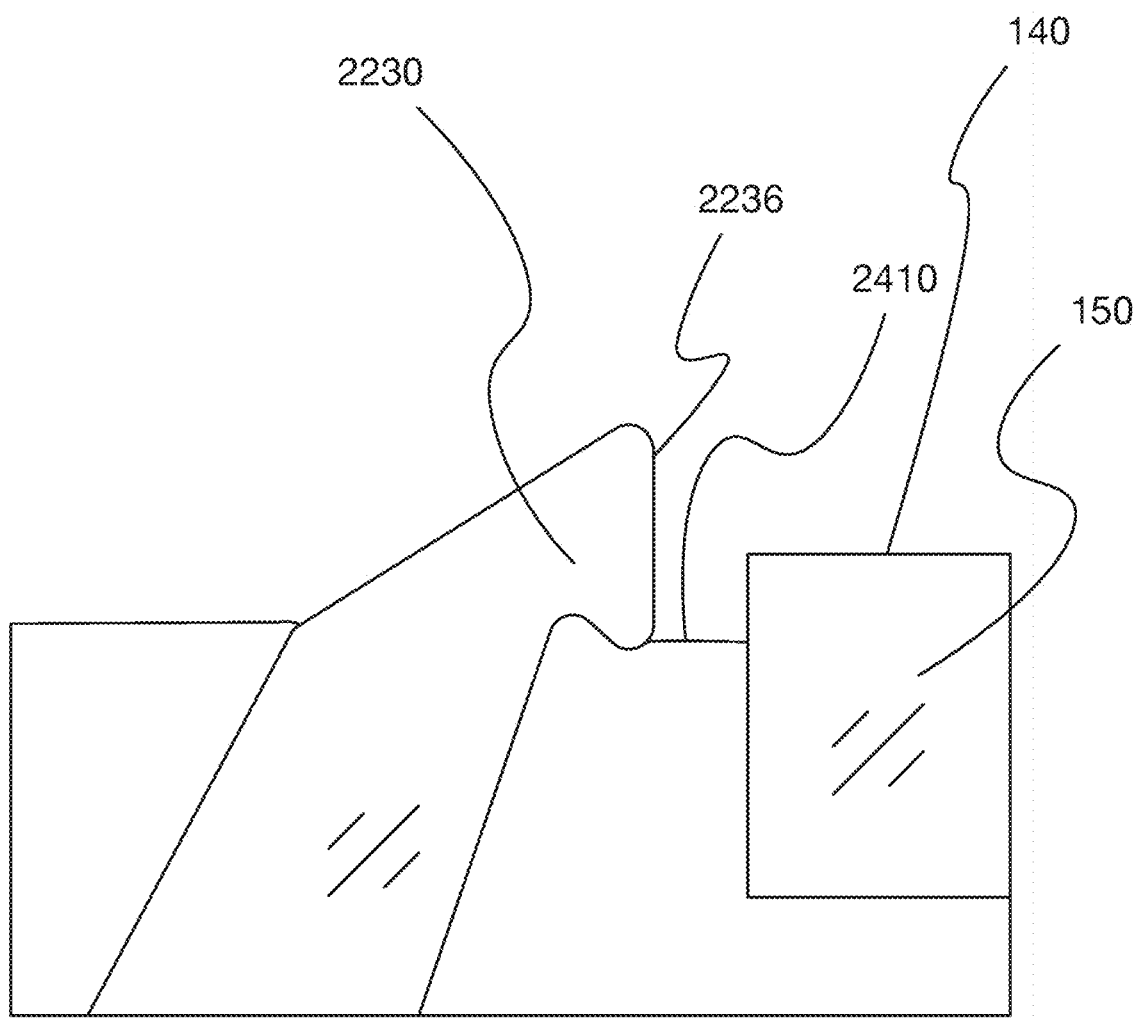
FIG. 24 shows an embodiment comprising a contamination ditch between the light guide and the panel.

In FIG. 24, an embodiment similar to that shown in FIG. 22 is shown, wherein top coupling surface 2236 is spaced from panel 150 to provide ditch 2410. Ditch 2410 advantageously allows dust, liquids, or other debris from contaminating the portion of surface 2236 exposed to touch surface 140. This feature may be applied to any of the embodiments provided in the present description comprising a light guide. Preferably, ditch 2410 extends between 0.01 mm and 2 mm below touch surface 140.

Figure 25:
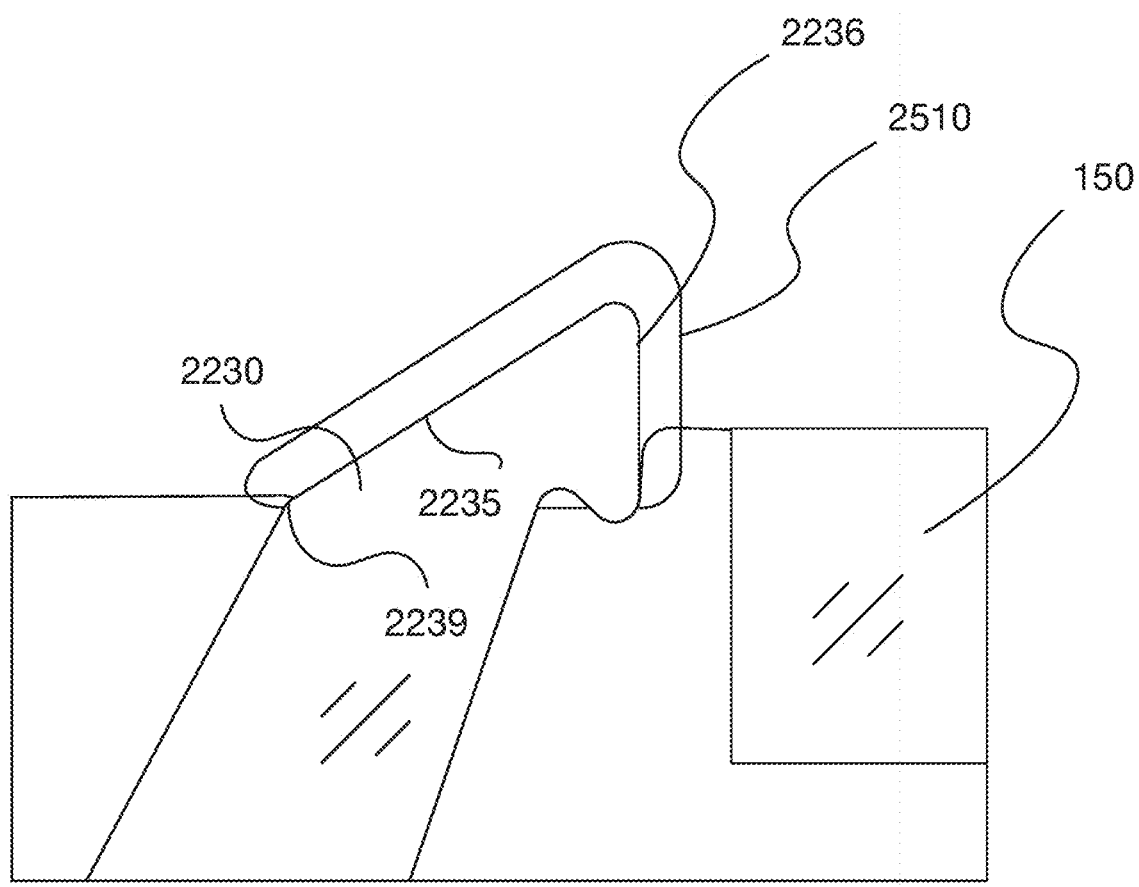
FIG. 25 shows an embodiment with a reflective light guide having a top layer comprising a high refractive index than the light guide.

In FIG. 25, an embodiment similar to that shown in FIG. 22 is shown, wherein reflective surface 2235, reflective surface edge 2239, and/or top coupling surface 2336 are provided with optical layer 2510. Optical layer 2510 has a lower refractive index than light guide 2230 and may comprise fluoro polymer plastics e.g. Teflon and Cytop, dielectric coatings e.g. magnesium fluoride or nanoporous sio$_2$. Techniques for applying layer 2510 to surface 2235 may include sputter deposition, spray coating, dip coating, physical/chemical vapour deposition. Protective layer 2510 advantageously prevents the frustration of the internal reflection occurring at surface 2235 whilst not affecting the optical properties of transmission at surface 2236. This feature may be applied to any of the embodiments provided in the present description comprising a light guide with surfaces exposed to ambient light.

Figure 26:
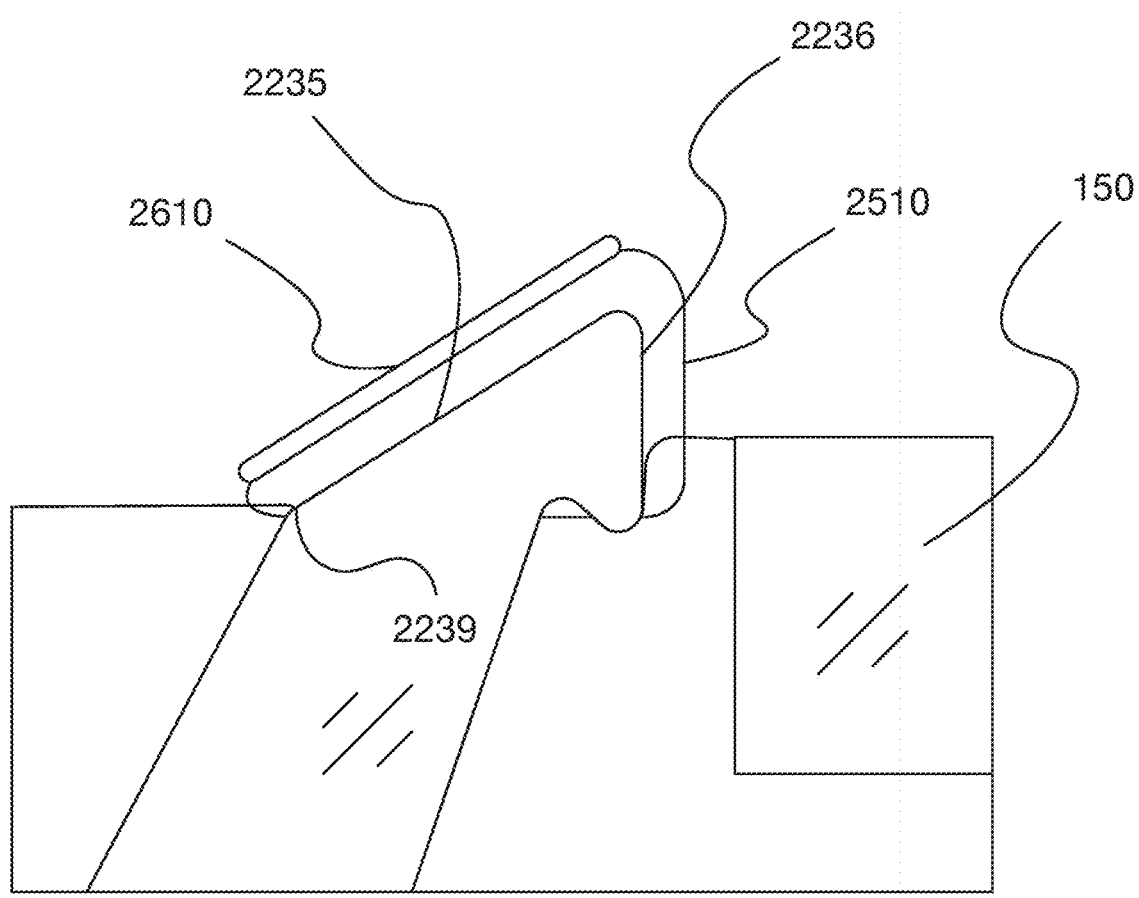
FIG. 26 shows an embodiment with a reflective light guide having a hard coating layer.

In FIG. 26, an embodiment similar to that shown in FIG. 25 is shown, wherein protective layer 2510 is further provided with hard layer 2610. Hard layer 2610 preferably covers surfaces most vulnerable to scratching, namely reflective surface 2235 and reflective surface edge 2239. Hard layer 2610 may comprise dielectric coatings, plastic hard coatings, chromium oxide, metal sheeting, etc. Hard layer 2610 advantageously physically protects coating layer 2510. This feature may be applied to any of the embodiments provided in the present description comprising a light guide with surfaces exposed to ambient light and/or environmental or user wear from contact with objects.

Figure 27:
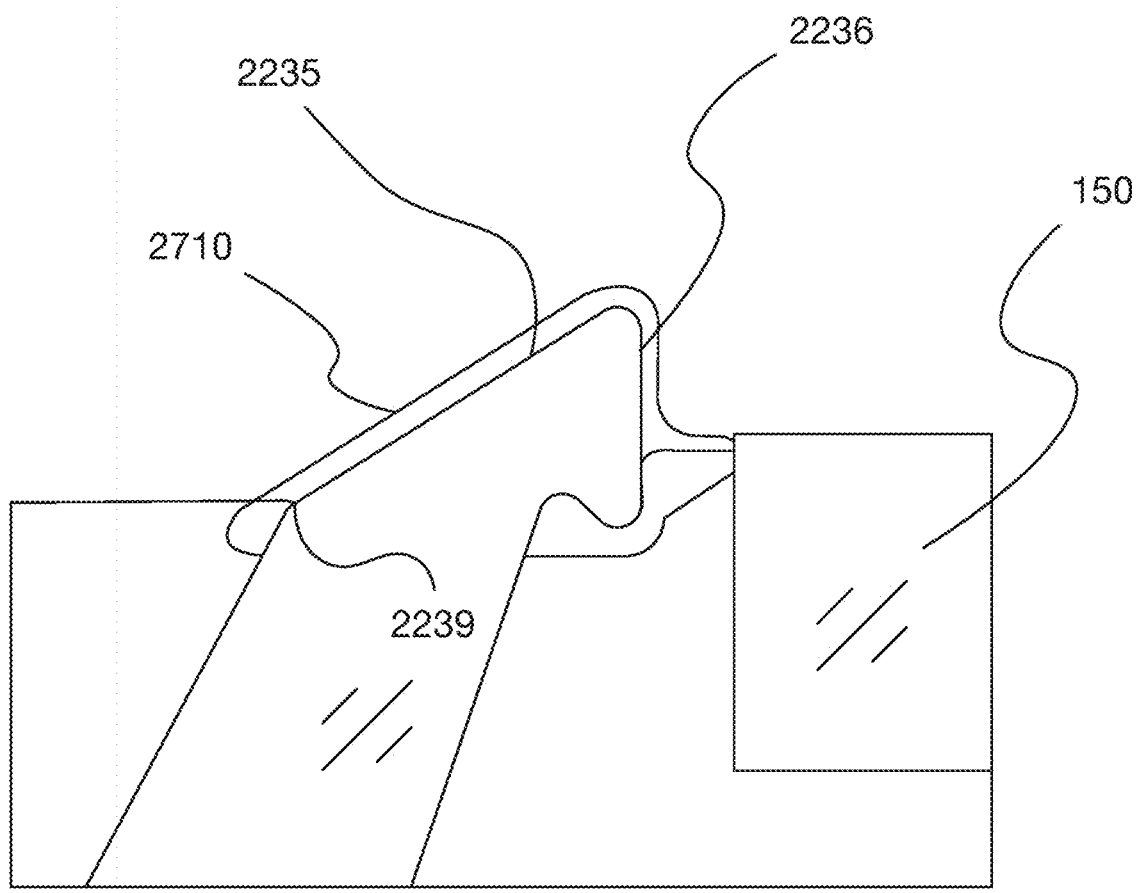
FIG. 27 shows another embodiment with a reflective light guide having a hard coating layer.

In FIG. 27, an embodiment similar to that shown in FIG. 25 is shown, wherein reflective surface 2235, reflective surface edge 2239, and/or top coupling surface 2236 are provided with hard layer 2710. Hard layer 2710 may comprise e.g. the hard coatings of the previous embodiment that are optically clear as well as standard spectacle lens coatings. Hard layer 2710 advantageously allows scratch protection of the exposed light guide surfaces. This feature may be applied to any of the embodiments provided in the present description comprising a light guide with surfaces exposed environmental or user wear from contact with objects.

Figure 28:
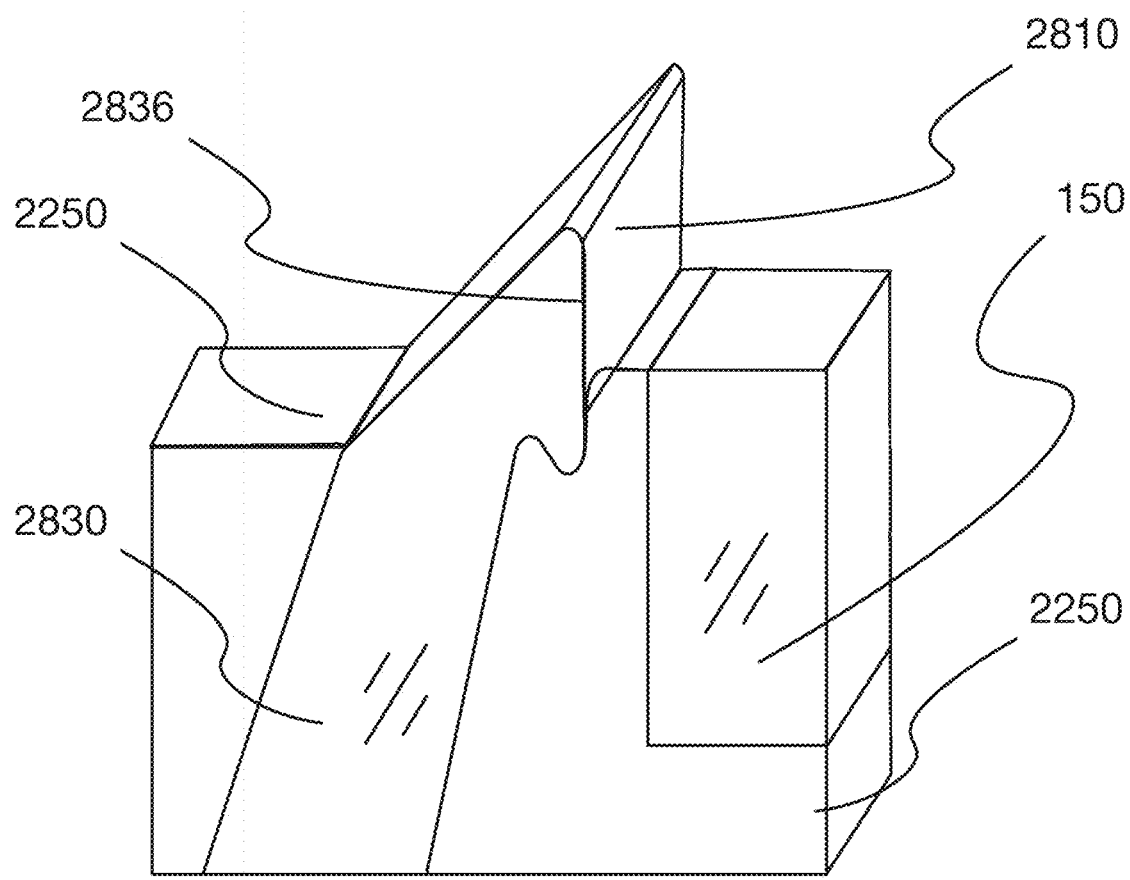
FIG. 28 shows an embodiment with a reflective light guide wherein the surface proximal the panel is vertically corrugated.

In FIG. 28, an isometric view of an embodiment similar to that shown in FIG. 15 is shown with a focus on top coupling surface 2836 and light guide 2830, and support components 2250. In this embodiment, top coupling surface 2836 comprises a vertical corrugation 2810. The corrugation may preferably be sinusoidal with a period length of between 0.1 mm-1 mm. This advantageously improves the spread of the light from emerging from surface 2836 in the plane of the touch surface, which allows more scanlines at high angles. This feature of the surface coupling light to or from the touch surface 140 having a vertical corrugation may be applied to any of the embodiments provided in the present description comprising a light guide.

The invention claimed is:

1. A touch sensing apparatus, comprising:
   a light transmissive panel that defines a touch surface,
   a plurality of light emitters and detectors arranged along a perimeter of the light transmissive panel,
   an optical component arranged along the perimeter of the light transmissive panel,
   wherein the light emitters are arranged to emit a respective beam of emitted light and the optical component is configured to direct the emitted light to a path across the light transmissive panel,
   wherein the optical component comprises a reflector surface arranged above the touch surface to reflect light from the light emitters to the touch surface, and
   wherein the reflector surface is specularly reflective, and
   an elongate channel extending as an air gap from each light emitter and/or detector to the reflector surface of the optical component, wherein the elongate channel has a channel axis extending from each light emitter and/or detector to the reflector surface.

2. The touch sensing apparatus according to claim 1, wherein the optical component is formed from a specularly reflective metal.

3. The touch sensing apparatus according to claim 1, wherein the reflector surface comprises an anodized extruded component made from a metal.

4. The touch sensing apparatus according to claim 3, wherein the metal is aluminum.

5. The touch sensing apparatus according to claim 1, wherein the reflector surface has a mirror finish.

6. The touch sensing apparatus according to claim 1, wherein the reflector surface comprises a mirror coating or film.

7. The touch sensing apparatus according to claim 1, elongate channel comprises a light transmissive medium with a low refractive index.

8. The touch sensing apparatus according to claim 1, wherein the elongate channel comprises channel walls, and wherein at least a portion of the channel walls are configured to absorb light.

9. The touch sensing apparatus according to claim 8, wherein the channel walls comprise one or more light absorbent walls configured to absorb light travelling at an angle deviant from the angle of the channel axis.

10. The touch sensing apparatus according to claim 1, wherein the channel has at least two channel axes.

11. Touch sensing apparatus according to claim 10, wherein the at least two channel axes are not parallel.

12. The touch sensing apparatus according to claim 1, wherein the elongate channel extends in a direction which forms a non-perpendicular angle to a plane in which light transmissive panel extends.

13. The touch sensing apparatus according to claim 1, wherein the optical component is a support component for the light transmissive panel.

14. The touch sensing apparatus according to claim 13, wherein the support component comprises a slot for mounting a substrate for the plurality of light emitters and detectors.

* * * * *